United States Patent
Mitamura

(10) Patent No.: US 6,620,367 B1
(45) Date of Patent: Sep. 16, 2003

(54) TIRE VULCANIZING METHOD AND TIRE VULCANIZER

(75) Inventor: Hisashi Mitamura, Takasago (JP)

(73) Assignee: Kabushiki Kaisha Kobe Seiko Sho (Kobe Steel, Ltd.), Kobe (JP)

(*) Notice: Subject to any disclaimer, the term of this patent is extended or adjusted under 35 U.S.C. 154(b) by 319 days.

(21) Appl. No.: 09/637,030

(22) Filed: Aug. 14, 2000

(30) Foreign Application Priority Data

Aug. 17, 1999 (JP) .......................................... 11-230227
Aug. 23, 1999 (JP) .......................................... 11-234989

(51) Int. Cl.[7] ................................................ B29C 35/02
(52) U.S. Cl. ....................... 264/294; 264/315; 264/326; 425/31; 425/33; 425/38
(58) Field of Search .................. 264/315, 326, 264/294; 425/31, 32, 35, 41, 33, 38

(56) References Cited

U.S. PATENT DOCUMENTS

| | | |
|---|---|---|
| 3,566,066 A | 2/1971 | Borthwick et al. |
| 3,640,653 A | 2/1972 | Laenen et al. |
| 3,712,769 A | 1/1973 | Cimprich |
| 3,741,696 A | 6/1973 | Greenwood |
| 3,824,048 A | 7/1974 | Getz |
| 3,909,337 A * | 9/1975 | Yabe |
| 3,922,122 A | 11/1975 | Bottasso et al. |
| 4,368,015 A | 1/1983 | Kawahara et al. |
| 4,456,806 A | 6/1984 | Arimatsu |
| 4,525,320 A | 6/1985 | Sarumaru |
| 5,098,269 A | 3/1992 | Irie et al. |
| 5,384,084 A | 1/1995 | Siegenthaler |
| 5,853,526 A * | 12/1998 | Laurent et al. |

FOREIGN PATENT DOCUMENTS

| | | |
|---|---|---|
| DE | 1 208 878 | 1/1996 |
| DE | 44 34 270 | 3/1996 |
| EP | 0 468 342 | 1/1992 |
| EP | 0 549 317 | 6/1993 |
| EP | 0 604 984 | 7/1994 |
| EP | 0 928 679 | 7/1999 |
| EP | 0 976 534 | 2/2000 |
| JP | 57-39941 | 3/1982 |
| JP | 57-39942 | 3/1982 |
| JP | 57-39943 | 3/1982 |
| JP | 57-87937 | 6/1982 |
| JP | 61-86219 | 5/1986 |
| JP | 4-12811 | 1/1992 |
| KR | 1983-0006006 | 9/1983 |
| KR | 1991-0019745 | 12/1991 |
| KR | 1998-0007020 | 4/1998 |

* cited by examiner

Primary Examiner—Mathieu D. Vargot
(74) Attorney, Agent, or Firm—Oblon, Spivak, McClelland, Maier & Neustadt, P.C.

(57) ABSTRACT

The present invention provides a tire vulcanizing method for, using a bladder and a tire vulcanizing press, applying preheating and shaping to a green tire externally of the vulcanizing press, subsequently, applying vulcanizing and molding to the entire tire preheated by said vulcanizing press, whereby the time for restricting the tire by the tire vulcanizing press can be shortened, and the cycle time of the tire vulcanizing and molding can be shortened to improve the productivity.

19 Claims, 45 Drawing Sheets

FIG. 11A
FIG. 11C
FIG. 11B
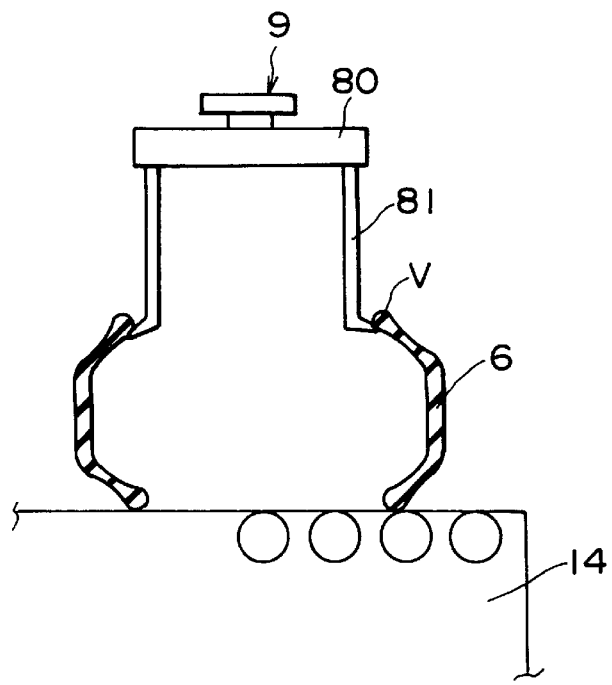
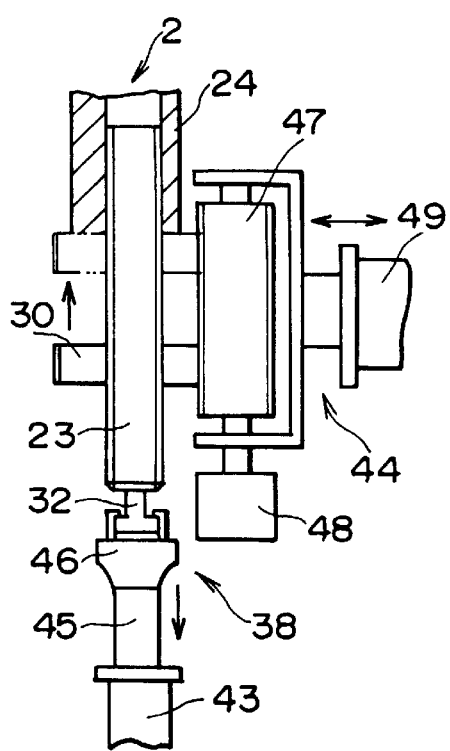
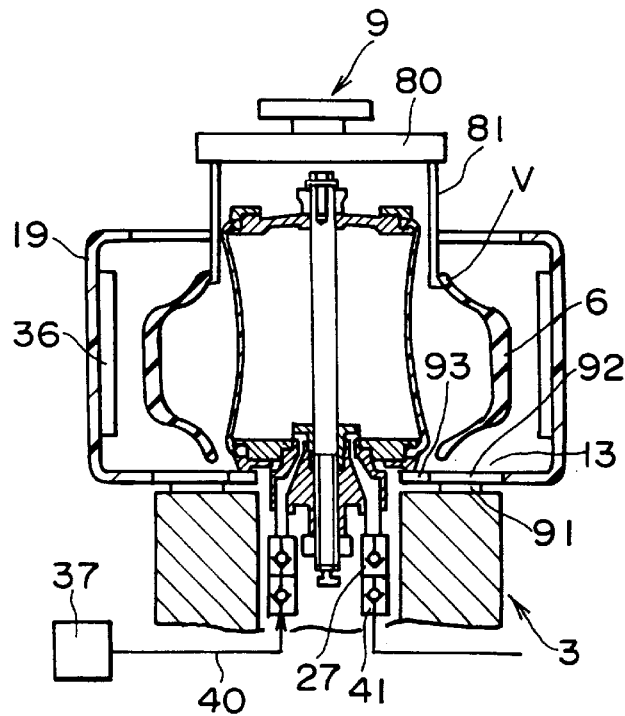

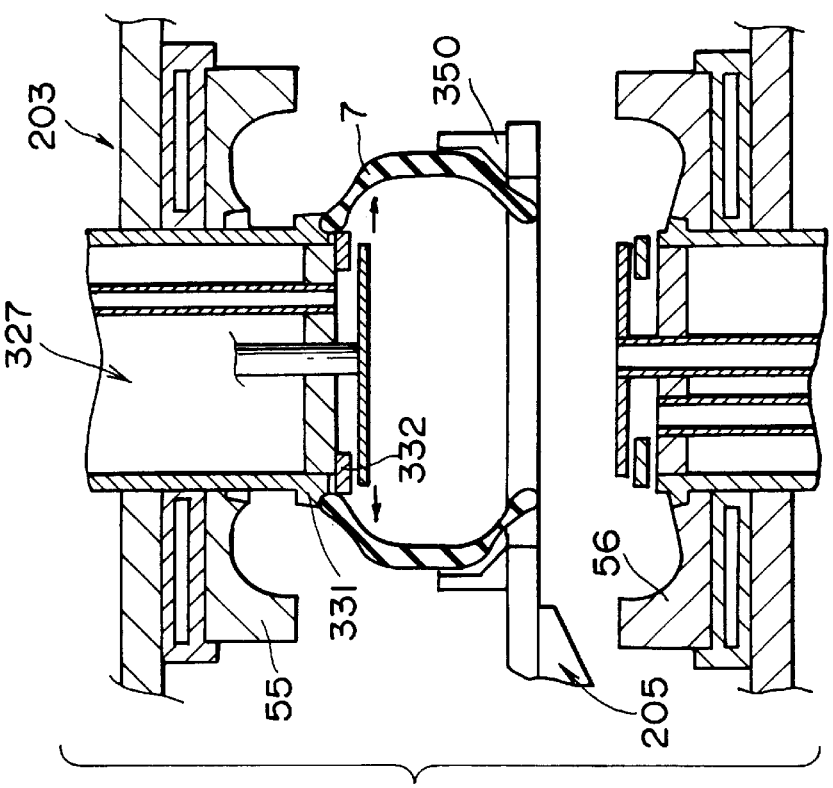
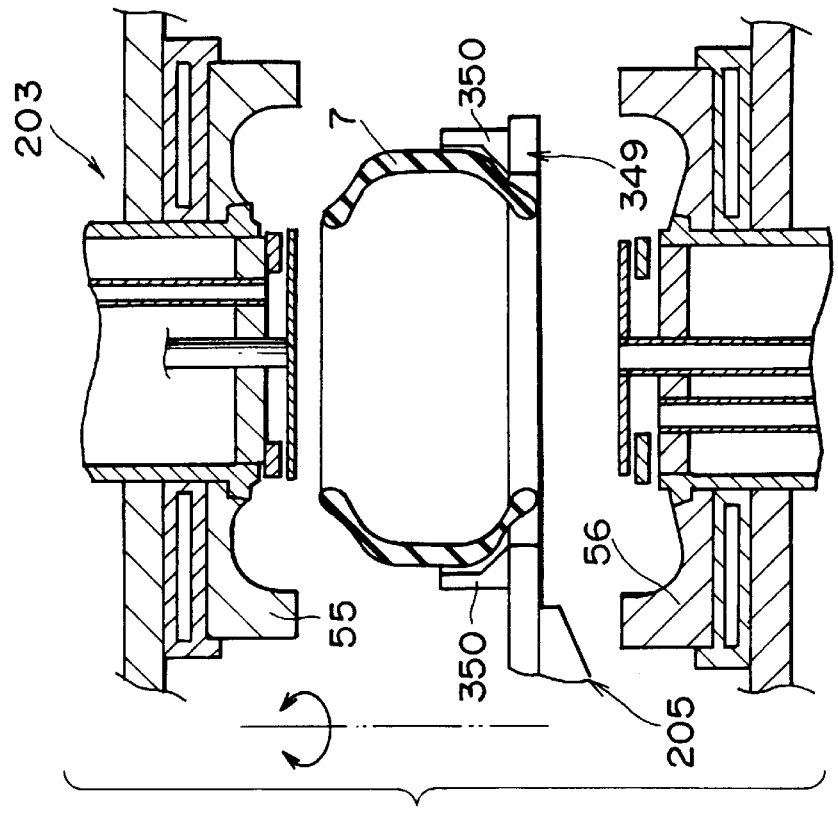
FIG. 35A
FIG. 35B

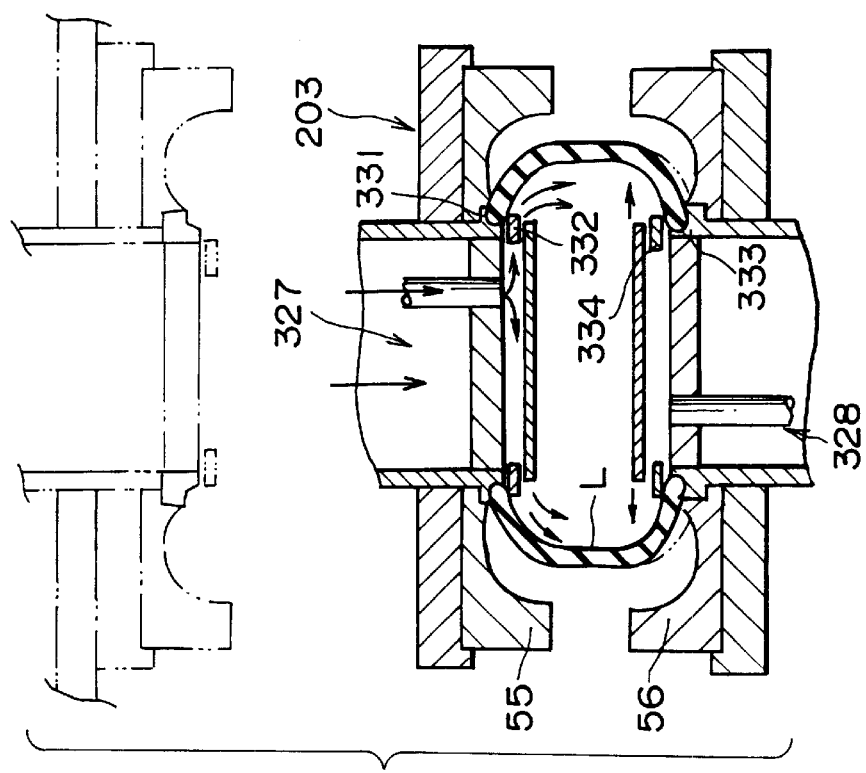
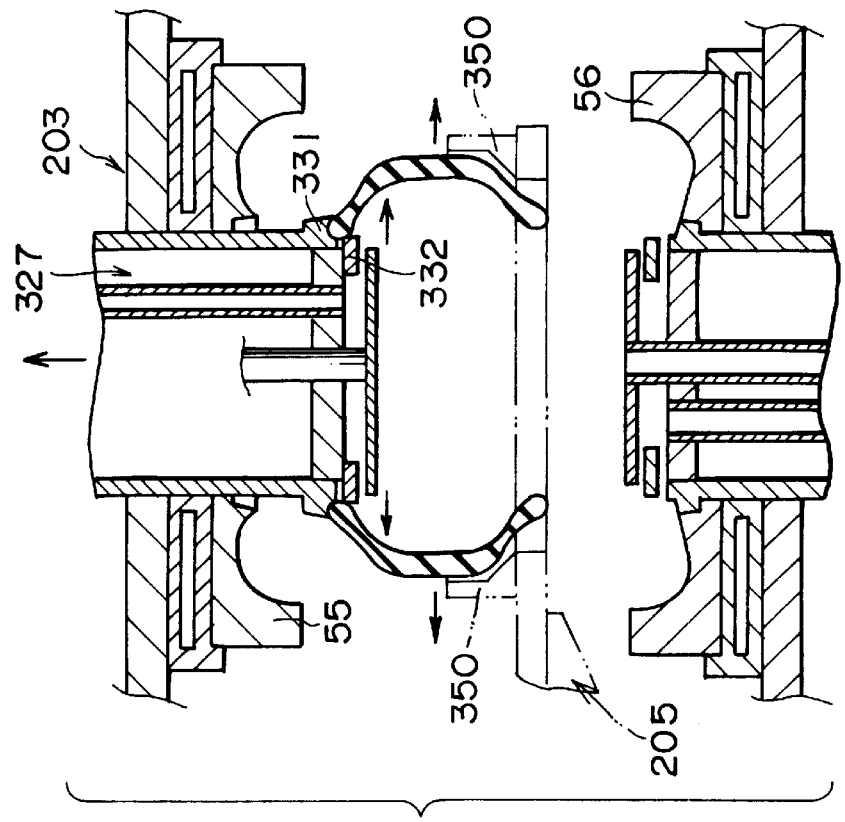

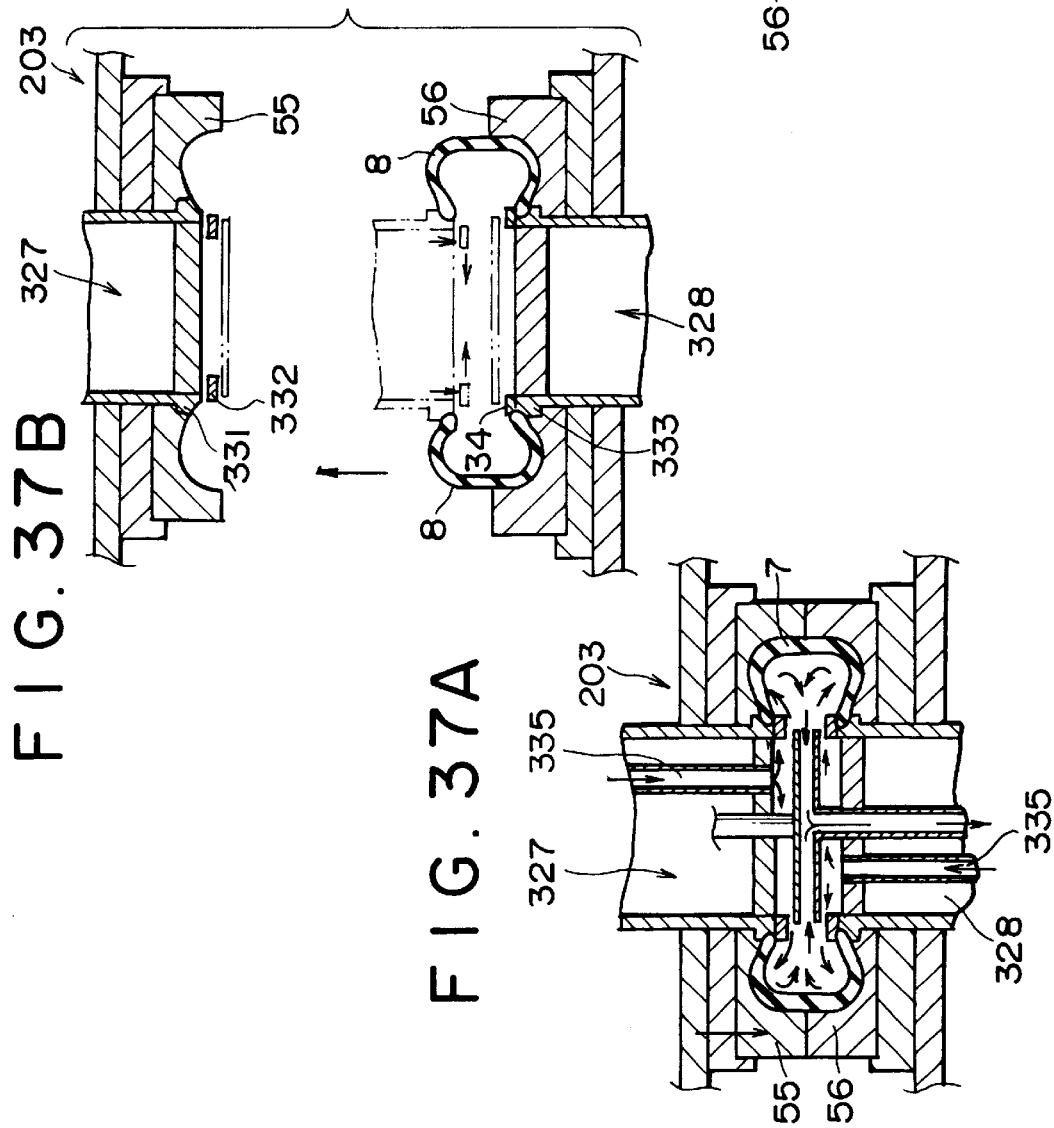

FIG. 44
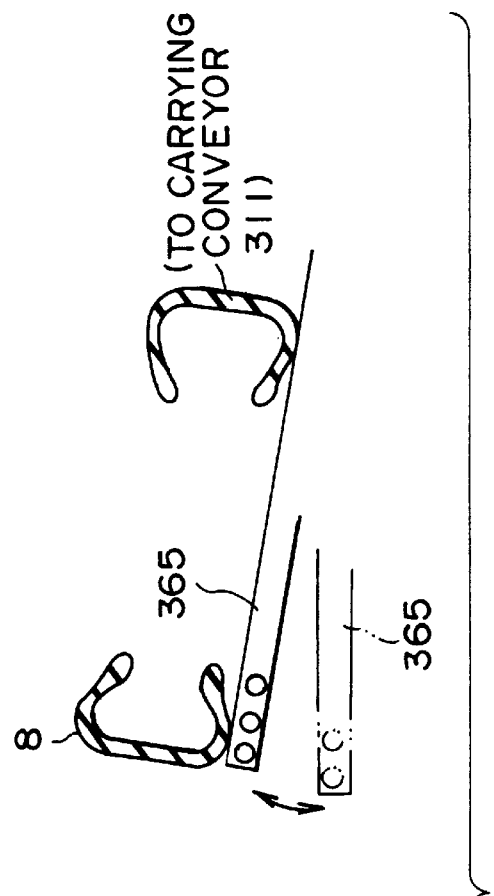
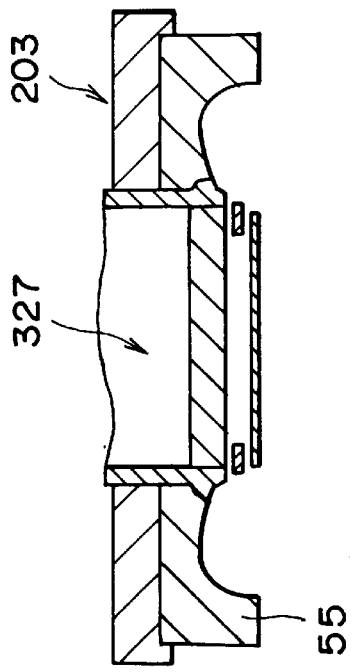
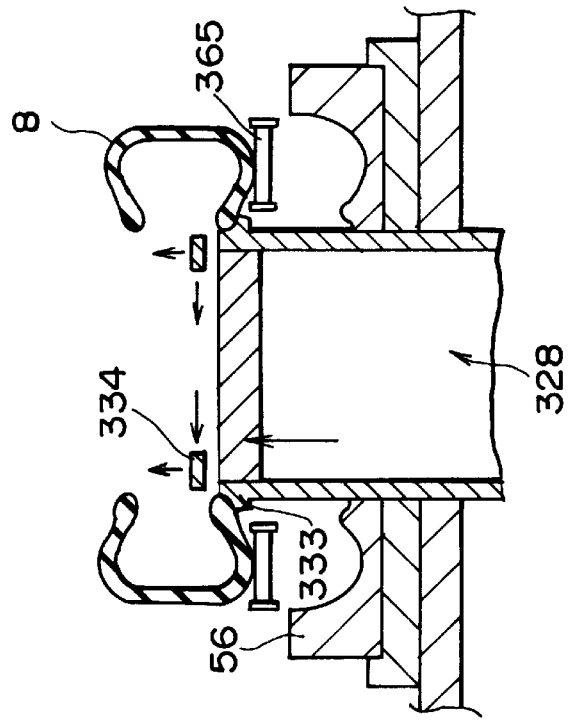

TIRE VULCANIZING METHOD AND TIRE VULCANIZER

BACKGROUND OF THE INVENTION

1. Field of the Invention

The present invention relates to a tire vulcanizing method for vulcanizing and molding a green tire, and a tire vulcanizer.

2. Description of the Related Art

In order that a green tire is vulcanized and molded by a bladder type tire vulcanizing press, the tire is subjected to shaping by a bladder, the tire is mounted within a mold (metal mold), and a heating medium (heating gas, steam or the like) is supplied into the bladder, and in case of a bladderless tire vulcanizing press, upper and lower bead portions of a green tire are held, the tire is mounted within a mold, and a heating medium is supplied into the tire whereby vulcanizing and molding are applied by denaturation of rubber caused by heating.

However, the green tire is uneven in thickness as shown in section of FIG. 45, and in order to prevent an unvulcanized tire from occurrence in a vulcanizing press, the vulcanizing time is set with a rise of temperature of a tread portion R and a bead portion V in the thick portion. Therefore, even if the inside and the outside of a side wall portion S in the thin portion of the green tire reach a vulcanizing temperature, there has to wait for till the inside of the tread portion R and the bead portion V in the thick portion reaches a vulcanizing temperature, not only causing the rise in production cost resulting from the loss of the heat energy, but also prolonging the cycle time of the tire vulcanization, thus causing the productivity to lower.

Particularly, in the case of vulcanizing and molding using a bladder, this bladder is heated by the heating medium to heat the inner circumference of the green tire, because of which the heat conductivity is poor, and it takes long time till a temperature is risen up to vulcanizing temperature.

The inner circumference of the green tire is strengthened by an inner liner portion L as shown in FIG. 45. This inner liner portion L is normally pasted to the inner circumference of the green tire so that the ends thereof are superposed to each other, and in the vulcanizing and molding by the bladderless tire vulcanizing press, functions as a substitute of a bladder for putting a shape of a green tire in order. Accordingly, when the heating medium directly applies to the inner liner portion L by the bladderless type tire vulcanizing press, the heating medium enters from the joints or scratches to possibly turn up the inner liner portion L, and since the heating pressure medium exerting on the inner liner portion L is static pressure, the vulcanizing and molding are to be done in a state of leaving the joints or scratches, greatly influencing on the quality and external appearance of the tire vulcanization.

SUMMARY OF THE INVENTION

It is an object of the present invention to shorten the cycle time of tire vulcanization to improve the productivity.

A first invention is to vulcanize and mold a green tire using a bladder and a tire vulcanizing press, and provides a vulcanizing method comprising: applying shaping to a green tire externally of a tire vulcanizing press, and then applying vulcanizing and molding to the whole tire subjected to shaping by the tire vulcanizing press.

In this case, the bladder is elevated in temperature in advance by heating gas, prior to vulcanizing and molding by the press, to apply shaping to the green tire, and therefore, the time for restricting the tire by the press is shortened.

Further, the vulcanizing and molding of the whole green tire is not carried out by the press, but the shaping of the green tire, the heating of the bladder, and the vulcanizing and molding of the tire subjected to shaping are separately carried out whereby the vulcanizing can be carried out in parallel, whereby the cycle time of the tire vulcanization can be shortened totally.

Further, in the pre-processing step, when pre-heating is applied to the green tire, the restricting time of the tire in the tire vulcanizing press can be further shortened. Particularly, when the pre-heating is applied to the thick portion of a tread portion and a bead portion of a green tire, and the thick portion is heated to a temperature immediately before starting of vulcanization, the procedure can be shifted immediately to the vulcanizing and molding by the press.

Further, when in the pre-heating step, a bladder delivered out of the press is used, the time for heating the bladder by the pre-heating means can be shortened because the bladder is heated by the press.

A second invention is to apply vulcanizing and molding to a green tire using a bladder type tire vulcanizing press, and provides a vulcanizing method comprising: applying pre-heating to a green tire externally of the press, and then applying vulcanizing and molding to the whole tire pre-heated by the press.

In this case, since the tire preheated by the press is subjected to vulcanizing and molding, the time for restricting the tire by the press is shortened.

Further, the vulcanizing and molding of the whole green tire is not carried out by the press, but the preheating of the green tire, and the vulcanizing and molding of the preheated tire are separately carried out whereby the vulcanizing can be carried out in parallel, whereby the cycle time of the tire vulcanization can be shortened totally.

Further, in the pre-step, when pre-heating is applied to the thick portion of the tread portion and the bead portion of the green tire, the time for heating the thick portion to the vulcanizing temperature by the press can be shortened. Particularly, when heating takes place to the temperature immediately before starting of vulcanization, the procedure can be shifted immediately to the vulcanizing and molding by the press.

Further, a third invention is to vulcanize and mold a green tire using a bladderless type tire vulcanizing press, and provides a tire vulcanizing method comprising: applying pre-vulcanization to a green tire externally of the press, and then applying vulcanizing and molding to the whole tire preheated by the press, and a tire vulcanizer.

Since the preheated tire is subjected to vulcanizing and molding by the tire vulcanizing press, the time for restricting the tire by the press can be shortened. Further, when the pre-vulcanizing is applied to the green tire simultaneously with the preheating, the time for restricting the tire by the press can be further shortened, and even if only the pre-vulcanizing is applied, the time for restricting the tire by the press can be shortened.

Further, the vulcanizing and molding of the whole green tire is not carried out by the press, but the preheating or the like of the green tire, and the vulcanizing and molding of the preheated tire are separately carried out whereby the vulcanizing can be carried out in parallel, whereby the cycle time of the tire vulcanization can be shortened totally.

Further, in the pre-step, when pre-vulcanizing is applied to the inner liner portion of the inner circumference of the green tire, uneven portions such as joints or defects of the inner liner portion can be smoothed (uniformed) and repaired. When low pressure heating gas exerts on the inner liner portion while rising temperature, vulcanization does not reach the inner layer of the tire but rubber can be caused to have the flowability merely by the surface of the inner liner portion to apply the pre-vulcanization to only the inner liner portion positively.

In the pre-step, when pre-heating is applied to the thick portion of the tread portion and the bead portion of the green tire, the time for heating the thick portion to the vulcanizing temperature by the tire vulcanizing press can be shortened. Particularly, when heated to the temperature immediately before starting of vulcanization, the procedure can be shifted to the vulcanizing and molding immediately by the press.

When the pre-processing means is caused to have a function for delivering a green tire and a pre-vulcanized tire, in addition to pre-vulcanization and pre-heating, the tire vulcanizer can be miniaturized.

BRIEF DESCRIPTION OF THE DRAWINGS

FIGS. 11A–11C are views showing the procedure for receiving a green tire into a pre-processing unit;

FIGS. 35A and 35B are respectively views showing the procedure for carrying the pre-vulcanized tire into a tire vulcanizing press;

FIGS. 36A and 36B are respectively views showing the procedure for holding the pre-vulcanized tire on a tire vulcanizing press;

FIGS. 37A, 37B and 37C are respectively views showing the procedure for applying vulcanizing and molding to the pre-vulcanized tire and carrying the vulcanized and molded tire out of a tire vulcanizing press;

FIG. 44 is a view showing a modification for carrying the vulcanized and molded tire to a carrying conveyor.

DESCRIPTION OF THE PREFERRED EMBODIMENTS

The tire vulcanizing method and the tire vulcanizer according to the first invention, the second invention, and the third invention will be described hereinafter.

In the first invention, using a bladder mechanism and a tire vulcanizing press, pre-heating and shaping are applied to a green tire externally of the press, and then vulcanizing and molding are applied to the whole tire preheated by the press. With this, the time for restricting the tire by the press is shortened to improve the productivity while achieving the shortening of the cycle time for tire vulcanizing and molding.

In the following, the tire vulcanizer according to the first invention will be described, and thereafter, the tire vulcanizing method will be described.

Figure 1:
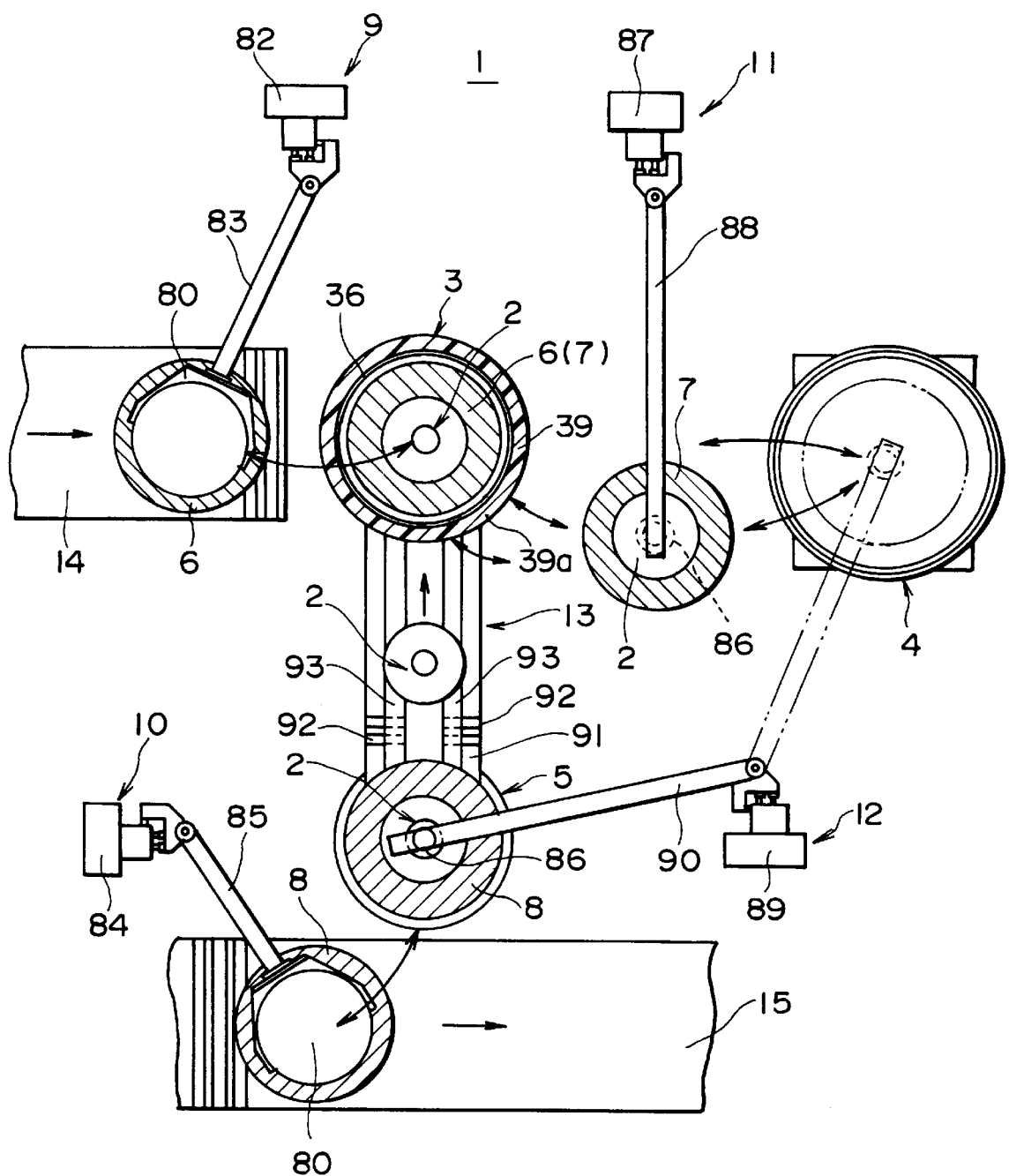
FIG. 1 is a top view showing the whole constitution of a tire vulcanizer according to a first invention.

The tire vulcanizer 1 shown in FIGS. 1 and 2 comprises a bladder mechanism 2 for shaping, a pre-processing unit 3 for applying pre-heating and shaping to a green tire 6, a tire vulcanizing press 4 for applying vulcanizing and molding to the whole tire 7 subjected to preheating or the like (hereinafter referred to as "preheated tire 7"), a tire unit 5 for removing a tire 8 subjected to vulcanizing and molding (hereinafter referred to as "vulcanized tire 8") from the bladder mechanism 2, four carrying loaders 9 to 12 for carrying tires 6 to 8, and a carrying conveyor 13 for carrying the bladder mechanism 2 from which the vulcanized tire 8 is removed from the tire unit 5 to the pre-processing unit 3. In the vulcanizer 1, the bladder mechanism 2 is moved around between the pre-processing unit 3, the press 4 and the tire unit 5 to apply vulcanizing and molding to the green tire 6.

Figure 3:
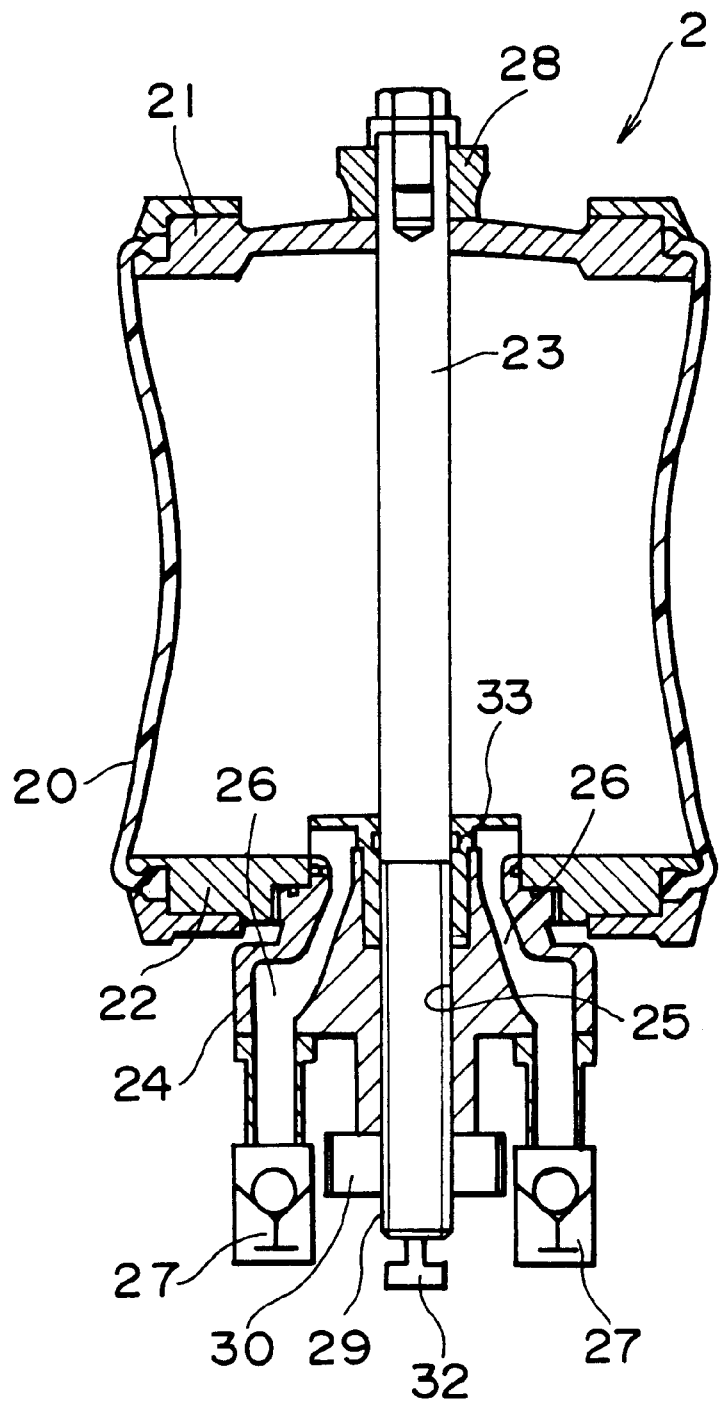
FIG. 3 is a sectional view showing the constitution of a bladder mechanism in a tire vulcanizer.

The bladder mechanism 2 is detachably mounted on the units 3, 5 and the press 4 and used for pre-heating, shaping and vulcanizing and molding of the green tire 6. The bladder mechanism 2 is composed, as shown in FIG. 3, a flexible (expandable and deformable) bag-like bladder 20, upper and lower clamp rings 21, 22 for clamping and holding the upper end of the bladder 20, and a center post 23 for expanding and deforming the bladder 20. The lower clamp ring 22 is integrated in the outer periphery of a bladder support 24 through a seal ring, and the bladder 20 is internally sealed by the bladder support 24 and the upper clamp ring 21. The bladder support 24 is formed with a movable hole 25 through which the center post 23 extends, the movable hole 25 having a plurality of gas passages 26, therearound, which communicate with inside and outside of the bladder 20. Each of the gas passages 26 has, at the extreme end thereof, a connecting coupler through a gas pipe, each connecting coupler 27 being provided with a valve function (a check valve) for preventing an escape of gas from the bladder 20 (see FIG. 3).

The center post 23 passes through the bladder 20 through a seal ring from the outside of the upper clamp ring 21, and slidably extends through the movable hole 25 of the bladder support 24, the center post 23 being supported on the upper clamp ring 21 through a holding ring 28. The center post 23 is formed with thread 29 from the projecting lower end of the bladder support 24 over the vicinity within the bladder 20, in the expanded state of the bladder 20, and a locking gear 30 in contact with the lower end surface of the bladder support 24 is threadedly mounted on the thread 29. The locking gear 30 is formed with a gear in the outer circumference thereof. A T-shaped joint 32 is provided on the lower end of the center post 23. Numeral 33 designates a seal ling interposed between the center post 23 and the bladder support 24, which is arranged not in contact with the thread 29 in the expanded state of the bladder 20 (see FIG. 3).

Figure 4:
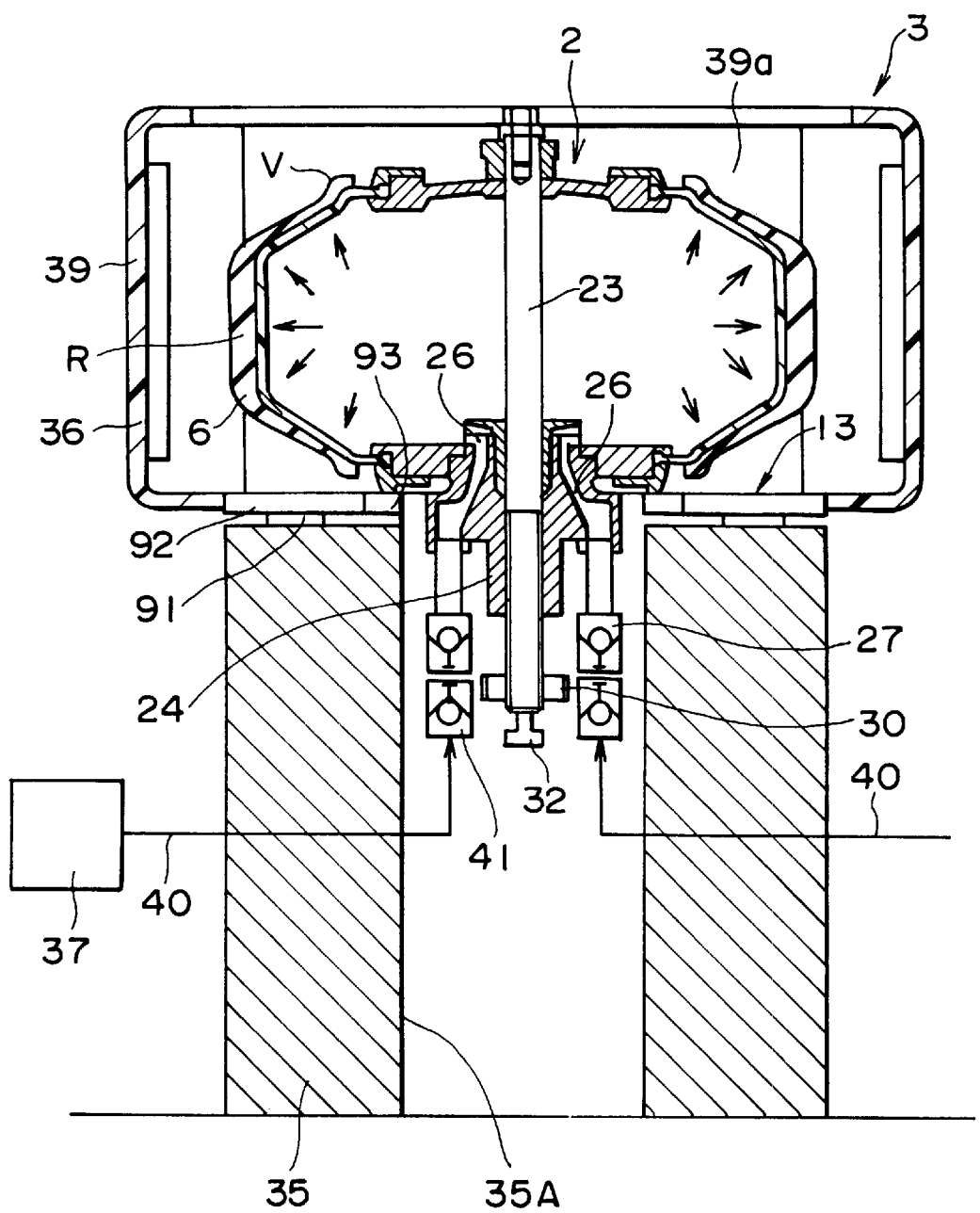
FIG. 4 is a sectional view showing the constitution of a pre-processing unit in a tire vulcanizer.

With the above-described constitution, in the bladder mechanism 2, the center post 23 (locking gear 30) is lowered, from the expanded state of the bladder 20, to the position of shaping, as shown in FIG. 3, whereby the bladder 20 is contracted and deformed into a diameter enlarging state, in which state, a low pressure heating gas is sealed into the bladder 20 from each gas passage 26 whereby the bladder 20 is brought into close contact with the inner periphery of the green tire 6, to which shaping is applied (see FIG. 4). The center post 23 is pulled up from the shaping state of the bladder 20 to thereby place the bladder 30 in the expanded state as shown in FIG. 3. And, in the bladder mechanism 2, after the center post 23 has been lowered, the locking gear 30 is moved up and down to come in contact with the bladder support 24, thereby maintaining the bladder 20 in the expansion and contraction state with the aid of the holding ring 28.

Figure 5:
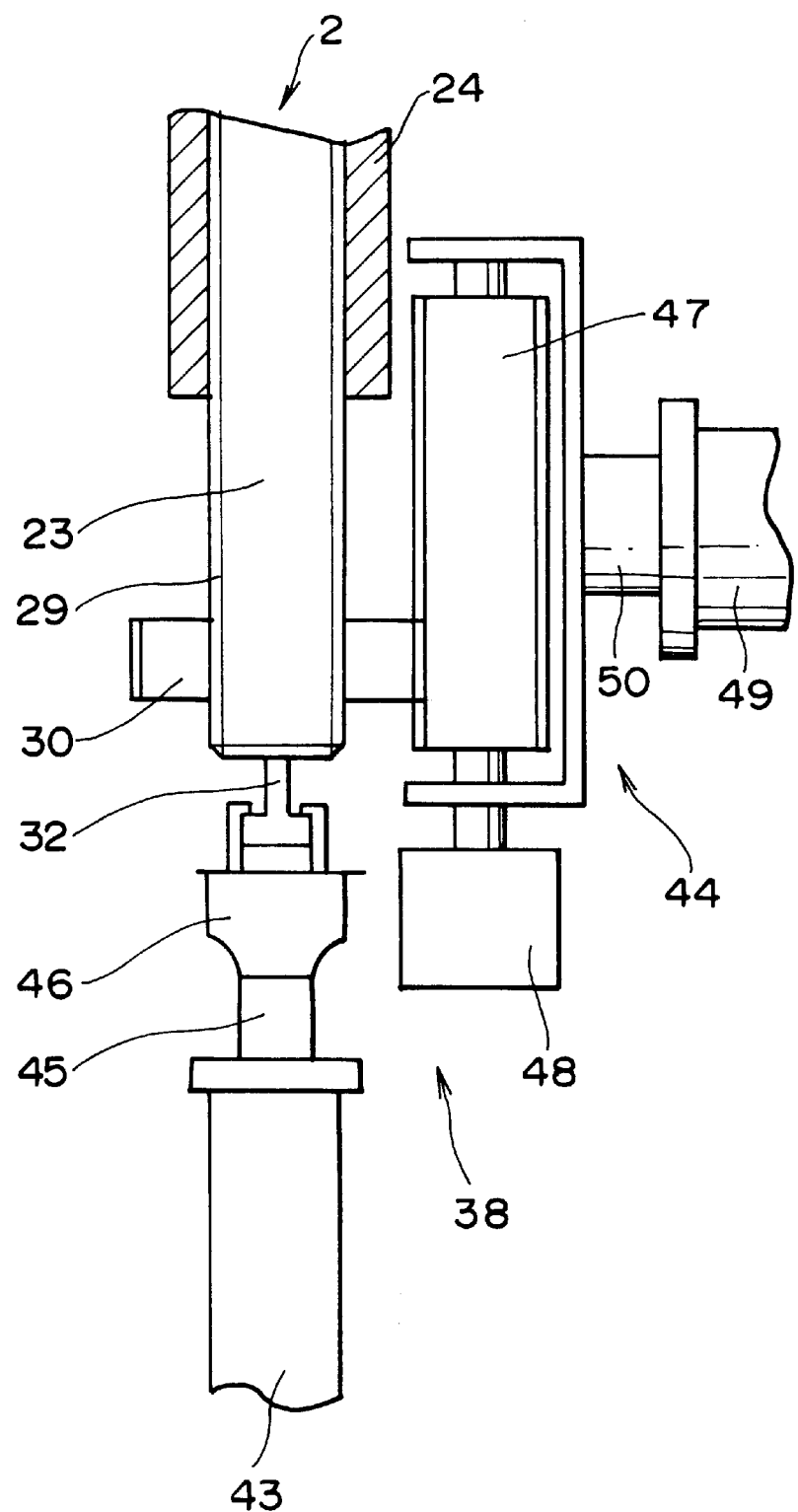
FIG. 5 is an enlarged view showing the constitution of a post driving device of a pre-processing unit.

The pre-processing unit 3 is provided forward of the tire vulcanizing press 4 to apply preheating and shaping to the green tire 6 with the bladder mechanism 2. The preheating unit 3 is composed of, as one example, as shown in FIG. 4, a bladder supporting stand 35 for supporting the bladder mechanism 2, a heating heater 36 (such as an infrared heater, a ceramics heater and so on) for heating the outer periphery of the green tire 6, a gas supplying source 37 for supplying a low pressure heating gas into the bladder 20 of the bladder mechanism 2, and a post driving device 38 for lowering the center post 23 of the bladder mechanism 2 as shown in FIG. 5. The bladder supporting stand 35 is provided to transfer the bladder mechanism 2 carried supporting the carrying conveyor 13 and is formed with a carrying-in passage 35A for receiving the lower end of the center post 23 of the bladder mechanism 2 (such as the bladder support 24, the connecting coupler 27, etc.) into the interior from the tire unit 5 side. The heating heater 36 is arranged in the inner periphery of heat insulating container 39 for receiving the green tire 6 therein to heat the outer periphery of the green tire 6 received in the heat insulating container 39. The heat insulating container 39 is provided with an opening and closing door 39a for receiving the bladder mechanism 2 carried by the carrying conveyor 13 into the interior. The gas supplying source 37 is provided to enclose low pressure heating gas into the bladder 20 through a plurality of gas pipes 40, each of which is provided at the end thereof with a connecting coupler 41 engageable with each connecting coupler 27 of the bladder mechanism 2 (see FIG. 4).

The post driving device 38 comprises, as shown in FIG. 5, a driving cylinder 43 for lowering the center post 23, and a lock gear driving mechanism 44 for moving up and down the lock gear 30 with respect to the center post 23, which are arranged below the bladder supporting stand 35. The driving cylinder 43 has a rod 45 which is moved forward and backward by supplying and discharging a pressure medium, and the rod 45 is provided at the end thereof with a chuck 46 for holding a joint 32 of the center post 23. The lock gear driving mechanism 44 has a pinion rod 47 meshed with the lock gear 30, and the lock gear 30 is moved up and down by rotating the pinion rod 47 by means of a gear motor 48. The pinion rod 47 and the gear motor 48 are connected to a rod 50 of a cylinder 49 for forward and backward movement through the support bracket, and are moved forward and backward with respect to the lock gear 30 by supplying and discharging a pressure medium to the cylinder 49 for forward and backward movement.

With the above-described constitution, the pre-processing unit 3 extends the rod 45 of the diving cylinder 43, the joint 32 of the center post 23 is held by the chuck 46, after which the rod 45 is withdrawn to lower the center post 23 (lock gear 30) to a shaping position whereby the bladder 20 is contracted to place in a diameter-enlarged state. In this state, the low pressure heating gas is enclosed into the bladder 20 through the gas passages 26 of the bladder mechanism 2 from the gas supplying source 37 whereby the bladder 20 is brought into close contact with the inner periphery of the green tire to apply shaping thereto. The rod of the cylinder 49 for forward and backward movement of the post driving device 38 is extended whereby the pinion rod 47 is meshed with the lock gear 30, after which the pinion rod 47 is rotated by the gear motor 48 to place the lock gear 30 in contact with the lower end surface of the bladder support 24. With this, the shapes of the green tire 6 and the bladder 2 are maintained in the shaping state (see FIGS. 4 and 5). Then, the pre-processing unit 3 heats the outer periphery of the green tire 6 in the shaping state whereby the preheating is applied to the thick portions of the tread portion R and the upper and lower bead portions V of the green tire 6.

Figure 6:
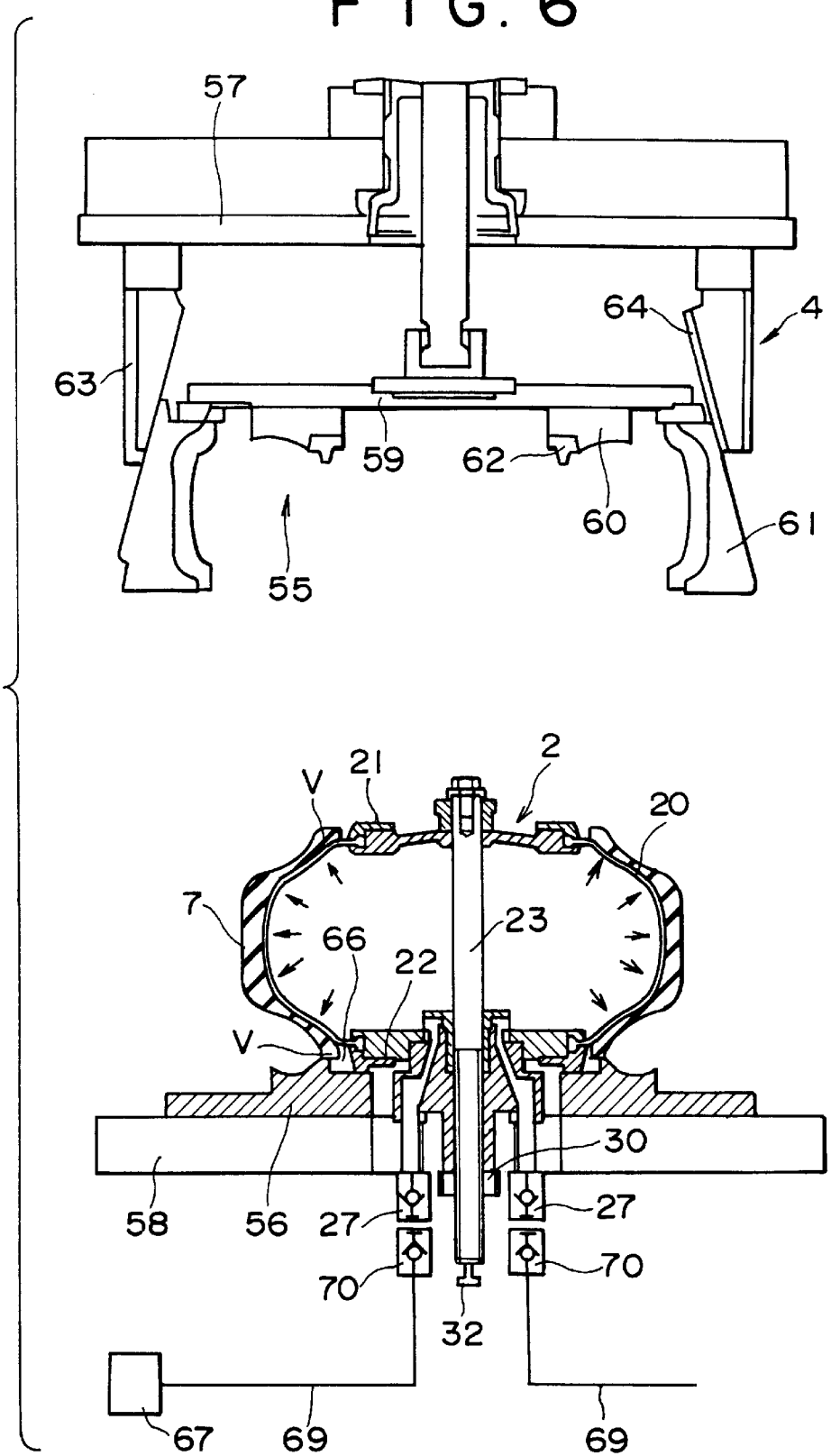
FIG. 6 is a sectional view showing the constitution of a tire vulcanizing press in a tire vulcanizer.

The tire vulcanizing press 4 is provided to mount the bladder mechanism 2 in the shaping state to apply vulcanizing and molding to the entire preheated tire. The press 4 is provided, as shown in FIG. 6, with two upper and lower molds 55, 56 for vulcanizing and molding the preheated tire 7, a heat supplying source 67 for supplying a high pressure heating medium (such as a heating gas, steam, etc.) into the bladder 20 within the bladder mechanism 2, and a post driving mechanism 68 for lowering the center post 23 as shown in FIG. 7.

Figure 2:
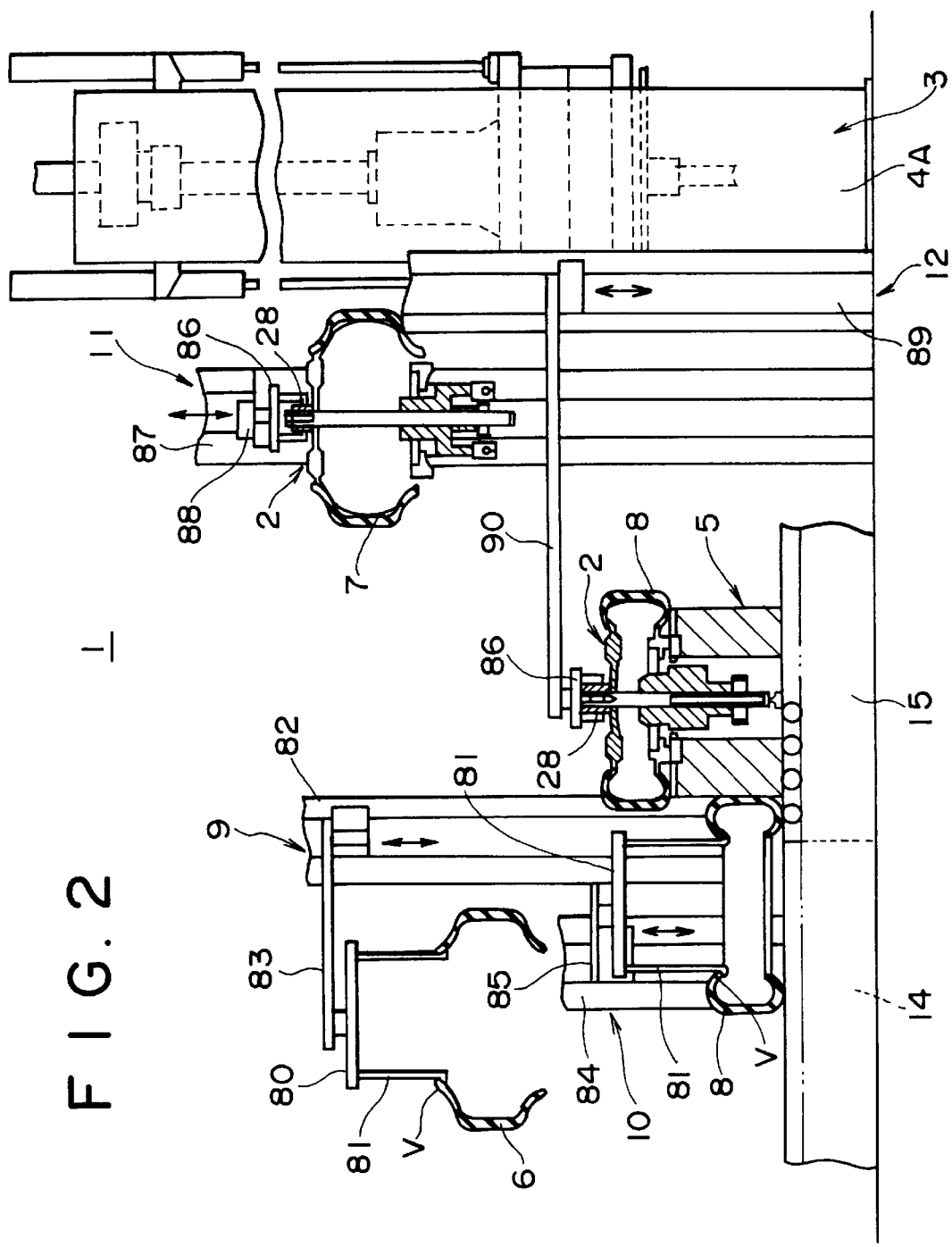
FIG. 2 is a view taken on A—A of FIG. 1, and a side view showing the whole constitution of a tire vulcanizer.

The upper mold 55 is provided on an upper mold plate 59 that can be moved up and down with respect to an upper platen 57 (heat plate), and the lower mold 56 is provided on a lower platen 58 secured to the tire vulcanizing frame 4A (see FIG. 2). These molds 55, 56 are preheated by the heating medium introduced into the platens 57 and 58. The upper platen 57 is moved up and down independently of the upper mold plate 59. The upper mold 55 comprises an upper side mold 60 secured to the upper mold plate 59, and a tread mold 61 provided closeably in a diametric direction with respect to the plate 59. The upper side mold 60 is provided at the lower end thereof with an upper bead ring 62 for setting the upper bead portion V of the preheated tire 7. The tread mold 61 comprises a plurality of segments, which are fitted into an outer ring 63 of the upper platen 57. The outer ring 63 is internally formed with a tapered groove 64 for holding the segments of the tread mold 61 closeably (see FIG. 6).

The lower mold 56 is used as a lower side mold, and is provided at the upper end thereof with a lower bead ring 66 for setting the lower bead portion V of the preheated tire 7. The lower mold 56 fits the lower clamp ring 22 of the bladder mechanism 2 into the lower bead ring 66 whereby the bladder mechanism 2 is mounted and supported within the tire vulcanizing press 4 to receive the lower end side (the bladder support 24, the couplers 27, etc.) therein. The heat supplying source 67 is provided to supply a high pressure heating medium (heating gas, steam, etc.) into the bladder 20 through a plurality of gas pipes 69, each gas pipe 69 being provided at the extreme end with a connecting coupler 70 engageable with each connecting coupler 27 of the bladder mechanism 2 (see FIG. 6).

Figure 7:
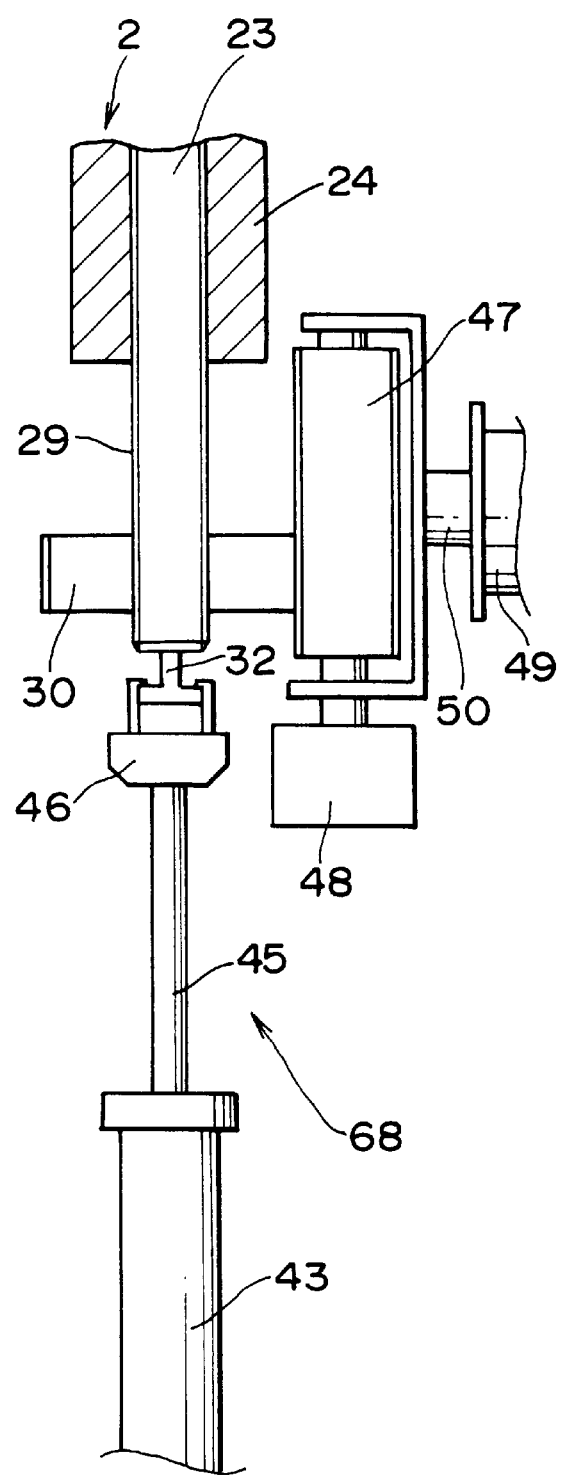
FIG. 7 is an enlarged view showing the constitution of a post driving device of a tire vulcanizing press.

The post driving device 68 has the same constitution as the post driving device 38 (see FIG. 5) of the pre-processing unit 3, as shown in FIG. 7, and comprises a driving cylinder 43 (including a chuck 46) for lowering the center post 23, and a lock gear driving mechanism 44 (a pinion rod 47, a gear motor 48 and a cylinder 49 for forward and backward movement) for moving up and down the lock gear 30, which are arranged below the lower platen 58.

Figure 15A:
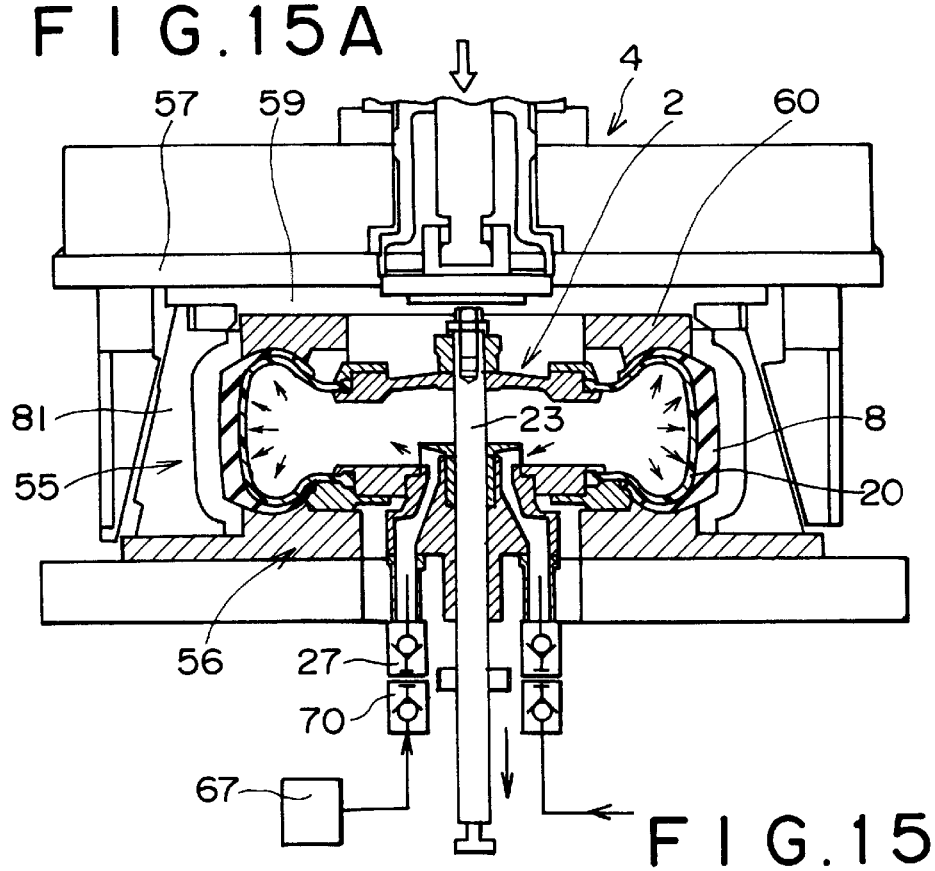
FIGS. 15A–15C are views showing the procedure for applying vulcanizing and molding to the preheated tire.

With this constitution, the vulcanizing press 4 is to mount and support the preheated tire 7 in the shaping state and the bladder mechanism 2 on the lower mold 56 to lower the center post 23 (lock gear 30) from the shaping position to the vulcanizing and molding position by the downward movement of the upper mold plate 59 (upper platen 57). Simultaneously therewith, the high pressure heating medium (heating gas, steam, etc) is supplied into the bladder 20 whereby the bladder 20 is expanded so as to be further contracted from the shaping state to enlarge a diameter. With this, the bladder 20 causes the preheated tire 7 to press against the molds 55, 56 in the closed state from the interior and mold it into the product shape, applying vulcanizing with denature of rubber caused by heating (see FIG. 15A).

Figure 15C:
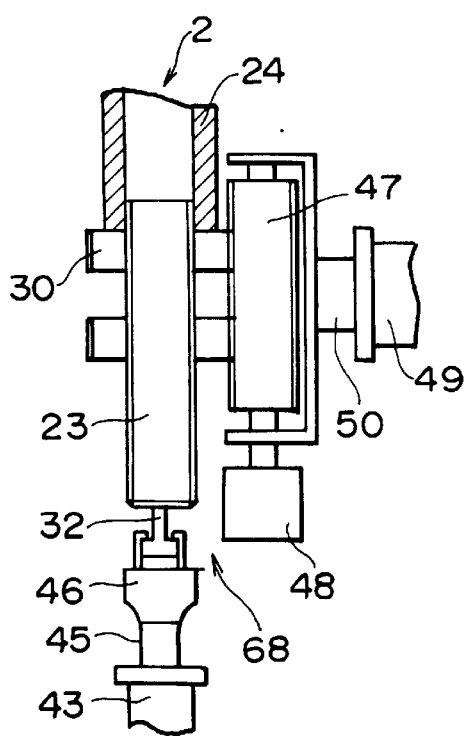

The press 4 is to lower the center post 23, after which the pinion rod 47 is meshed with the lock nut 30 by the cylinder 49 for forward and backward movement of the lock gear driving mechanism 44, and the gear motor 48 is driven to rotate the pinion rod 47 whereby the lock gear 30 is moved up into contact with the lower end surface of the bladder support 24. With this, the shapes of the preheated tire 7 and the bladder 20 are maintained in the vulcanized and molded state (see FIGS. 15A to 15C).

Figure 8:
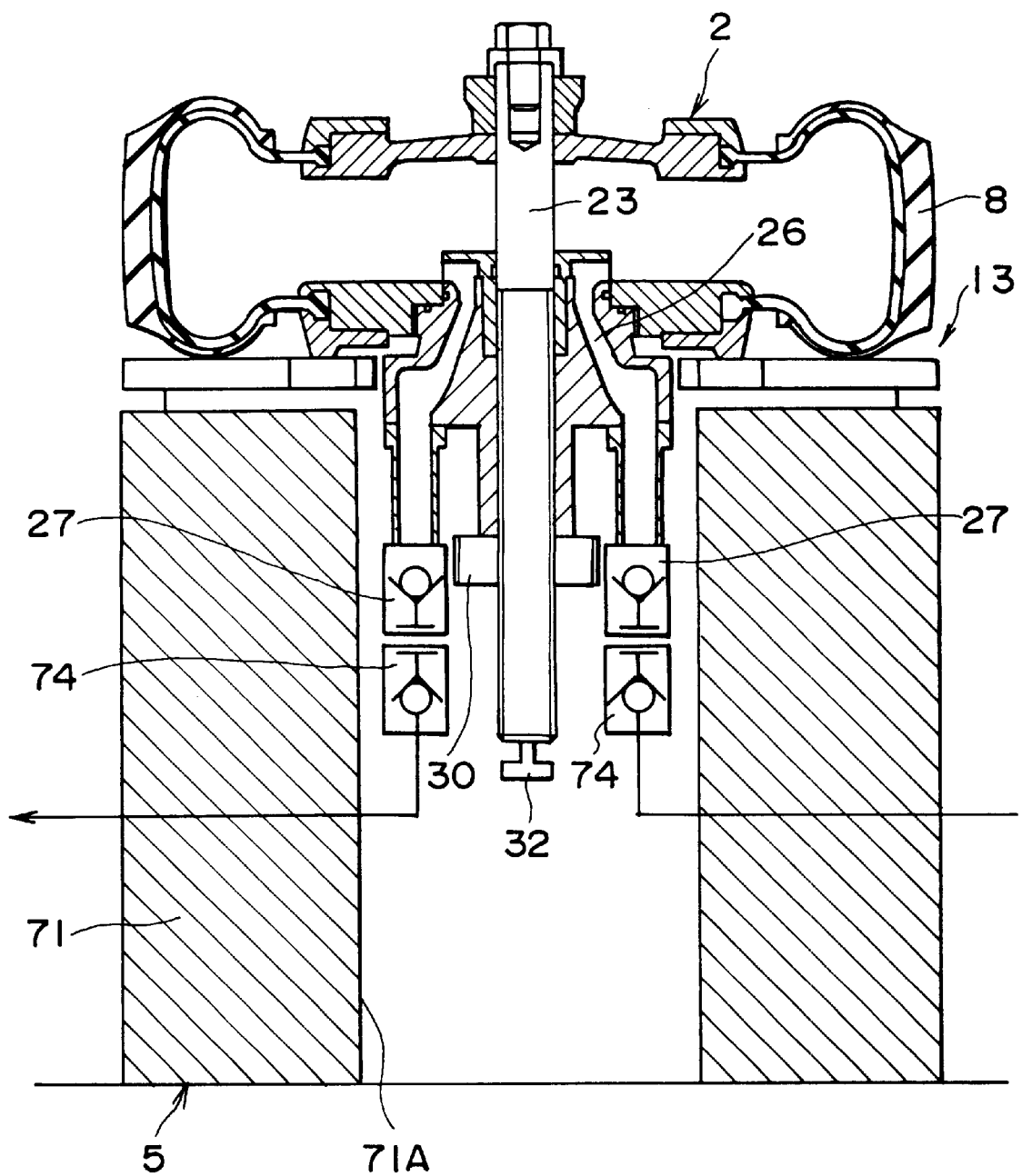
FIG. 8 is a sectional view showing the constitution of a tire unit in a tire vulcanizer.
Figure 9:
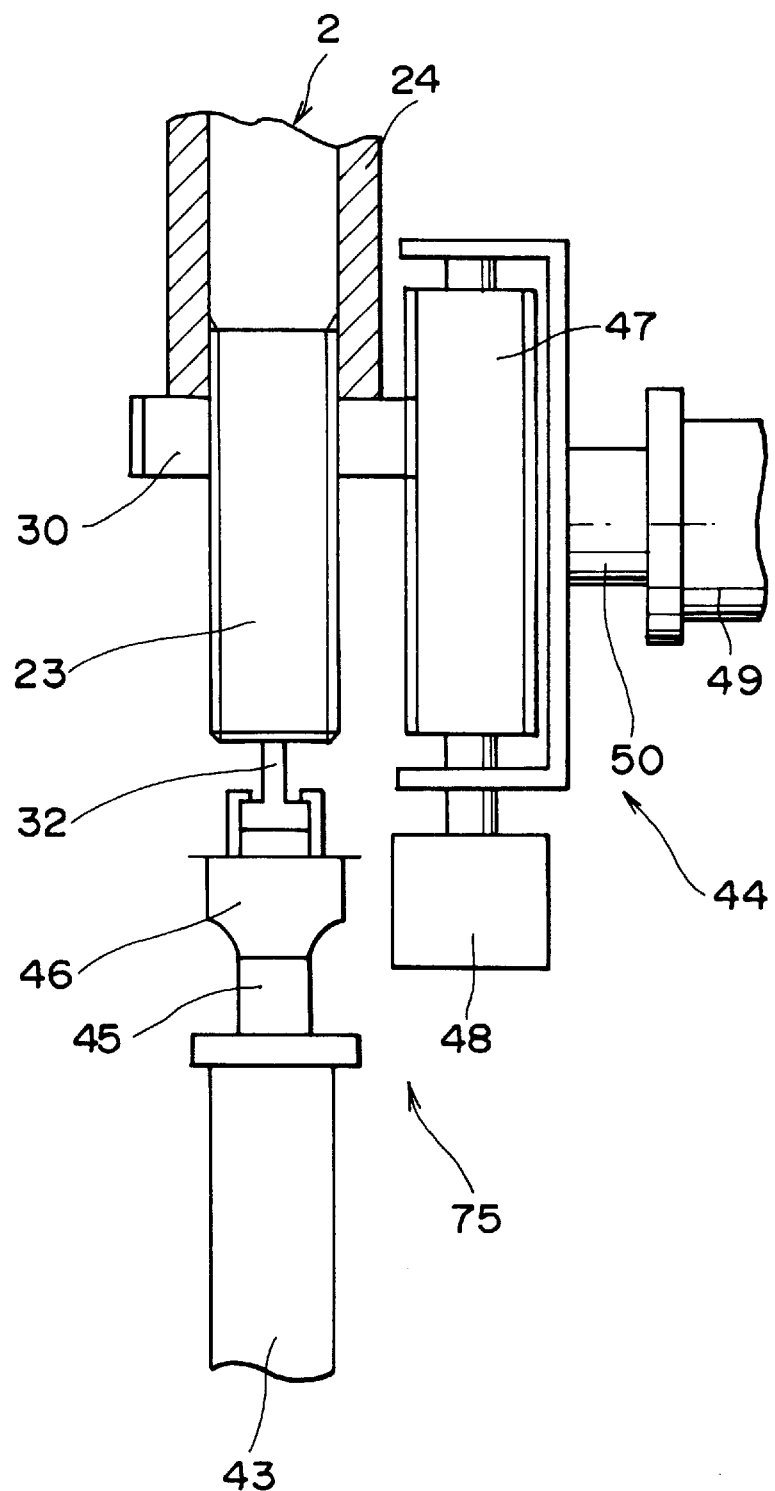
FIG. 9 is an enlarged view showing the constitution of a post driving device of a tire unit.

The tire unit 5 is juxtaposed to the pre-processing unit 3 forwardly of the press 4 to remove the vulcanized tire 8 from the bladder mechanism 2. The tire unit 5 comprises, as shown in FIG. 8, a tire removing stand 71 for supporting the bladder mechanism 2, an exhaust port for exhausting a remaining pressure internal gas within the bladder 20 of the bladder mechanism 2, and a post driving device 75 for raising the center post 23 of the bladder mechanism 2 as shown in FIG. 9. The tire removing stand 71 supports the carrying conveyor 13 to transfer the bladder mechanism 2 and is formed with a carrying out passage 71A for carrying out the lower end side (a bladder support 24, each connecting coupler 27, etc.) of the center post 23 of the bladder mechanism 2 from the interior (see FIG. 8).

The post diving device 75 has the same constitution as the post driving device 38 (see FIG. 5) of the pre-processing unit 3, as shown in FIG. 9, and comprises a driving cylinder 43 (including a chuck 46) for raising the center post 23, and a lock gear driving mechanism 44 (a pinion rod 47, a gear motor 48 and a cylinder 49 for forward and backward movement) for moving up and down the lock gear 30, which are arranged below the tire removing stand 71.

With this constitution, the tire unit 5 extends the rod 45 of the driving cylinder 43 of the post driving device 75 to hold the joint 32 of the center post 23 by the chuck 46 whereby the center post 23 is fixed (see FIG. 9). In this state, the pinion rod 47 is meshed with the lock nut 30 by the cylinder 49 for forward and backward movement of the lock gear driving mechanism 44, and the gear motor 48 is driven to rotate the pinion rod 47 whereby the lock gear 30 is moved down, after which the rod 45 of the driving cylinder 43 is extended to raise the center post 23 from the vulcanizing and molding position. With this, the bladder 20 of the bladder mechanism 2 is torn off from the vulcanized tire 8 to assume an extended state, and the vulcanized tire 8 is removed from the bladder mechanism 2 (see FIG. 17C). Simultaneously with the extension of the bladder 20, the remaining internal gas is exhausted outside the bladder 20 through the gas passage 26 of the bladder mechanism 2.

The carrying loaders 9 and 10 are provided with a tire chuck 80 for holding the upper bead portion V of the green tire 6 or the vulcanized tire 8 from the inside. The chuck 80 has not less than three pawls 81 for enlarging and contracting a diameter all together in a radial direction, and the pawl in the diameter-contracted state are inserted into the tires 6 and 8 to contract the diameter to hold the upper bead portion V of the tires 6, 8. The pawl 81 is again contracted in diameter to release the tires 6, 8. The carrying loader 9 is provided to be turned and moved up and down on a guide post 82 juxtaposed to the pre-processing unit 3, and the chuck 80 is provided at the end of a turning arm 82. With this constitution, the carrying loader 9 holds the green tire 6 delivered by the carrying conveyor 14 from the inside, after which it is carried to the pre-processing unit 3. The carrying loader 10 is provided to be turned and moved up and down on a guide post 84 provided forwardly of the tire unit 5, and the chuck 80 is provided at the end of a turning arm 85. With this constitution, the carrying loader 10 holds the vulcanized tire 80 of the tire unit 5 from the inside, after which it is carried to the carrying-out conveyor 15.

The carrying loaders 11, 12 are provided with a bladder chuck 86 for holding the holding ring 28 of the bladder mechanism 2. The carrying loader 11 is provided to be turned and moved up and down on a guide post 87 provided between the pre-processing unit 3 and the tire vulcanizing press 4, and a bladder chuck 86 is provided at the end of a turning arm 88. With this constitution the carrying loader 11 holds the holding ring 28 of the bladder mechanism 2 applied with the pre-vulcanizing and shaping by the pre-processing unit, and thereafter carries the preheated tire 7 and the bladder mechanism 2 to the tire vulcanizing press 4. The carrying loader 12 is provided to be turned and moved up and down on a guide support post 89 provided between the tire vulcanizing press 4 and the tire unit 5, and the bladder chuck 86 is provided at the end of a turning arm 90. With this constitution, the carrying loader 12 holds the holding ring 28 of the bladder mechanism 2 applied with the vulcanizing and molding by the tire vulcanizing press 4, and thereafter carries the vulcanized tire 8 and the bladder mechanism 2 to the tire unit 5.

Figure 10A:
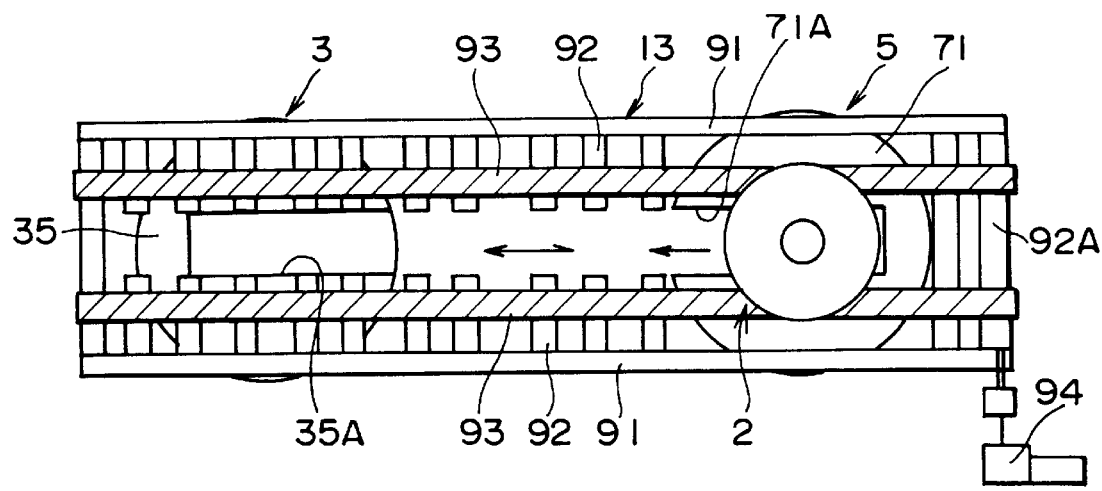
FIGS. 10A and 10B are views showing the constitution of a delivery conveyor in a tire vulcanizer.
Figure 10B:
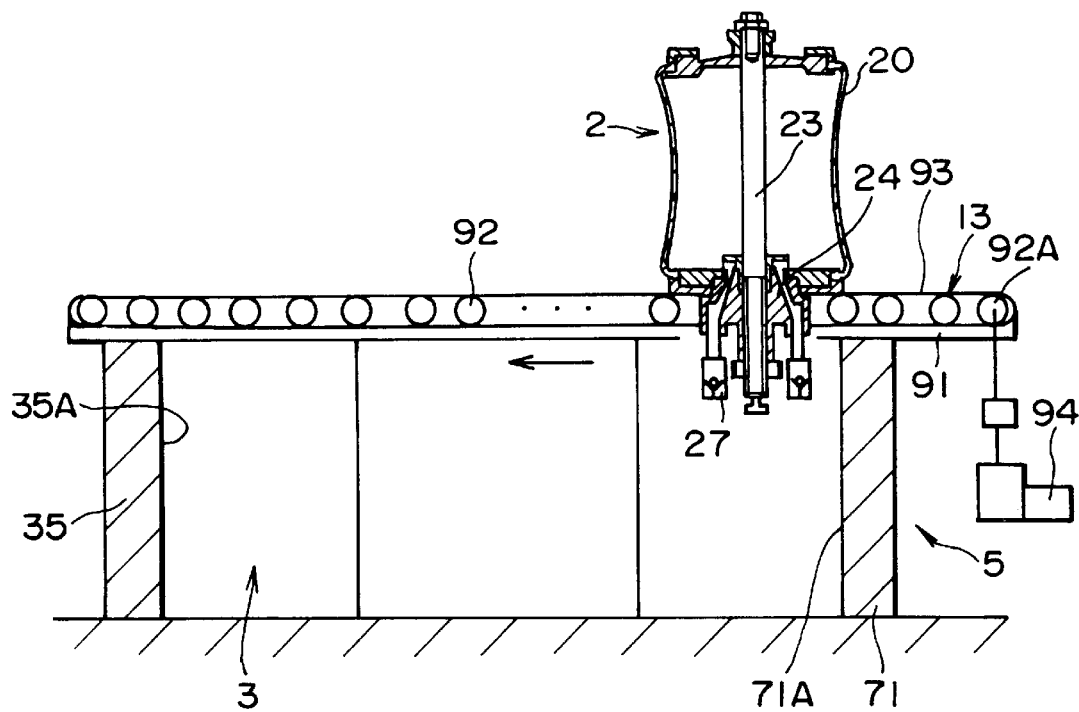

The carrying conveyor 13 is provided to carry the bladder mechanism 2 from the tire unit 5 to the pre-processing unit 3. For the carrying unit 13, as shown in FIG. 10, two support frame 91 supported by both sides of the carrying in passage 35A of the pre-processing unit 3 and both sides of the carrying out passage 71A of the tire unit 5 are provided, and each of the support frames 91 is provided with a row of rollers r comprising a plurality of rollers 92 at every predetermined pitch. Between the rollers 92 of the row of rollers r is formed a clearance through which the lower end sides (the bladder support 24, the connecting coupler 27, etc.) of the center post 23 of the bladder mechanism 2 are inserted. A carrying belt 93 (an endless belt) is extended over the row of rollers r. The carrying belt 93 is driven to be circulated by a motor 94 with a reduction gear connected to the driving roller 92A on the side of the tire unit 5.

With this constitution, the carrying conveyor 13 projects the lower end sides (the bladder support 24, the connecting coupler 27, etc.) of the center post 23 to the lower part from a clearance between the rollers 92 while supporting the lower clamp ring 22 of the bladder mechanism 2 on the conveyor belt 93. The motor with a reduction gear 94 is driven to circulate the carrying belt 93 whereby the bladder mechanism 2 is carried from the carrying out passage 71A of the tire unit 5 to the pre-processing unit 3 in an open state (see FIG. 10).

As means for carrying the bladder mechanism 2 from the tire unit 5 to the pre-processing unit 3, a carrying loader for chucking the holding ring 28 of the bladder mechanism 2 to turn and carry it may be used other than the use of the carrying conveyor 13.

The tire vulcanizing method by the tire vulcanizer 1 according to the first invention will be described hereinafter.

The green tire 6 is vulcanized and molded by applying the preheating and shaping thereto by the pre-processing unit 3 and then applying the vulcanizing and molding thereto by the tire vulcanizing press 4.

In the preheating and shaping by the pre-processing unit 3, the upper bead portion V of the green tire 6 on the carrying in conveyor 14 is held from the inside by the tire chuck 80 of the carrying loader 9 and carried to the pre-processing unit 3. Then, the carrying loader 9 is moved down to locate the green tire 6 in the outer periphery of the bladder 20 of the bladder mechanism 2. Each connecting coupler 27 of the bladder mechanism 2 is carried into the pre-processing unit 3 and automatically connected to each connecting coupler 41 (see FIGS. 11A and 11B).

Subsequently, in the state that the green tire 6 is located, the center post 23 (lock gear 30) is lowered to a shaping position by the driving cylinder 43 of the post driving device 38 whereby the bladder 20 is contracted from the extended state and enlarged in diameter, and then deformed so as to enter the inside of the green tire 6. In this state, the pinion rod 47 is meshed with the lock gear 30 by the cylinder 49 for forward and backward of the post driving device 38, after which the gear motor 48 is driven to move the lock gear 30 upward into contact with the lower end surface of the bladder support 24 thereby maintaining the shaping state of the bladder 20 (see FIG. 11C). After the pinion rod 47 or the like has been withdrawn from the lock gear 30 by the cylinder 49 for forward and backward, the low pressure heating gas is supplied into the bladder 20 from the gas supply source 37 whereby the bladder 20 is expanded into close contact with the inner periphery of the green tire 6 and applied with shaping (see FIG. 12A).

Upon completion of the shaping, the holding of the green tire 6 by the carrying loader 9 is released to withdraw it from the pre-processing unit 3, and the thick portion of the tread part R or the like is heated by the heating heater 36 while the tire 6 is held by the bladder mechanism 2. The shaping termed therein is to expand the bladder 20 from the inside of the tire 6 whereby the tire 6 is supported by the bladder mechanism 2 to put in order the shape of the preheated tire 7 introduced between the molds 55 and 56 of the tire vulcanizing press 4.

The carrying loader 9 is to carry the green tire 6 fed into the carrying in conveyor 14 again to the pre-processing unit 3 to shift it to the preheating and shaping, whereby the preheating by the pre-processing unit 3 and the vulcanizing and molding by the vulcanizing press 4 are simultaneously carried out.

Figure 12A:
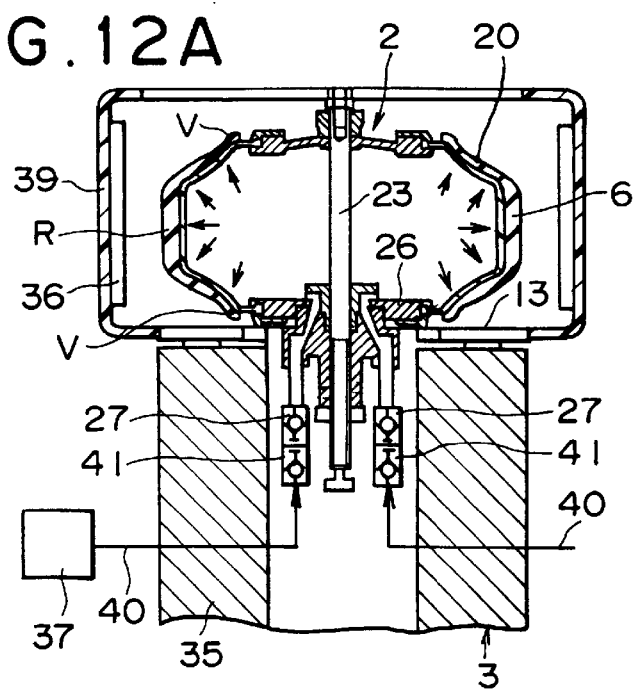
FIGS. 12A and 12B are views showing the procedure for applying pre-heating and shaping to a green tire to deliver the preheated tire.

Simultaneously with or after shaping, the preheating is applied to the thick portions of the tread part R and the upper and lower bead portions V from the outer periphery of the green tire by the heating heater 36 (see FIG. 12A).

The preheating condition is that the thick portions such as the tread part R are heated to a temperature immediately before the start of vulcanization, for example, to the range from 100 to 140° C. The heating time is the time in which the optimum temperature is selected, and the inner layer of the tread part R can be preheated (heated to 100 to 140° C.). The preheating condition is suitably changed according to the tire size or the like.

The preheating condition is decided also in consideration of the temperature rise from the bladder 20 side since the tread part R of the green tire 6 is heated, other than the heating from the outer periphery thereof, together with the bladder 20 by the low pressure heating gas. If the bladder 20 is elevated in temperature by the low pressure heating gas as described above, the bladder 20 need not be heated by the tire press. Particularly, the bladder 20 is a poor heat conductor which is poor in heat transfer rate relative to the green tire 6, and the heat-up time becomes prolonged. Accordingly, the preheating of the bladder 20 shortens the time for heating the preheated tire 7 up to the vulcanizing temperature by the tire vulcanizing press 4.

Figure 12B:
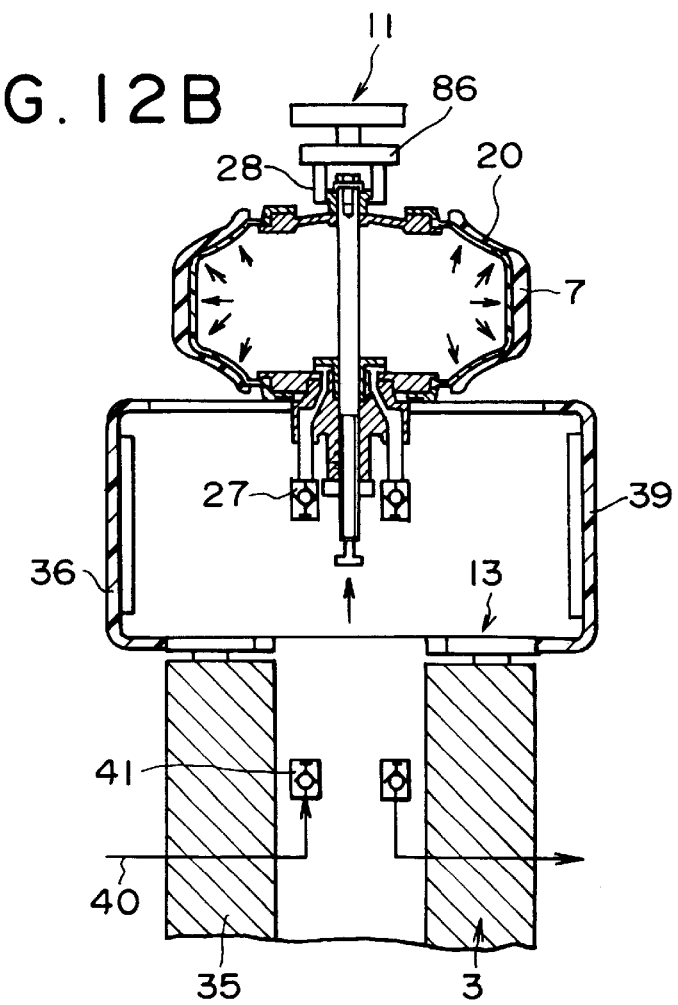

Upon completion of the preheating, the holding 28 of the bladder mechanism 2 is held by the bladder chuck 86 of the carrying loader 11 to carry the preheated tire 7 in the shaping state and the bladder mechanism 2 to the tire press 4 (see FIG. 12B).

At this time, each connecting coupler 27 of the bladder mechanism 2 is moved away from the connecting coupler 41, but the low pressure heating gas is prevented from escaping from the bladder 20 to maintain the shaping state by the valve function of the connecting coupler 27. Further, the preheated tire 7 is lowered in temperature by the atmosphere during carrying, but since the carrying by the carrying loader 11 is momentarily carried out, there is less influence caused by the lowering of temperature. Particularly, since the preheated tire 7 is heat-retained by the heating gas enclosed into the bladder 20, the tread part R or the like of the preheated tire 7 can be carried into the tire vulcanizing press 4 in the state of the vulcanizing start temperature.

Figure 13:
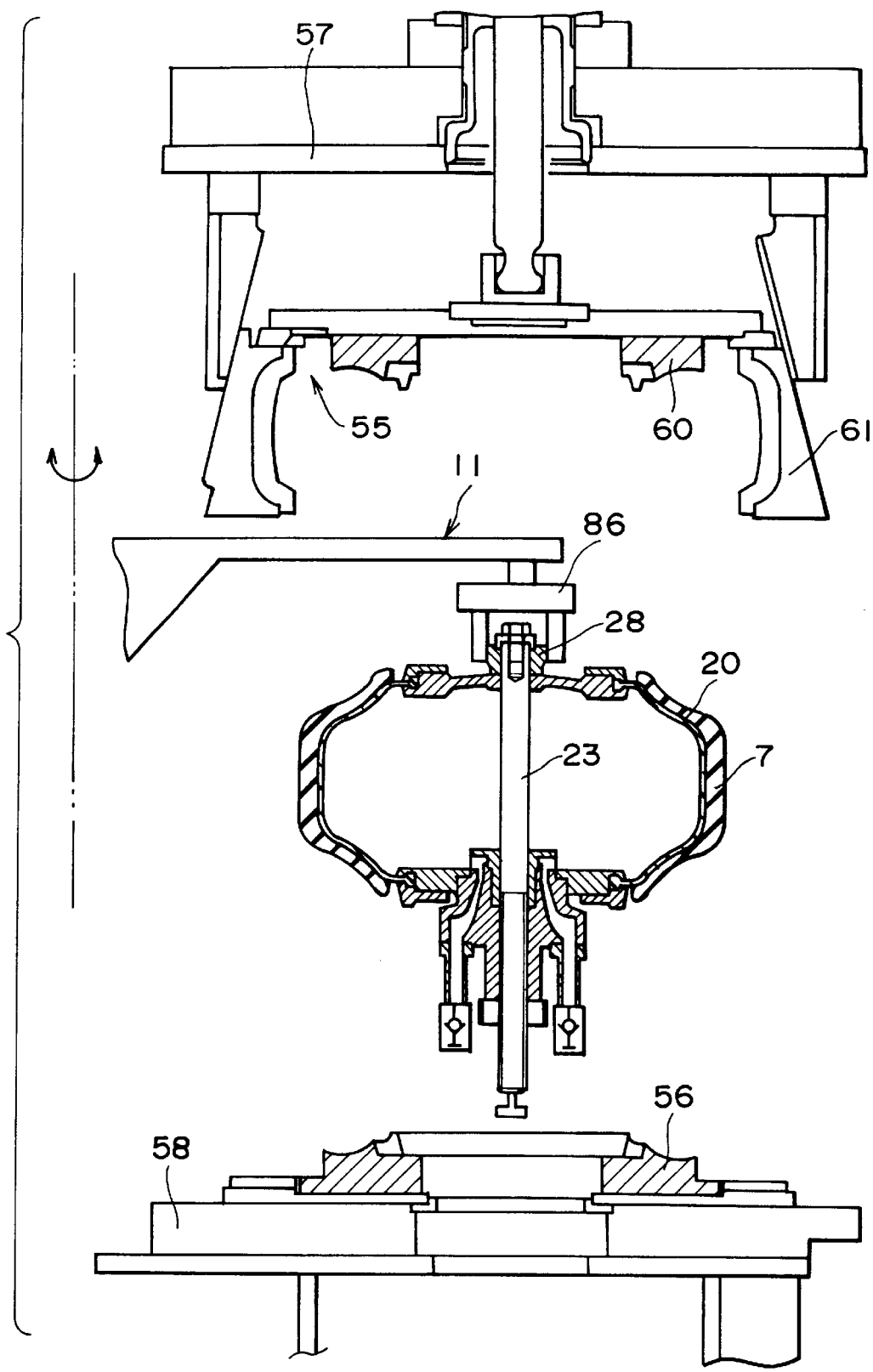
FIG. 13 is a view showing the procedure for carrying the preheated tire; and a bladder mechanism into a tire vulcanizing press.

In the vulcanizing and molding by the tire press 4, the carrying loader 11 is turned to carry the preheated tire 7 in the shaping state and the bladder mechanism 2 into and between the molds 55 and 56 in the open state (see FIG. 13).

Figure 14:
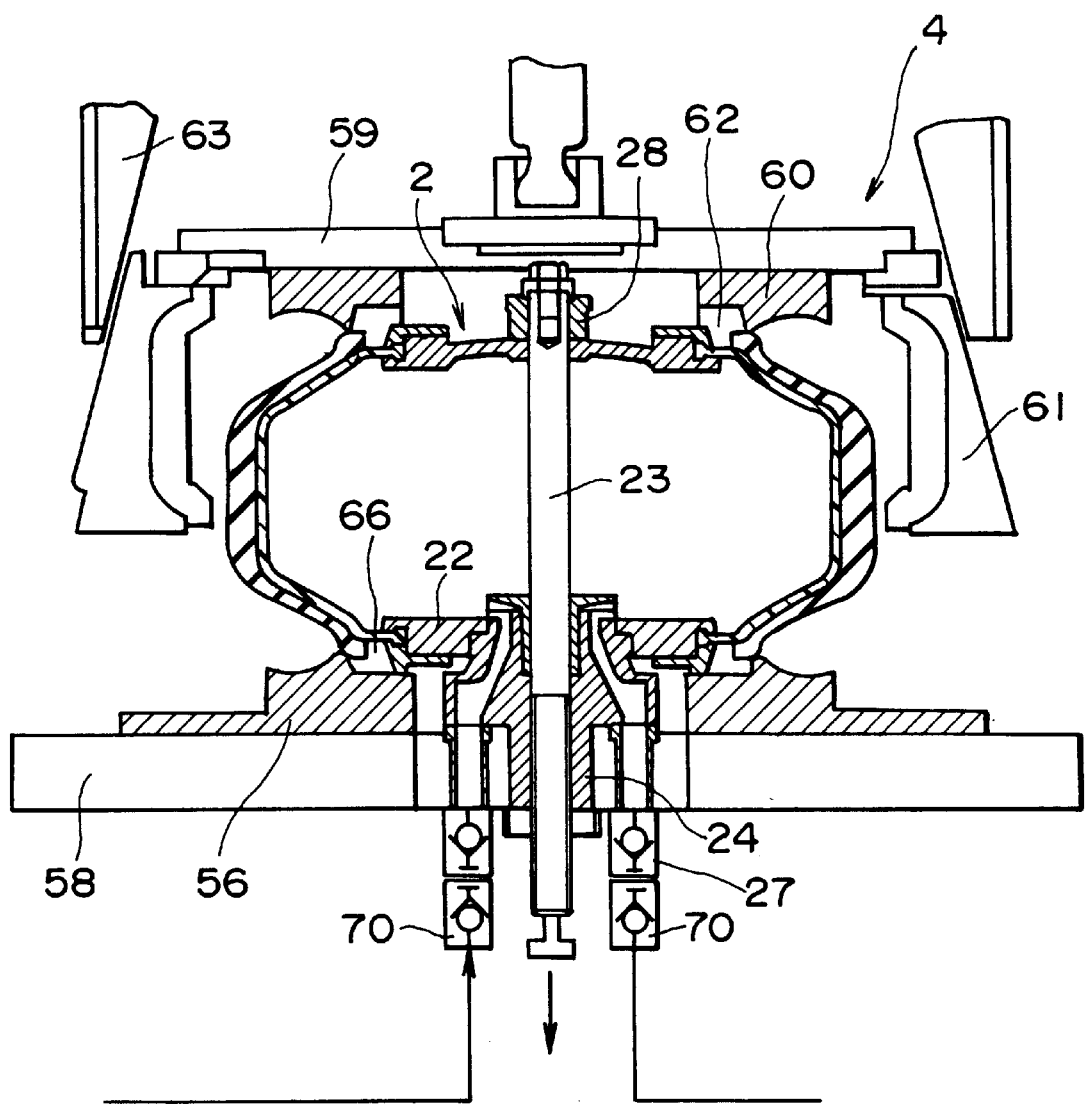
FIG. 14 is a view showing the procedure for mounting the preheated tire, and a bladder mechanism into a tire vulcanizing press.

Subsequently, the carrying loader 11 is moved down to mount and support the bladder mechanism 2 on the lower mold 56 and set the lower bead part V of the preheated tire 7 to the lower bead ring 66. With this, the lower end side (such as the bladder support 24, the connecting couplers 27) of the center post 23 of the bladder mechanism 2 is received into the lower mold 56, and the connecting couplers 27 are connected to the connecting couplers 70. After the carrying loader 11 has been withdrawn from the tire press 4, the upper mold plate 59 is moved down to place the segments of the tread mold 61 in the open state to be located in the outer periphery of the preheated tire 7. The center post 23 (lock gear 30) is also lowered by the downward movement of the upper mold plate 59, and the bladder 20 is deformed to be further contracted from the shaping state (see FIG. 14).

The preheated tire and the bladder 20 are in the shaping state, but the heating gas is sometimes somewhat escaped during the carrying, and therefore, a somewhat higher pressure heating gas than the pre-processing unit 3 may be enclosed into the bladder 20 as necessary.

Then, the upper platen 57 is moved down to close the segments of the tread mold 61 whereby the preheated tire 7 is mounted within the molds 55 and 56. At this time, since the upper mold plate 59 is also moved down along with the upper platen 57, the center post 23 (lock gear 30) is lowered to a position of the vulcanizing and molding. In the closed state of the upper and lower molds 55 and 56, the clamping force is loaded from the upper platen 57 side so that the molds 55 and 56 are not opened. Subsequently, a high pressure heating medium (such as a heating gas, steam, etc.) is supplied into the bladder 20 through the gas pipes 69 from the heat supply source 67, and the vulcanizing and molding are applied to the entire preheated tire 7 by the heating medium exerting on the bladder 20 (see FIG. 15A).

Since in the vulcanizing and molding, the thick portion of the preheated tire 7 is preheated to the temperature (100 to 140° C.) immediately before the start of vulcanizing, and the bladder 20 which is a poor heat conductor is also heated, the preheated tire 7 can be heated up to the vulcanizing temperature in a short period of time by the heating medium within the bladder 20 and the molds 55 and 56. Since the shaping is applied in advance to the green tire 6, the time for shaping and the heating of the bladder 20 are not necessary.

Accordingly, in the tire press 4, the entire preheated tire 7 is placed in the vulcanizing temperature in a short period of time and can be shifted to the vulcanizing caused by denature of rubber. Further, since the heating medium supplied into the bladder 20 functions so as to expand the bladder 20, the preheated tire 7 is pressed against the molds 55 and 56 by the expansion of the bladder 20 to mold it into the product shape.

Figure 15B:
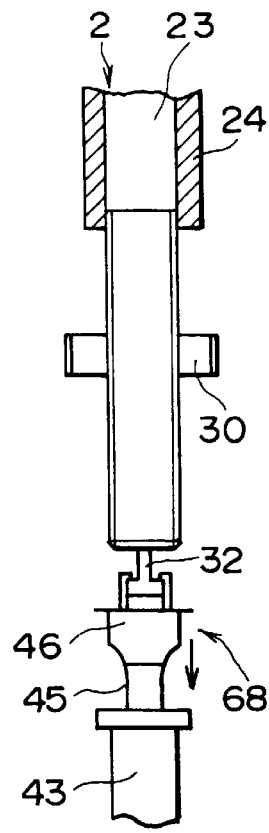

Upon completion of the vulcanizing and molding by the tire press 4, the chuck 46 is moved up by the driving cylinder 43 of the post driving deice 68, and the joint 32 is held by the chuck 46 to lock the center post 23 (see FIG. 15B). In this state, the pinion rod 47 is meshed with the lock gear 30 by the cylinder 49 for forward and backward of the lock gear driving mechanism 44, after which the gear motor 48 is driven to rotate the pinion rod 47 so that the lock gear 30 is brought into contract with the lower end surface of the bladder support 24 (see FIG. 15C). With this, the vulcanized tire 8 and the bladder 20 are maintained in the shape of vulcanizing and molding. After the pinion rod or the like is withdrawn from the lock gear 30 by the cylinder 49 for forward and backward, the upper platen 57 and the upper mold plate 59 are moved up to place the molds 55 and 56 in the open state, enabling the carrying out of the vulcanized tire 8 in the state of vulcanizing and molding and the bladder 2 (see FIG. 16).

Figure 16:
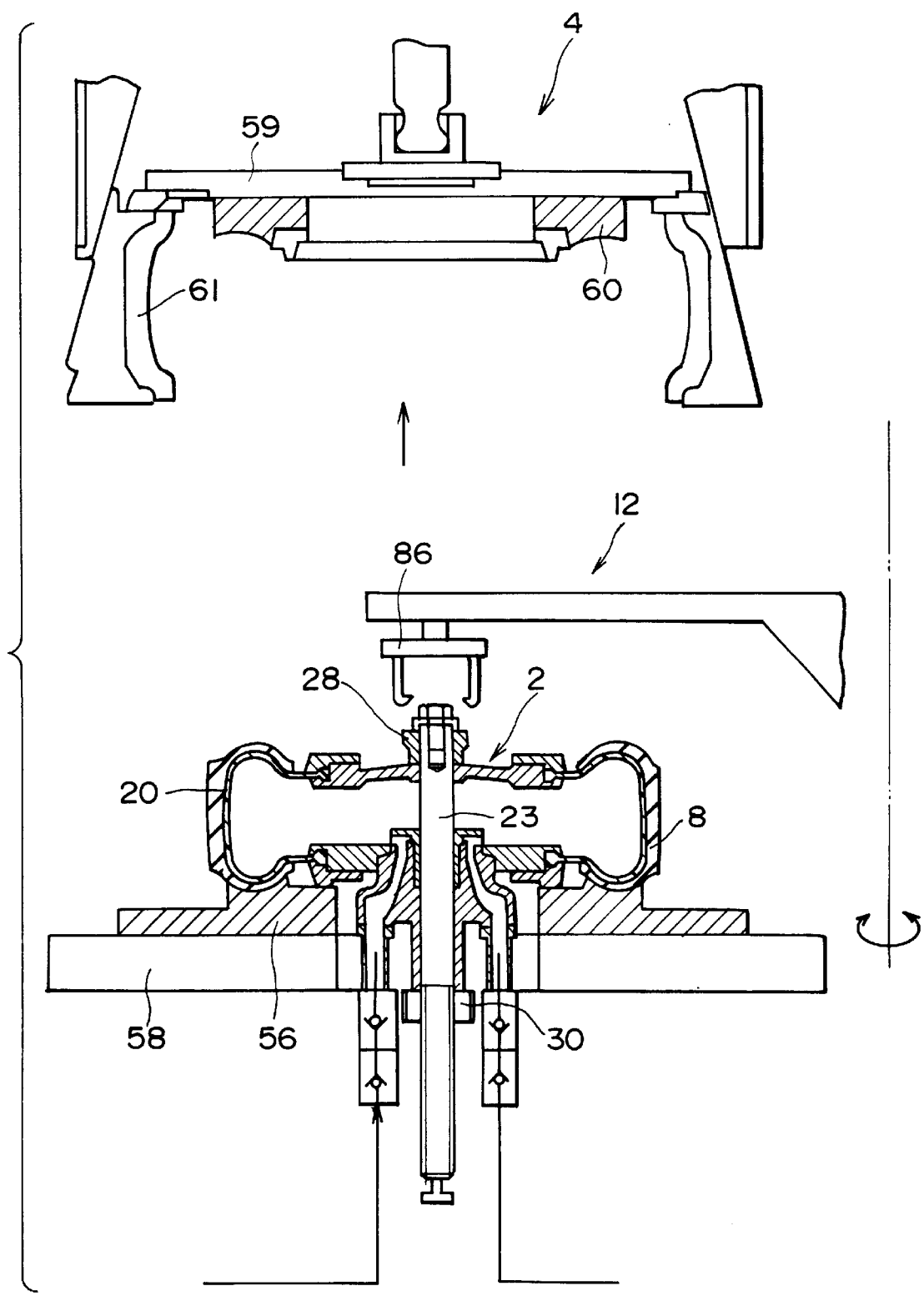
FIG. 16 is a view showing the procedure for delivering the preheated tire, and a bladder mechanism out of a tire vulcanizing press.

Subsequently, the carrying loader 12 is put between the molds 55 and 56 in the open state, and the holding ring 28 of the bladder mechanism 2 is held by the bladder chuck 86 of the carrying loader 12, after which it is carried at the tire unit 5 (see FIG. 16).

Figure 17A:
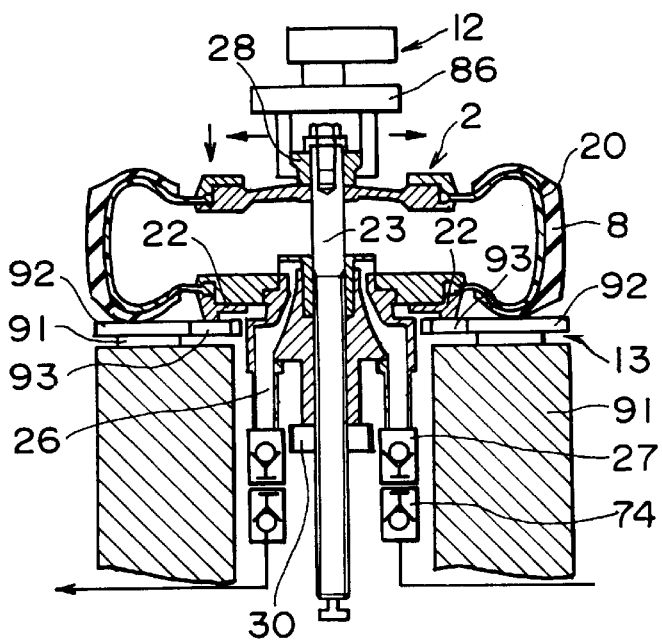
FIGS. 17A–17C are views showing the procedure for removing the vulcanized tire from a bladder mechanism.

The carrying by the carrying loader 12 is carried out in a manner that the lower clamp ring 22 of the bladder mechanism 2 is transferred to the carrying belt 63 of the carrying conveyor 13 on the tire unit 5 (see FIG. 17A).

Figure 17B:
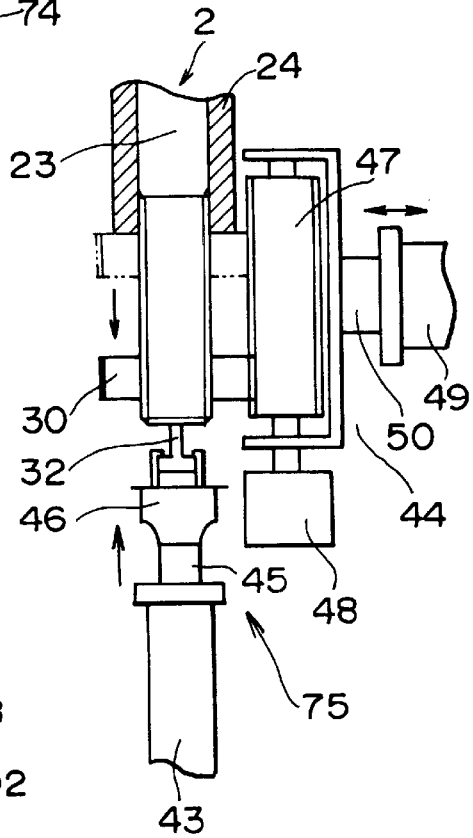
Figure 17C:
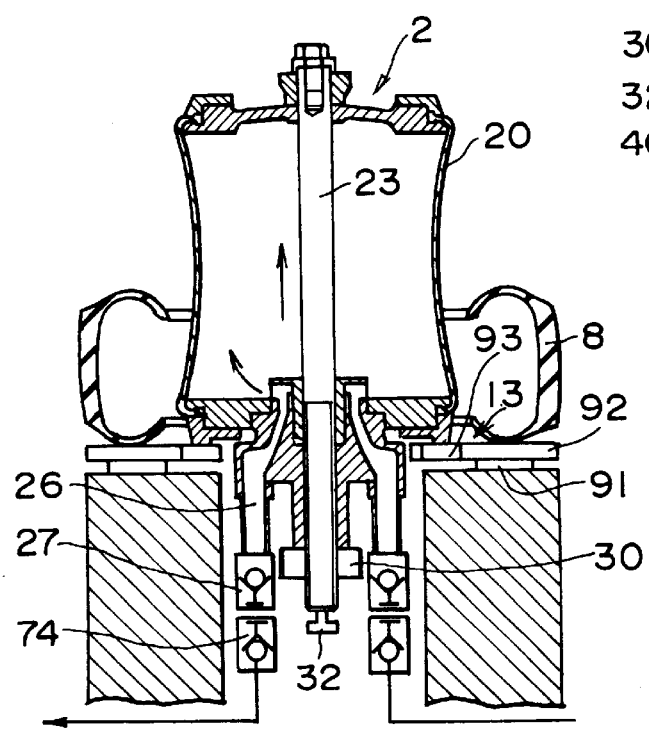

Subsequently, the chuck 46 is moved up by the driving cylinder 43 of the post driving device 75, and the joint 32 is held by the chuck 46 to lock the center post 23. In this state, the pinion rod 47 is meshed with the lock gear 30 by the cylinder 49 for forward and backward of the lock gear driving mechanism 44, the gear motor 48 is driven to rotate the pinion rod 47 whereby the lock gear 30 is moved down so as to be moved away from the bladder support 24. After the pinion rod 47 or the like has been withdrawn from the lock gear 30 by the cylinder 49 for forward and backward, the center post 23 (lock gear 30) is raised by the driving cylinder 46 to place the bladder 20 in the extended state from the state of vulcanizing and molding (see FIGS. 17B, 17C).

At this time, the bladder 20 is extended to be slipped out of the inside of the vulcanized tire 8 to release the shaping of the vulcanized tire 8. Simultaneously therewith, the residual internal gas is exhausted outside the bladder 20 whereby the vulcanized tire 8 can be removed easily (see FIG. 17C).

Figure 18:
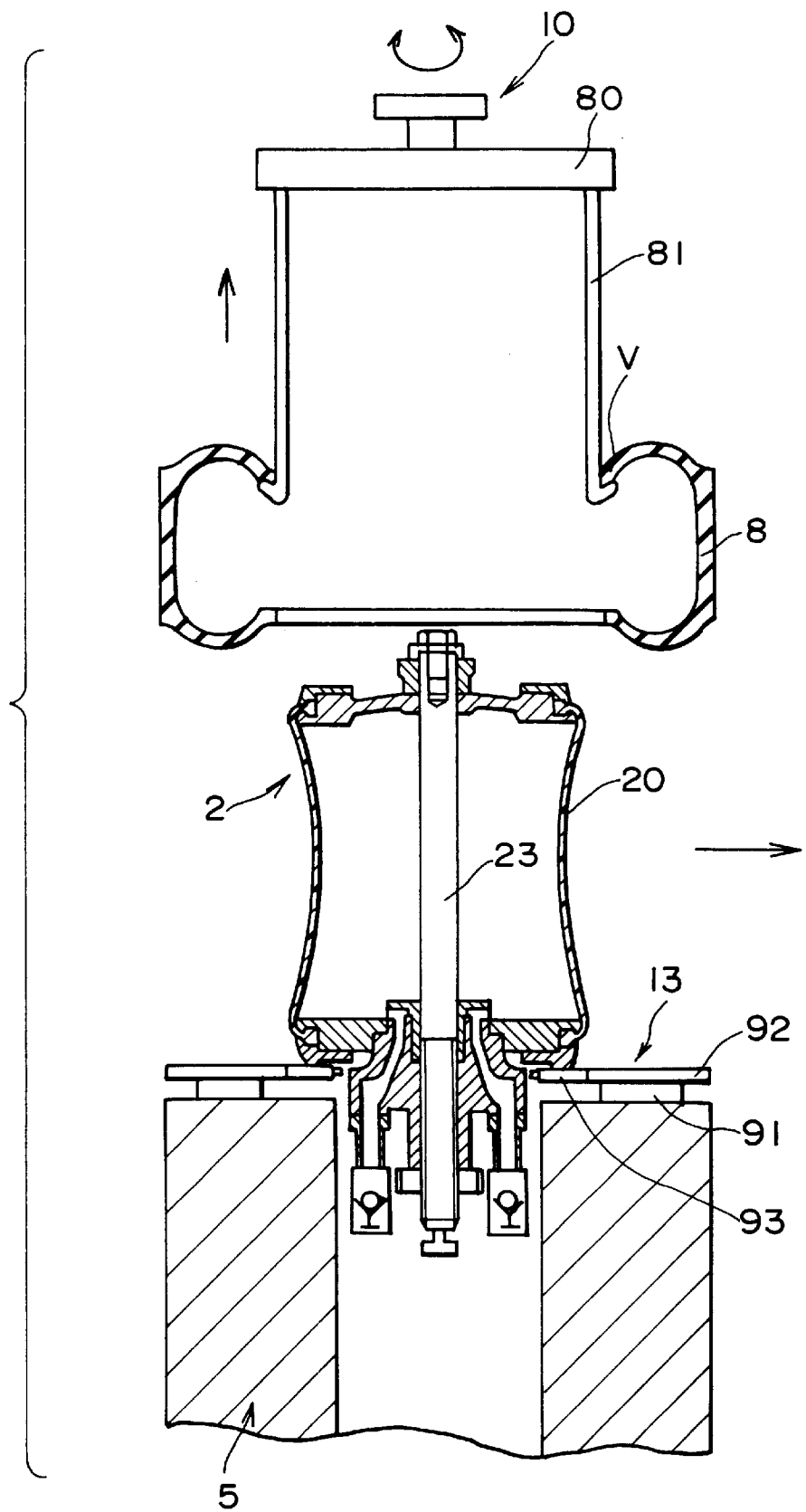
FIG. 18 is a view showing the procedure for delivering a bladder mechanism and delivering the vulcanized tire removed from the bladder mechanism.

The vulcanized tire 8 removed by the tire unit 5 is carried to the carrying out conveyor 15 while holding the upper bead part V of the vulcanized tire 8 by the tire chuck 80 of the carrying loader 10 (see FIG. 18). The vulcanized tire 8 is then carried to the succeeding step such as a post cure inflator by the carrying out conveyor 15.

The bladder mechanism 2 left on the tire unit 5 is carried at the pre-processing unit 3 by the carrying belt 93 moved to be circulated by the driving of the motor with a reduction gear 94 of the carrying conveyor 13, and received into the pre-processing unit 3 with the opening and closing door 39a placed in the open state (see FIG. 10).

With this, the bladder mechanism 2 is moved around in order of the pre-processing unit 3, the tire vulcanizing press 4 and the tire unit 5 and used for the preheating, shaping and vulcanizing and molding of a new green tire 6 to be carried to the pre-processing unit 3 again. When the bladder mechanism 2 is moved around, it is used for one heated by the tire vulcanizing press 4 or the like, and therefore, the time of the preheating by the pre-processing unit 3 can be shortened, and the energy for the preheating can be also reduced.

Figure 19:
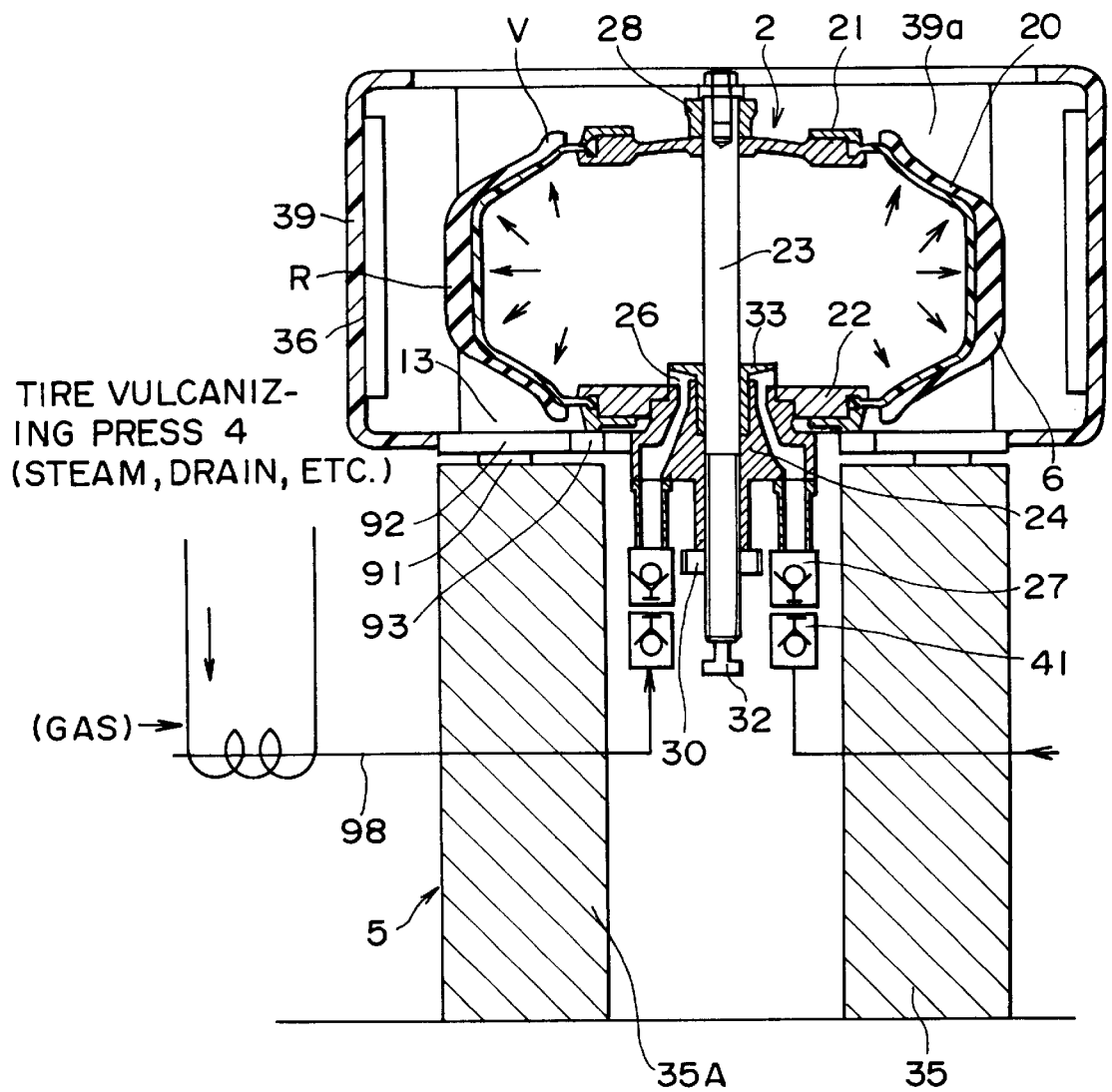
FIG. 19 is a sectional view showing a modification of the pre-processing unit.

The pre-processing unit 3 is not limited to one shown in FIG. 4, but as shown in FIG. 19, a normal-temperature gas is heated making use of a heating medium (such as steam, drain, etc.) discharged from the tire press 4, and the heating gas may be enclosed into the bladder 20 of the bladder mechanism 2 through the gas pipe 98. Since the waste heat of the heating medium discharged from the tire press 4 is utilized (recycle use), the efficient use of heat is possible, and the energy saving is attained.

While a description has been made of application of the preheating and shaping externally of the press 4, it is noted that the preheating is not applied to the green tire 6, but the bladder 20 may be heated by the heating gas while applying only the shaping.

In the following, the tire vulcanizing method and the tire vulcanizer according to the second invention will be described.

In the second invention, the tire vulcanizing press of the bladder type is used to apply the preheating to the green tire outside the press, and subsequently apply the vulcanizing and molding to the entire tire preheated by the tire vulcanizing press. With this, the time for restricting the tire by the press is shortened, and the productivity is improved while shortening the cycle time of the tire vulcanizing and molding.

In the following, the tire vulcanizer in the second invention will be first explained, and then the tire vulcanizing method will be described. In FIGS. 20 to 28, the same reference numerals shown in FIGS. 1 to 6 indicate the same members, detailed description of which is omitted.

Figure 20:
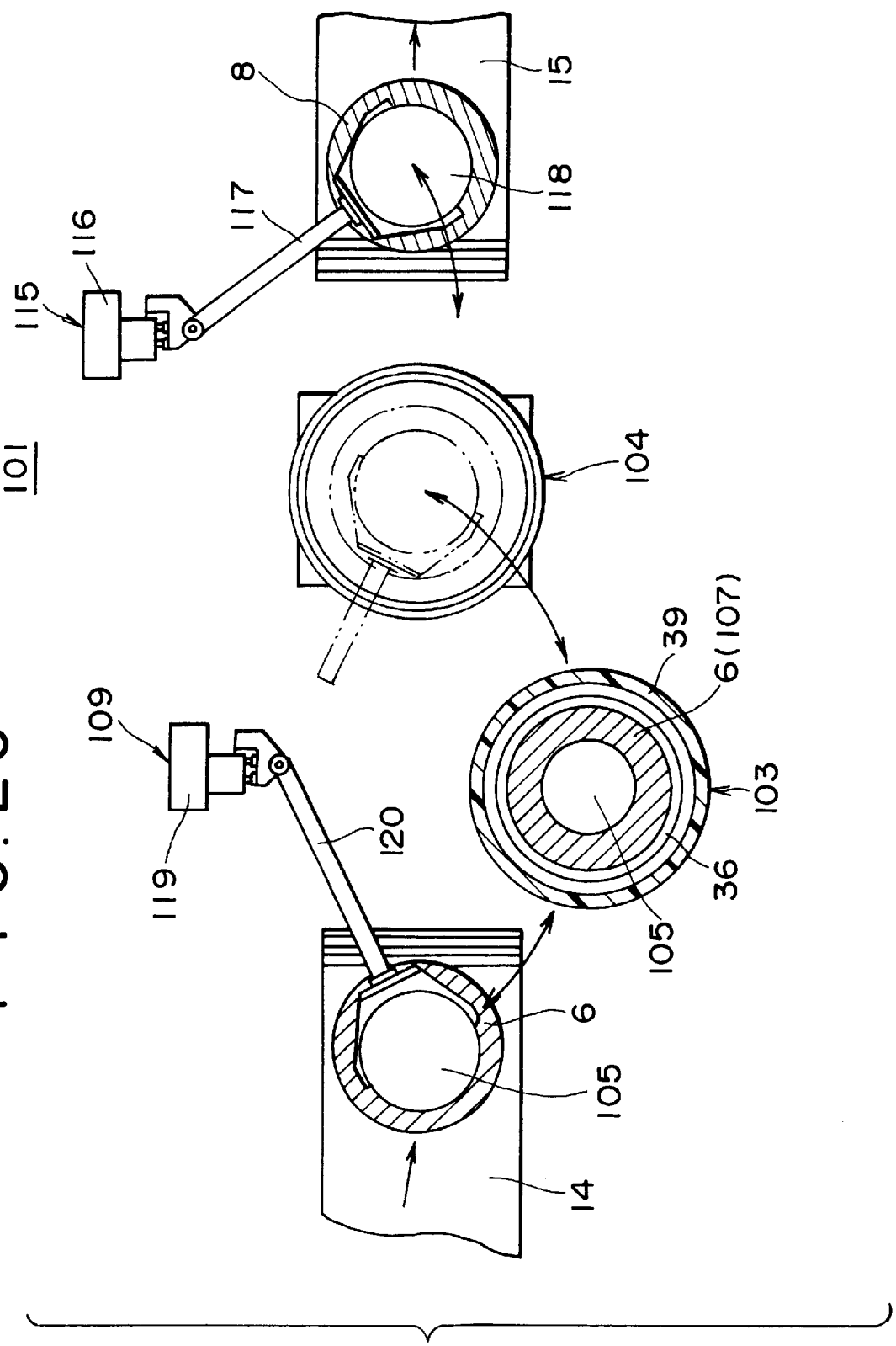
FIG. 20 is a top view showing the whole constitution of a tire vulcanizer according to a second invention.
Figure 21:
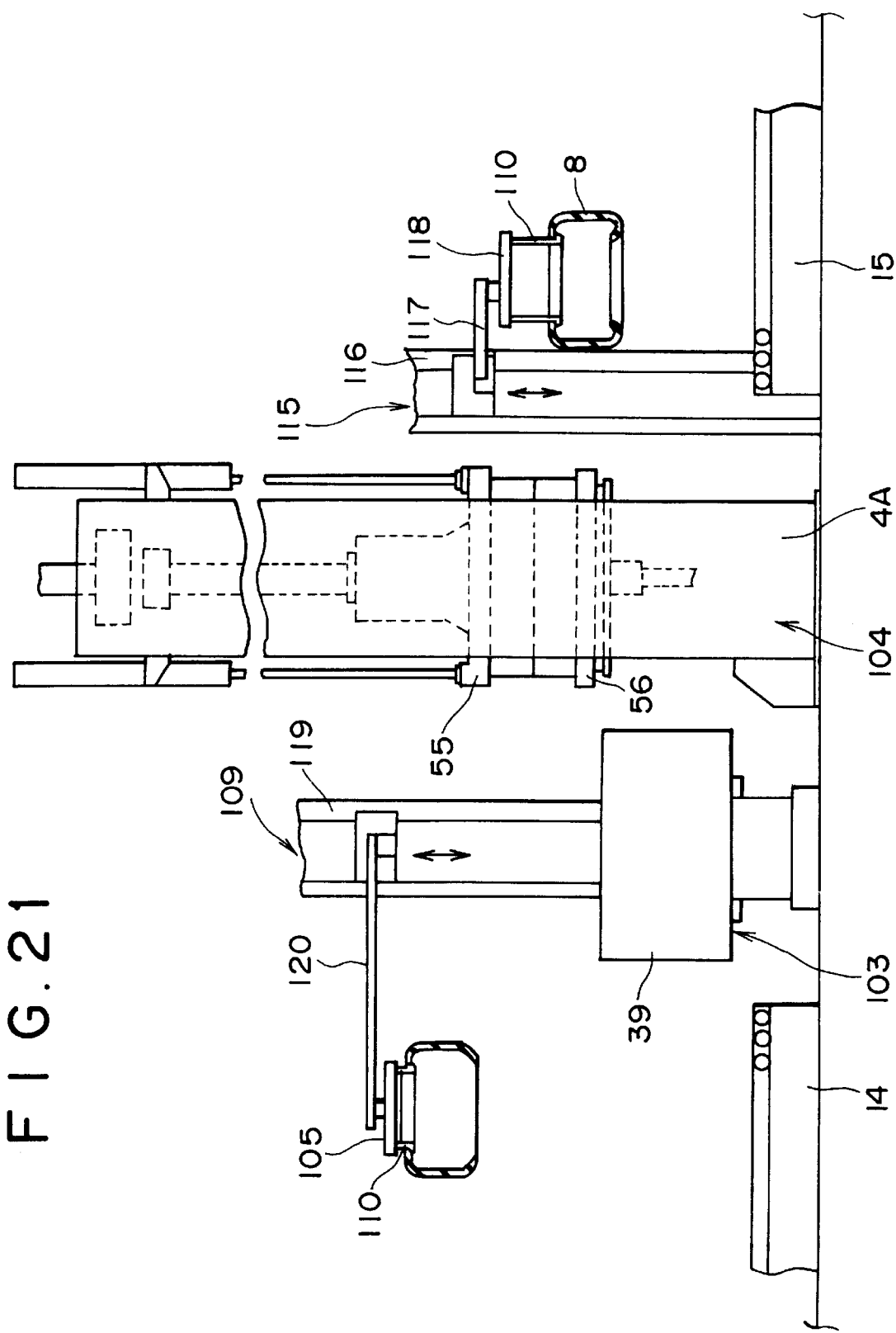
FIG. 21 is a view taken on B—B of FIG. 20, and a side view showing the whole constitution of a tire vulcanizer.

A tire vulcanizer 101 shown in FIGS. 20 and 21 comprises a pre-processing unit 103 for applying preheating to a green tire 6, a bladder type tire vulcanizing press 104 for applying vulcanizing and molding to the entire preheated tire 107 (hereinafter referred to as "preheated tire 107"), and a carrying loader 109 for carrying the green tire 6 or the like.

Figure 22:
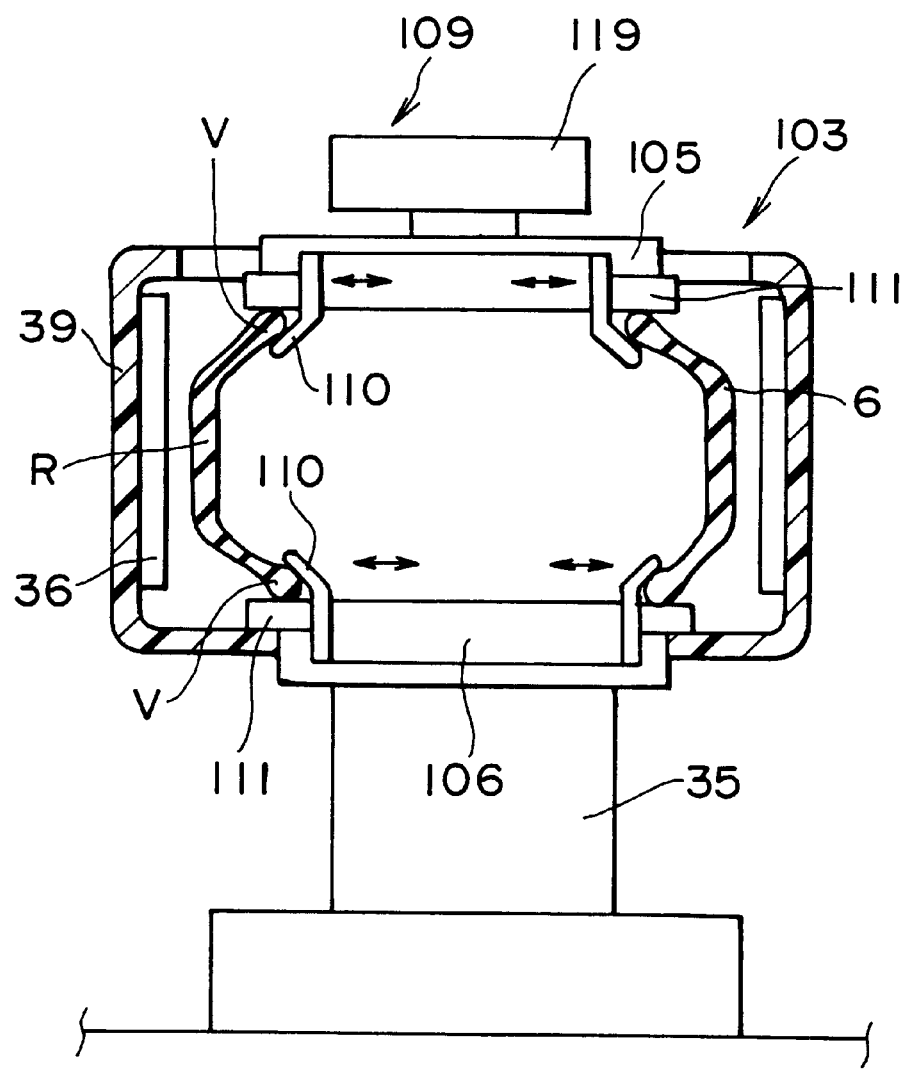
FIG. 22 is a sectional view showing the constitution of a pre-processing unit in a tire vulcanizer.

The pre-processing unit 103 is provided forwardly of the press 104 to apply preheating to the green tire 6. This pre-processing unit 103 is composed, as shown in FIG. 22, two upper and lower tire chucks 105 and 106 for holding upper and lower bead portions V of the green tire 6, and a heating heater 36 for heating the outer periphery of the green tire 6. The upper tire chuck 105 is jointly used as one provided at the extreme end of a turning arm 120 of a carrying loader 109 to carry the green tire 6, and the lower tire chuck 106 is provided on a bladder support stand 35 so as to oppose to the upper tire chuck 105. The chucks 105 and 106 have three pawls 110 or more enlarged in diameter all at once in a radial direction, and the pawl 110 in a diameter contracted state is inserted to be enlarged in diameter into the green tire 6, and the bead part V of the tire 6 is held between upper and lower rims 111. The heating heater 36 is provided in the inner periphery of a heat insulating container 39 provided on the bladder support stand 35 to heat the thick portions of the tread portion V and the bead portions V from the outer periphery of the green tire 6 received into the heat insulating container 39 (see FIG. 22).

With this constitution, in the pre-processing unit 103, the green tire 6 is held within the heat insulating container 39, and thereafter, the green tire 6 is heated from its outer periphery by the heating heater 36 to apply the preheating to the thick portions of the tread part R or the like (see FIG. 22).

Figure 23:
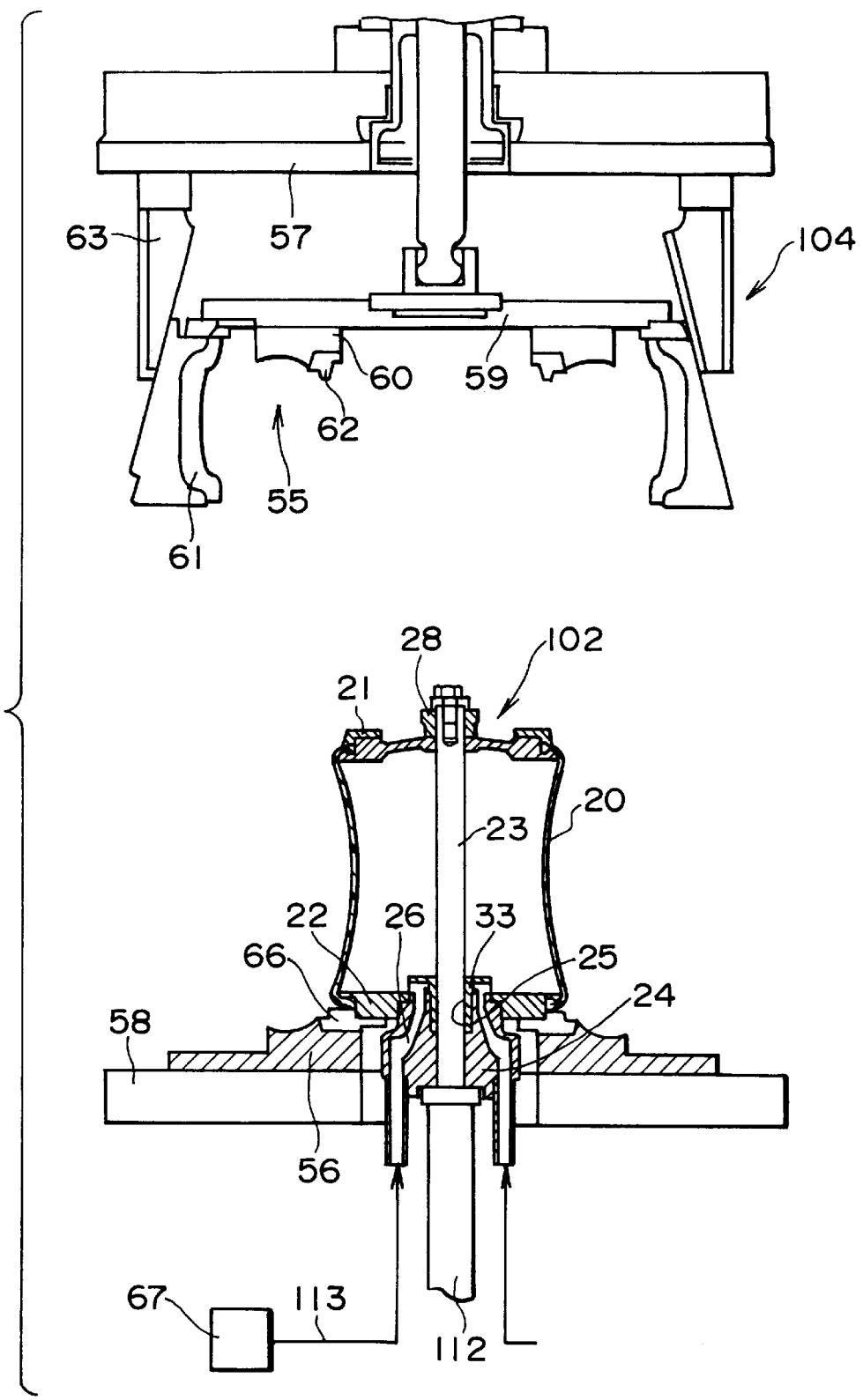
FIG. 23 is a sectional view showing the constitution of a tire vulcanizing press in a tire vulcanizer.

The bladder type tire vulcanizer 104 (hereinafter referred to as "tire vulcanizing press 104") comprises, as shown in FIG. 23, a bladder mechanism 102 in addition to the upper and lower molds 55, 56, and upper and lower platens 57, 58 similar to those shown in FIG. 6, to apply the vulcanizing and molding to the entire preheated tire 107. The bladder mechanism 102 comprises a bladder 20, a center post 23 and a bladder support 24 clamped and held by upper and lower clamp rings 21, 22 similar to those shown in FIG. 3 so that the center post 23 is lowered by an elevating cylinder 112. In the bladder mechanism 102, the lower clamp ring 22 is secured to a lower bead ring 66 of the lower mold 56, and the bladder support 24 and the elevating cylinder 112 are arranged below the lower mold 56 and mounted on the press 104. The center post 23 is jointly used by a rod of the elevating cylinder 112, and slidably extends through a movable hole 25 of the bladder support 24 and further extends through the bladder 20 to be projected externally of the upper clamp ring 21. The center post 23 is supported on the upper clamp ring 21 through a holding ring 28. Gas passages 26 of the bladder support 24 are connected directly to a heat supply source 67 through gas pipes 113 (see FIG. 23).

Figure 26:
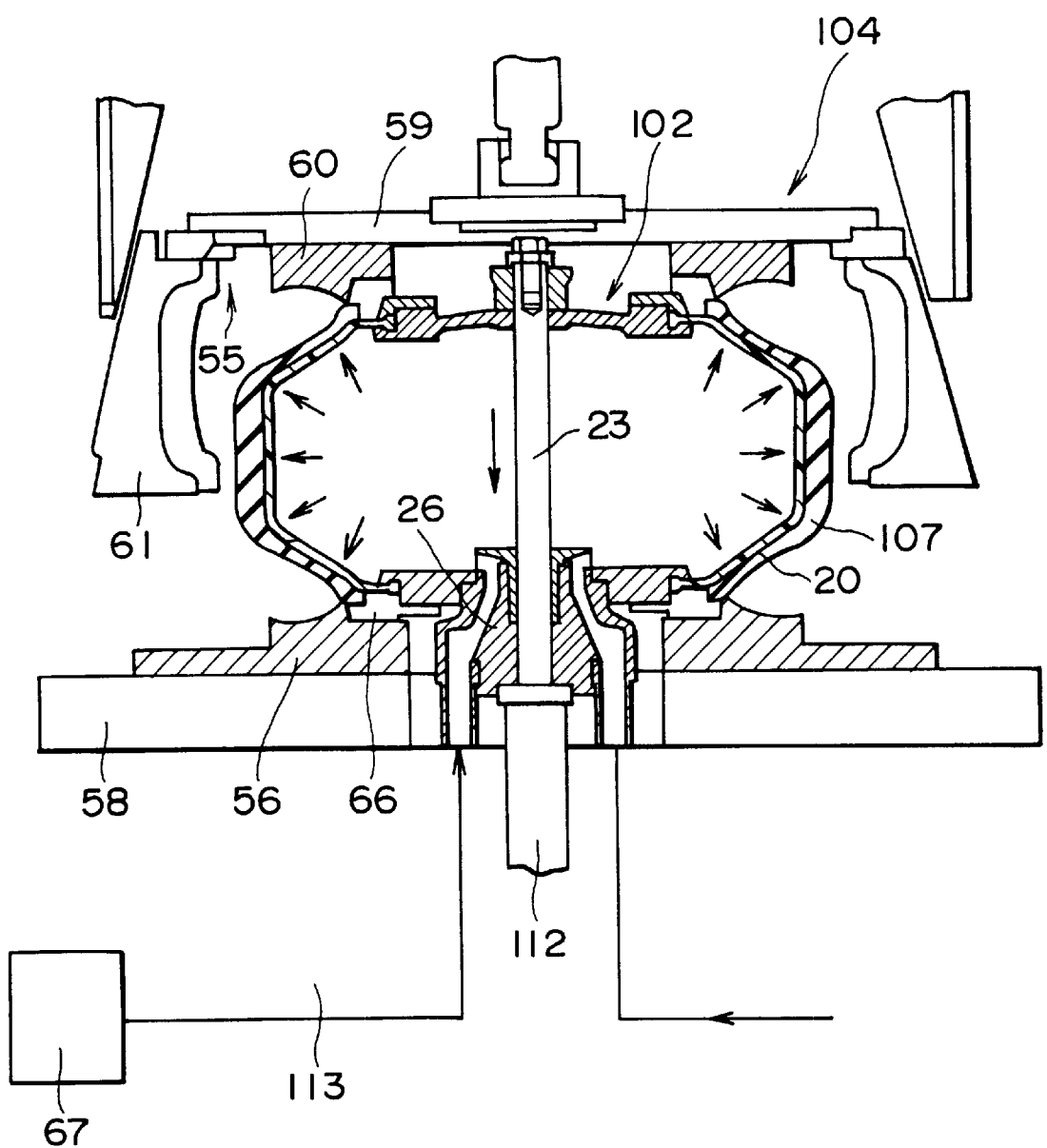
FIG. 26 is a view showing the procedure for applying shaping to the preheated tire.
Figure 27:
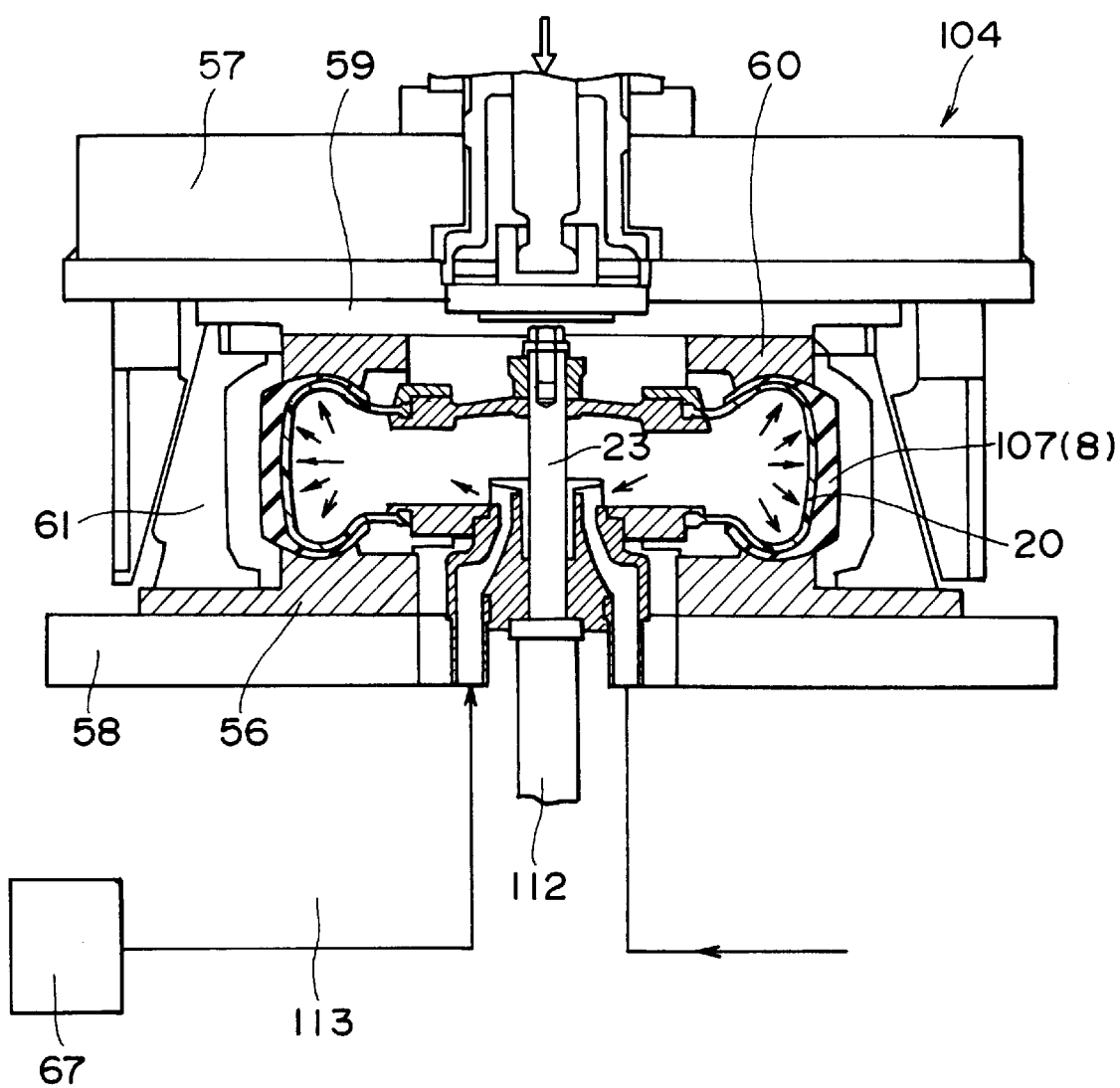
FIG. 27 is a view showing the procedure for applying vulcanizing and molding to the preheated tire.

With this constitution, in the press 104, the center post 23 is lowered to a position of the shaping by the elevating cylinder 112 to contract and deform the bladder 20 into a diameter enlarged state, in which state the low pressure heating gas is enclosed into the bladder 20 from the gas passage 26 of the bladder mechanism 102 whereby the bladder 20 is brought 8into close contact with the inner periphery of the green tire 6 to apply shaping thereto (see FIG. 26). Subsequently, the center post 23 is further lowered to position of the vulcanizing and molding, a high pressure heating medium (heating gas, steam, etc.) is supplied into the bladder 20 through the gas passage 26 of the bladder mechanism 102 from the heat supply source 67. The bladder 20 is further contracted to be enlarged in diameter, and the preheated tire 107 is pressed against the molds 55, 56 in the closed state by the expansion of the bladder 20 to mold it into the product shape and to apply the vulcanizing thereto with the denature of rubber caused by heating (see FIG. 27).

The vulcanized tire 8 subjected to vulcanizing and molding by the press 104 is carried out to the carrying out conveyor 15 by the turning and upward movement of the carrying out unloader 115, and fed into the succeeding step such as a post cure inflator by the carrying out conveyor 15. The unloader 115 is provided to be turned and moved up and down on a guide support post 116 juxtaposed at the rear of the tire vulcanizing press 104, and a tire chuck 118 similar to the upper tire chuck 105 is provide at the extreme end of the turning arm 117 (see FIGS. 20 and 21).

The carrying loader 109 is provided to be moved up and down and turned on the guide support post 119 juxtaposed to the pre-processing unit 103. The carrying loader 109 has an upper tire chuck 105 of the pre-processing unit 103 at the extreme end of a turning arm 120 and is jointly used with to hold the green tire 6 by the pre-processing unit 103. With this constitution, the carrying loader 109 holds from the inside the upper bead portion V of the green tire 6 fed into the carrying in conveyor 14, and thereafter carried to the pre-processing unit 103, and the preheated tire 107 is carried from the pre-processing unit 103 to the tire press 104.

The tire vulcanizing method by the tire vulcanizer 101 according to the second invention will be described hereinafter.

The green tire 6 is vulcanized and molded by applying the preheating thereto by the pre-processing unit 103, and then applying the vulcanizing and molding thereto by the press 104.

In the preheating by the pre-processing unit 103, the upper bead portion V of the green tire 6 on the carrying in conveyor 14 is held from the inside by the tire chuck 105 of the carrying loader 109 and carried to the pre-processing unit 3. The carrying loader 109 is moved down to receive it into the heat insulating container 39 (see FIGS. 24A and 24B).

Figure 24A:
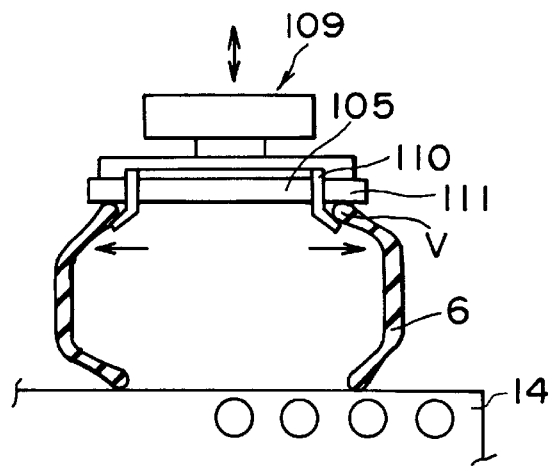
FIGS. 24A–24C are views showing the procedure for receiving a green tire into a pre-processing unit to apply pre-heating thereto.
Figure 24B:
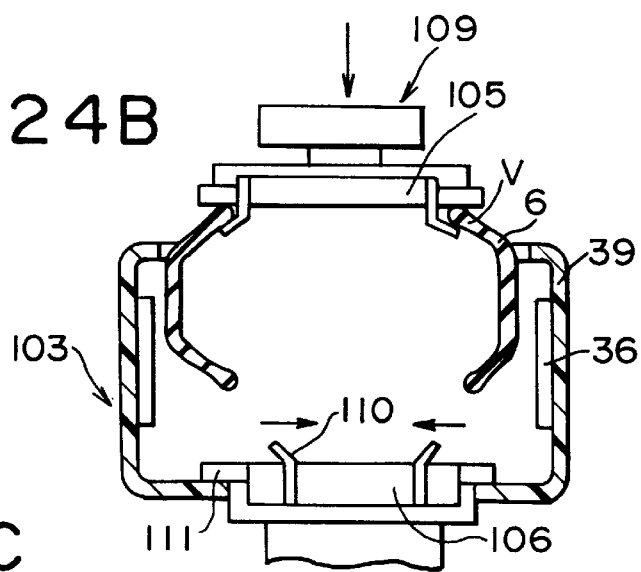
Figure 24C:
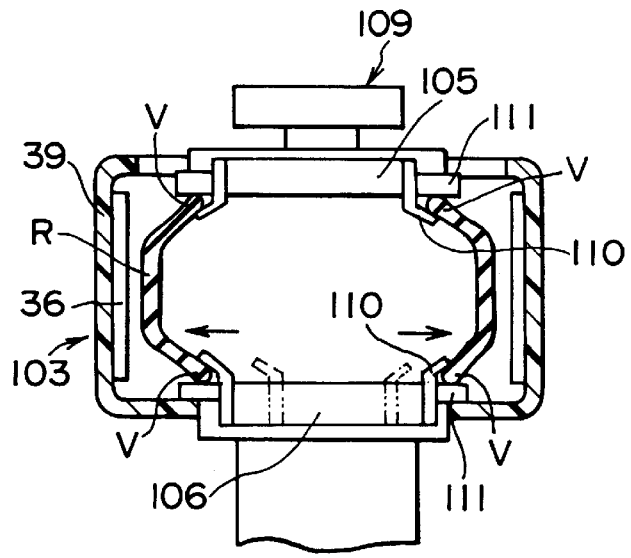

Subsequently, in the state that the green tire 6 is held by the carrying loader 109, the lower bead portion V is held by the lower tire chuck 106 of the pre-processing unit 103, after which the preheating is applied to the thick portions of the tread portion V and the upper and lower bead portions from the outer periphery of the green tire 6 by the heating heater 36 (see FIG. 24C).

The preheating condition is that the thick portions such as the tread part R are heated to a temperature immediately before the start of vulcanization, for example, to the range from 100 to 140° C. The heating time is the time in which the optimum temperature is selected, and the inner layer of the tread part R can be preheated (heated to 100 to 140° C.). The preheating condition is suitably changed according to the tire size or the like.

Figure 25:
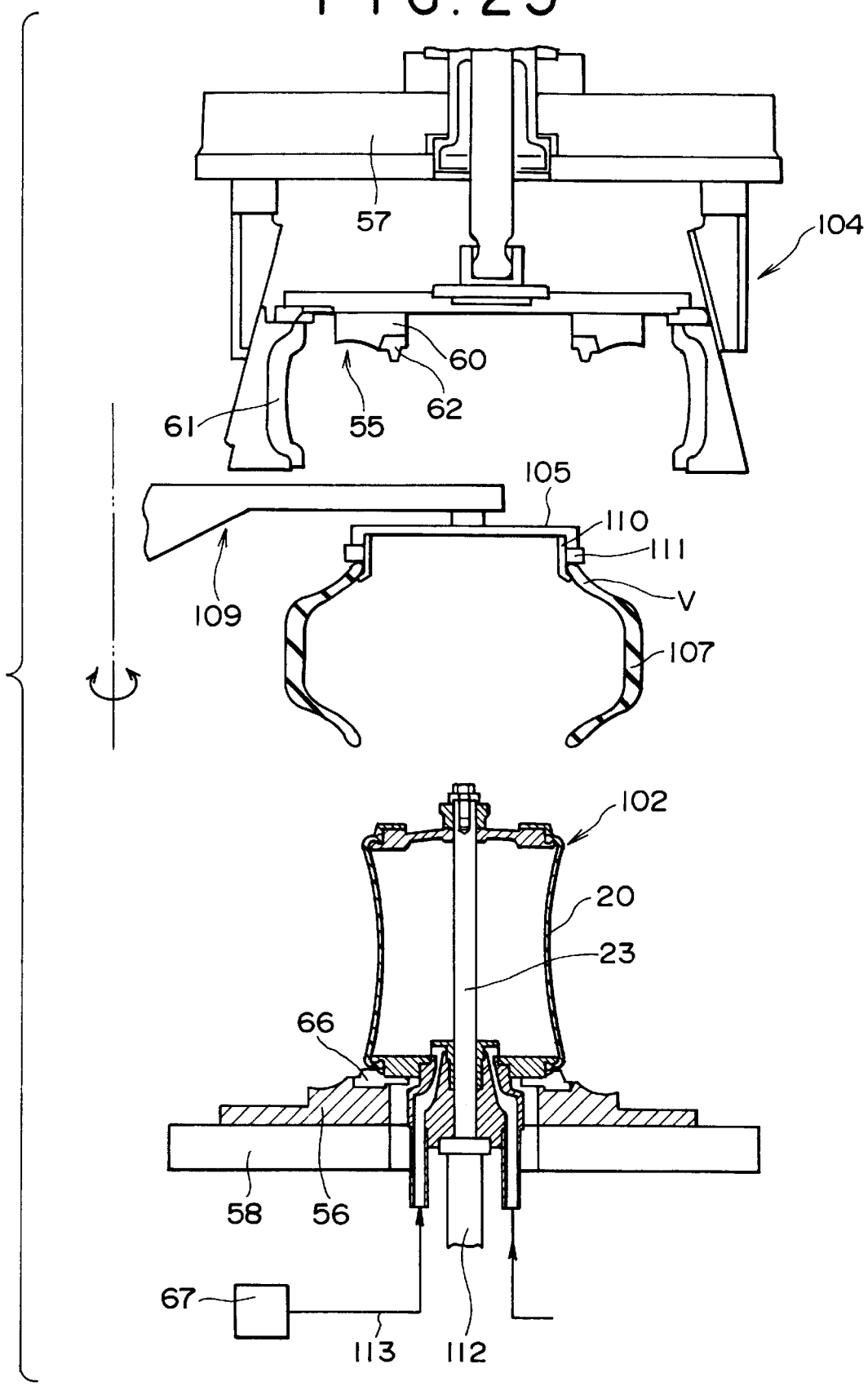
FIG. 25 is a view showing the procedure for carrying the preheated tire into a tire vulcanizing press.

Upon completion of the preheating, the preheated tire 107 is carried to the press 104 by the carrying loader 109 (see FIG. 25).

At this time, the preheated tire 107 is lowered in temperature by the atmosphere during the carrying, but there is less influenced by the lowering of temperature since the carrying by the carrying loader 109 is momentarily carried out.

In the vulcanizing and molding by the press 104, the carrying loader 109 is turned to carry the preheated tire 107 into and between the molds 55 and 56 in the open state (see FIG. 25).

Subsequently, the carrying loader 109 is moved down to locate the preheated tire 17 in the outer periphery of the bladder 20 in the extended state, and the lower bead portion V of the preheated tire 107 is set to the lower bead ring 66. In the state that the preheated tire 107 is held by the carrying loader 109, the center post 23 is lowered to the shaping position by the elevating cylinder 112, and the bladder 20 is contracted from the extended state to be enlarged in diameter into the shaping state moved into the green tire 6. Simultaneously therewith, the heating gas is enclosed into the bladder 20 from the heat supply source 67 to expand the bladder 20, and the bladder 20 is brought into close contact with the inner periphery of the preheated tire 107 to apply the shaping thereto (see FIG. 26).

Upon completion of the shaping, the holding of the preheated tire 107 by the carrying loader 109 is released to withdraw it from the tire vulcanizing press 104, after which the upper mold plate 59 is moved down to place the segments of the tread mold 61 in the open state to be positioned in the outer periphery of the preheated tire 107. Simultaneously therewith, the center post 23 is lowered from the shaping position by the elevating cylinder 112 to deform the bladder 20 so as to be further contracted from the shaping state (see FIG. 26).

The carrying loader 109 carries the green tire 6 to be fed into the carrying in conveyor 14 again to the pre-processing unit 103 to shift it to the preheating whereby the preheating by the pre-processing unit 103 and the vulcanizing and molding by the tire press 104 are simultaneously carried out.

The upper platen 57 is moved down to close the segments of the tread mold 61 whereby the preheated tire 107 is mounted within the molds 55 and 56. Simultaneously therewith, the center post 23 is lowered to the position of the vulcanizing and molding by the elevating cylinder 112. In the closed state of the upper and lower molds 55 and 56, the clamping force is loaded from the upper platen 57 side so that the molds 55 and 56 are not opened. Subsequently, the high pressure heating medium (heated gas, steam or the like) is supplied into the bladder 20 through the gas pipes 113 from the gas supply source 67, and the vulcanizing and molding are applied to the entire preheated tire 107 by the heating medium exerting on the bladder 20 (see FIG. 27).

Since in the vulcanizing and molding, the thick portion of the preheated tire 107 is preheated to a temperature (100 to 140° C.) immediately before the start of vulcanizing, the preheated tire 107 can be elevated in temperature to a vulcanizing temperature in a short period of time by the heating medium within the bladder 20 and the molds 55 and 56.

Accordingly, in the tire press 104, the entire preheated tire 107 can be placed in the vulcanizing temperature in a short period of time to shift to the vulcanizing by the denaturation of rubber.

Since the heating medium supplied into the bladder 20 functions so as to expand the bladder 20, the preheated tire 107 is pressed against the molds 55 and 56 by the expansion of the bladder 20 to mold it into the product shape.

Upon completion of the vulcanizing and molding by the press 104, the upper platen 57 and the upper mold plate 59 are moved up to place the upper and lower molds 55 and 56 in the open state, and thereafter the center post 23 is raised from the position of the vulcanizing and molding by the elevating cylinder 112 whereby the bladder 20 is placed in the extended state from the state of the vulcanizing and molding (see FIG. 28) of unloader 115.

At this time, the bladder 20 is extended so as to be slipped out of the inside of the vulcanized tire 8 to release the holding of the vulcanized tire 8. Simultaneously therewith, the residual pressure within the bladder 20 is released to facilitate the removal of the vulcanized tire 8.

Figure 28:
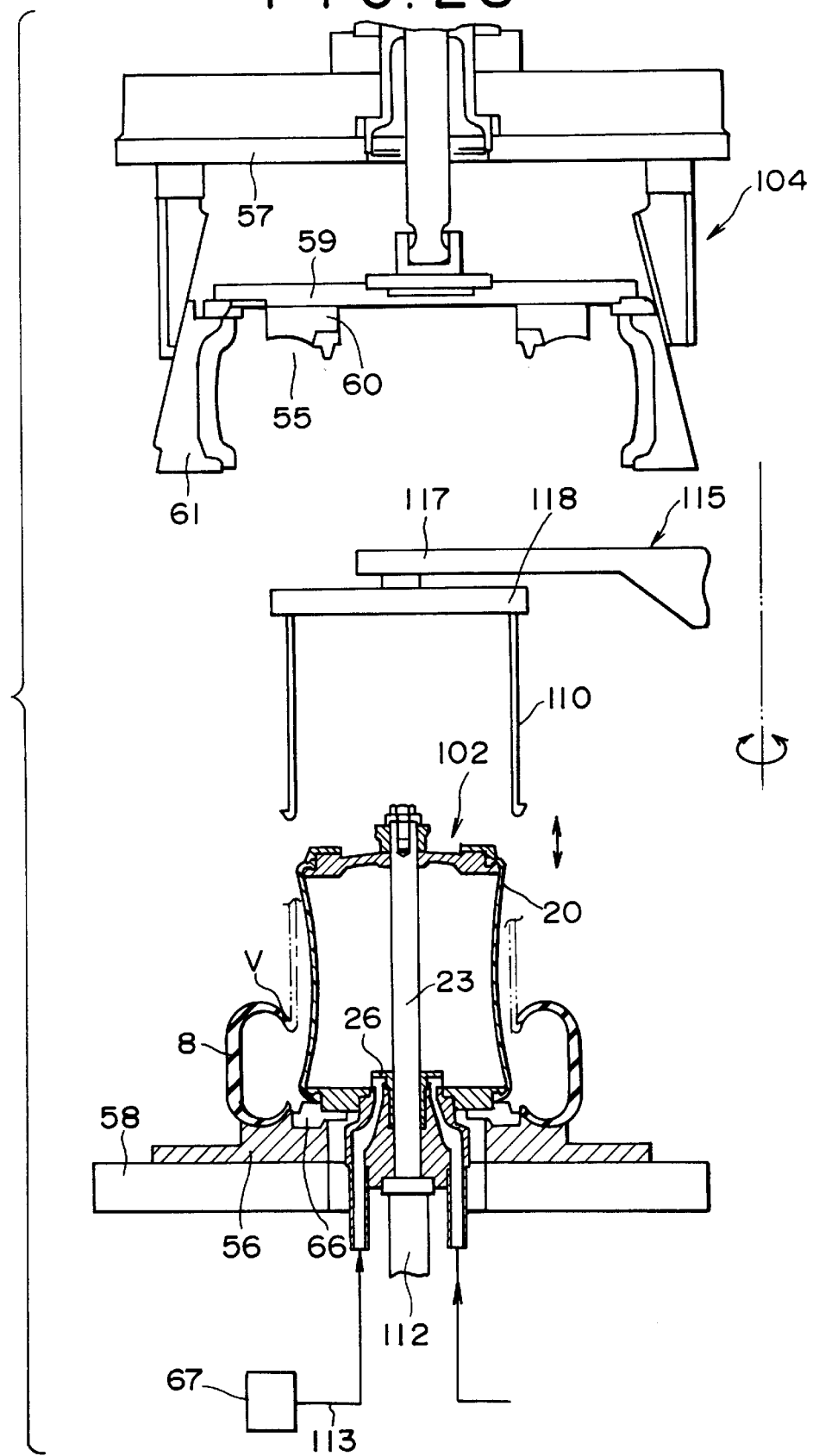
FIG. 28 is a view showing the procedure for carrying the vulcanized tire out of a bladder mechanism.

The vulcanized tire 8 removed from the bladder mechanism 102 is carried out to the carrying out conveyor 15 holding the upper bead portion V of the vulcanized tire 8 from the inside by the tire chuck 118 (see FIG. 28). The vulcanized tire 8 is then carried to the succeeding step such as a post cure inflator by the carrying out conveyor 15.

While in the second invention, an illustration is made wherein the outer periphery of the green tire 6 is heated by the heating heater 36 to apply the preheating to the thick portion of the tread portion R or the like, it is to be noted that for example, the green tire 6 may be sealed and held by the upper and lower tire chucks 105 and 106 of the pre-processing unit 103, and the low pressure heating gas is supplied in and discharged out of the green tire 6 to thereby apply the preheating to the thick portion from the inside of the green tire 6. In this case, preferably, the gas at a normal temperature is heated by the heating medium (such as steam, drain, etc.) discharged out of the tire press 104 and the heated gas is supplied into the green tire 6. With this, the waste heat of the heating medium discharged out of the tire vulcanizing press 4 is utilized (recycle use) to enable the efficient use of heat, attaining the energy saving.

* (Hereinafter, 72341)*

The tire vulcanizing method and the tire vulcanizer according to the third invention will be described.

In the present invention, using a bladderless type tire vulcanizing press, pre-vulcanizing and preheating are applied to a green tire externally of the press, and vulcanizing and molding (the present vulcanizing) is applied to the entire tire subjected to the pre-vulcanizing by the press. With this, the time being restricted by the press can be shortened, and the cycle time of the tire vulcanizing and molding is shortened to improve the productivity.

In the following, the tire vulcanizer in the embodiment according to the present invention will be first described and the tire vulcanizing method will be then described.

Figure 29:
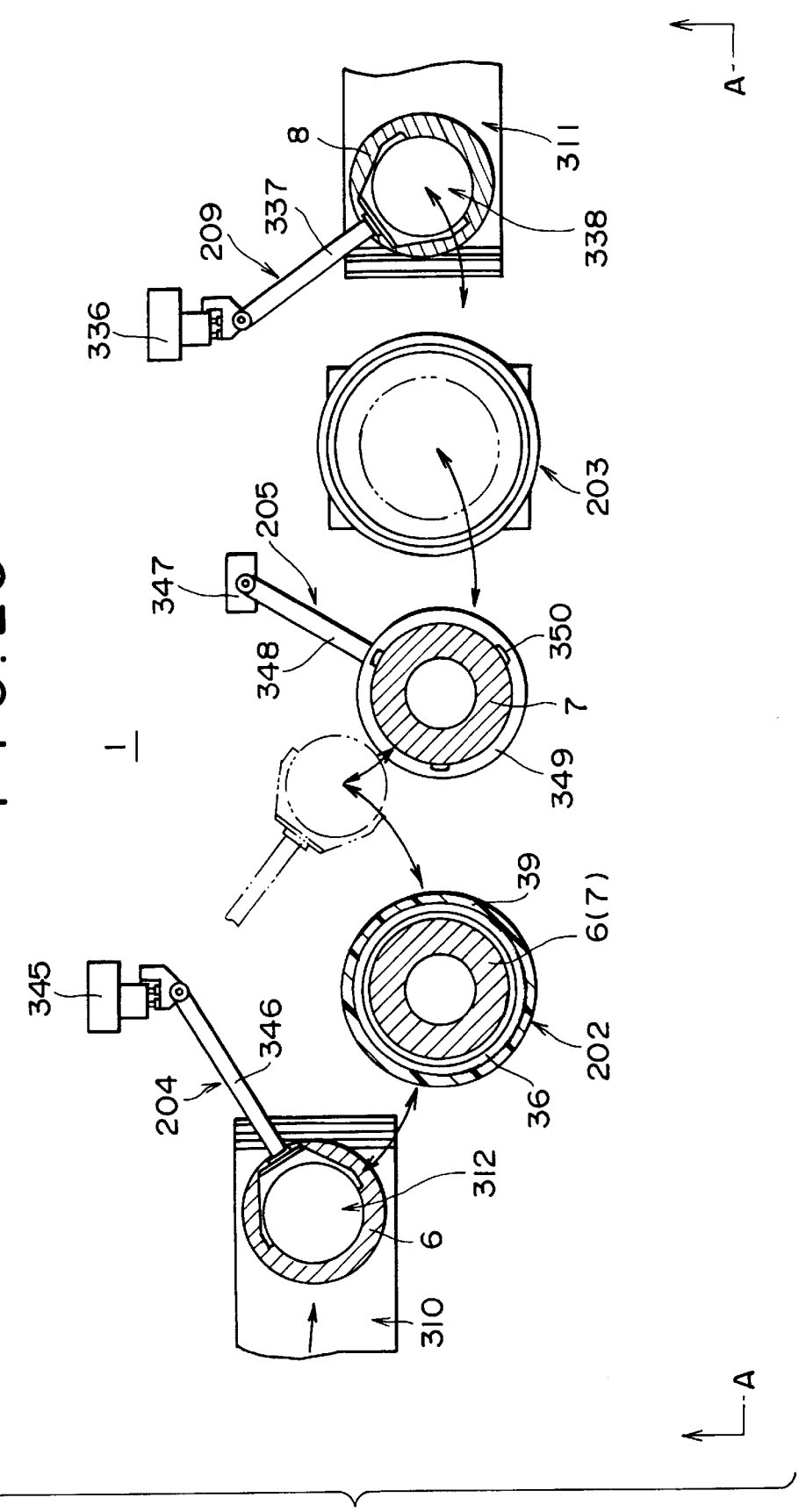
FIG. 29 is a top view showing the whole constitution of a tire vulcanizer.
Figure 30:
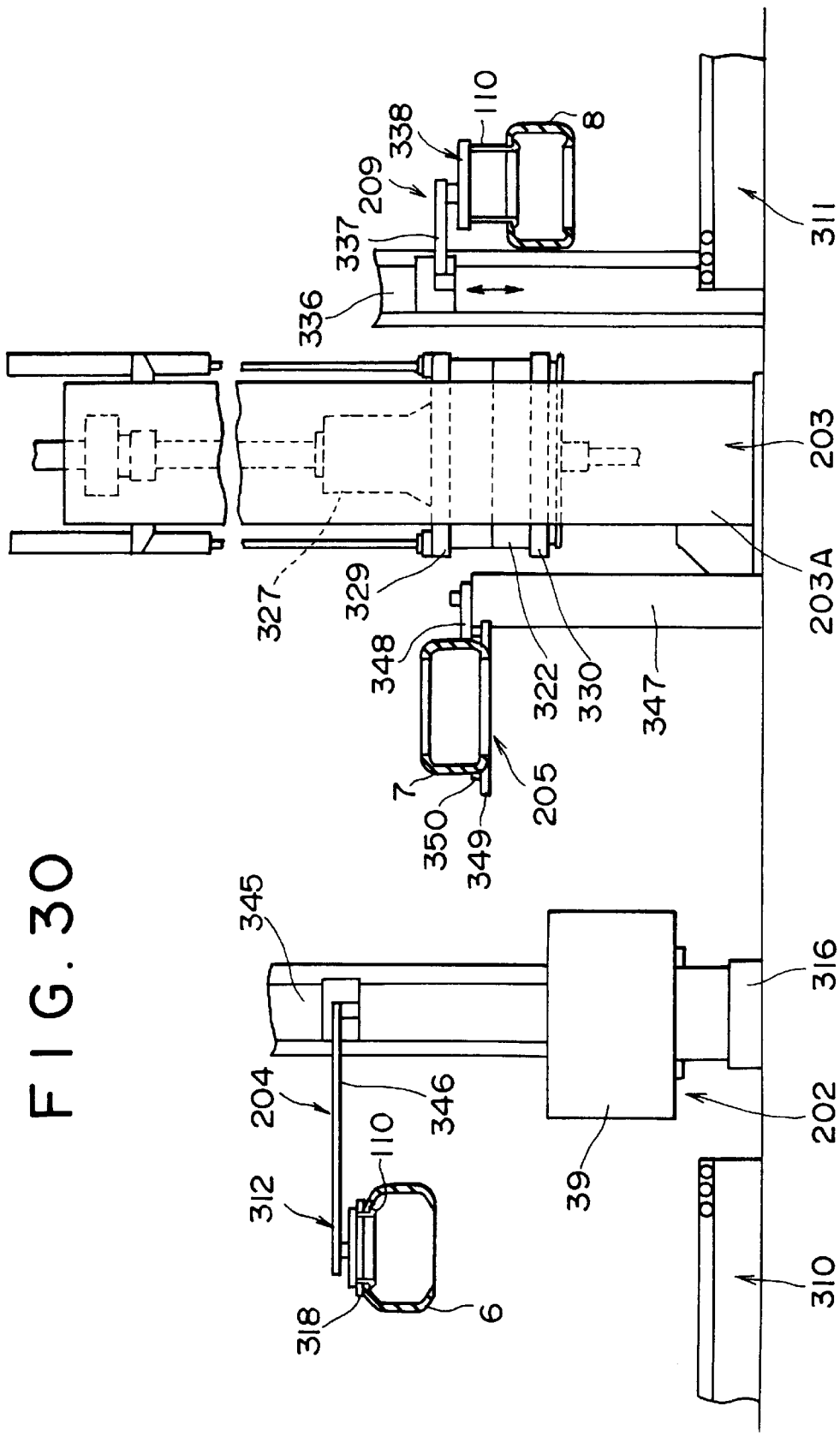
FIG. 30 is a view taken on A—A of FIG. 29, and a side view showing the whole construction of a tire vulcanizer.

Referring to FIGS. 29 and 30, a tire vulcanizer 1 comprises a preheating unit 202 (pre-processing means) for applying pre-vulcanizing and preheating to a green tire 6, a bladderless type tire vulcanizing press 203 for applying vulcanizing and molding (the present vulcanizing) to the entire pre-vulcanized and preheated tire 7 (hereinafter referred to as "pre-vulcanized tire 7"), and two carrying loaders 204 and 205 (an inner holding chuck loader 204 and an outer holding chuck loader 205) for carrying a green tire 6 or the like.

The pre-vulcanizing unit 202 is juxtaposed forwardly of the bladderless type tire vulcanizing press 203 to apply pre-vulcanizing and preheating to the green tire 6. As for an example, the pre-vulcanizing unit 202 comprises, as shown in FIG. 31, two upper and lower chucks 312 and 313 for holding upper and lower bead portions V, respectively, of the green tire 6, a heating heater 36 for heating the outer periphery of the green tire 6, and a heat supply source 315 for supplying a heating medium (heating gas) into the green tire 6.

The upper tire chuck 312 is used jointly with carrying the tire 6 (7) and provided at the extreme end of a turning arm 346 of the carrying loader 204, and the lower tire chuck 313 is provided on a unit stand 316 so as to oppose to the upper tire chuck 312. These chucks 312 and 313 has three pawls 110 or more which are enlarged and contracted in diameter all at once in a radial direction, and the pawl 110 in the diameter-contracted state is inserted into the green tire 6 to be enlarged in diameter, and the bead portion V of the tire 6 is held between upper and lower rims 318 to thereby seal the interior of the tire 6. When the pawl 110 is contracted in diameter again to open the green tire 6 or the like.

Further, the heating heater 36 (such as an infrared heater, a ceramics heater, etc.) is arranged in the inner periphery of the heat insulating container 39 for receiving the green tire 6 therein to heat the tread portion R and the upper and lower bead portions V (thick portions) from the outer periphery of the green tire 6 received into the container 39. The upper side of the heat insulating container 39 is provided on the lower tire chuck 313 (the unit table 316) and extends to the upper tire chuck 312 so as to cover the green tire 6. The heat insulating container 39 is opened in order to receive the green tire 6. The heat supply source 315 is provided to supply a heating gas into the tire 6 in a sealed state from the lower tire chuck 313 side through the supply pipe 320, and the heating gas supplied into the tire 6 is discharged through the exhaust pipe 321 from the lower tire chuck 313 (see FIG. 31). As the heating gas into the green tire 6, a heating medium (a heating gas) discharged from the tire vulcanizing press 203 may be supplied from the supply pipe 320 the tire vulcanizing press 203, in which case, since the waste heat of the heating medium discharged from the press 203 is utilized (the recycle use), the efficient use of heat becomes enabled to achieve the energy saving.

Figure 31:
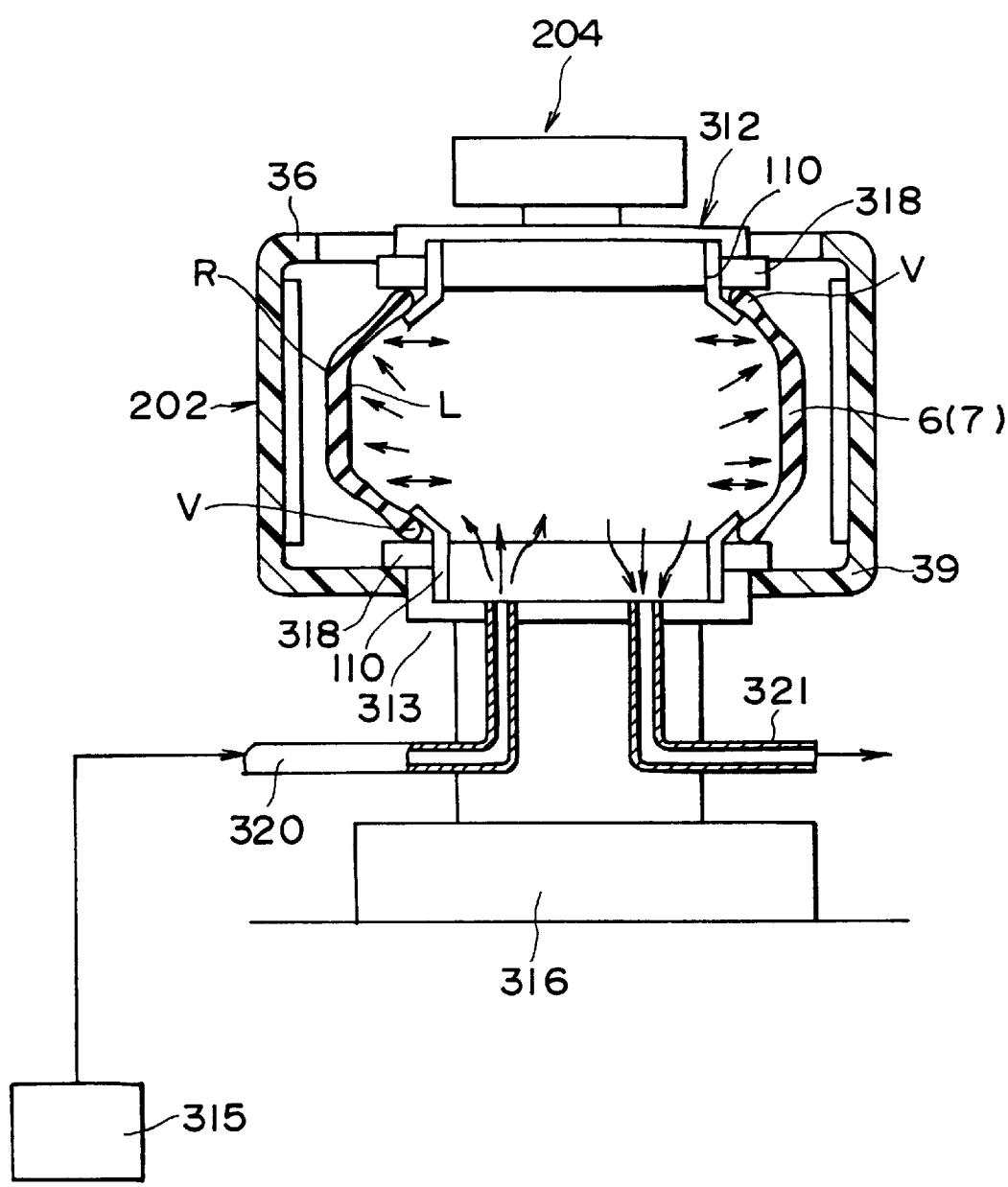
FIG. 31 is a sectional view showing the constitution of a pre-vulcanizing unit of a tire vulcanizer.

With this constitution, the pre-vulcanizing unit 202 seals and holds the green tire 6 within the heat insulating container 39, and thereafter heats the tread portion R and the upper and lower bead portions V (thick portions) of the tire 6 while supplying the heating gas into the tire 6 to thereby apply pre-vulcanizing to the inner liner portion L in the inner periphery of the green tire 6 and apply the preheating to the thick portion such as the tread portion R or the like (see FIG. 31).

Figure 32:
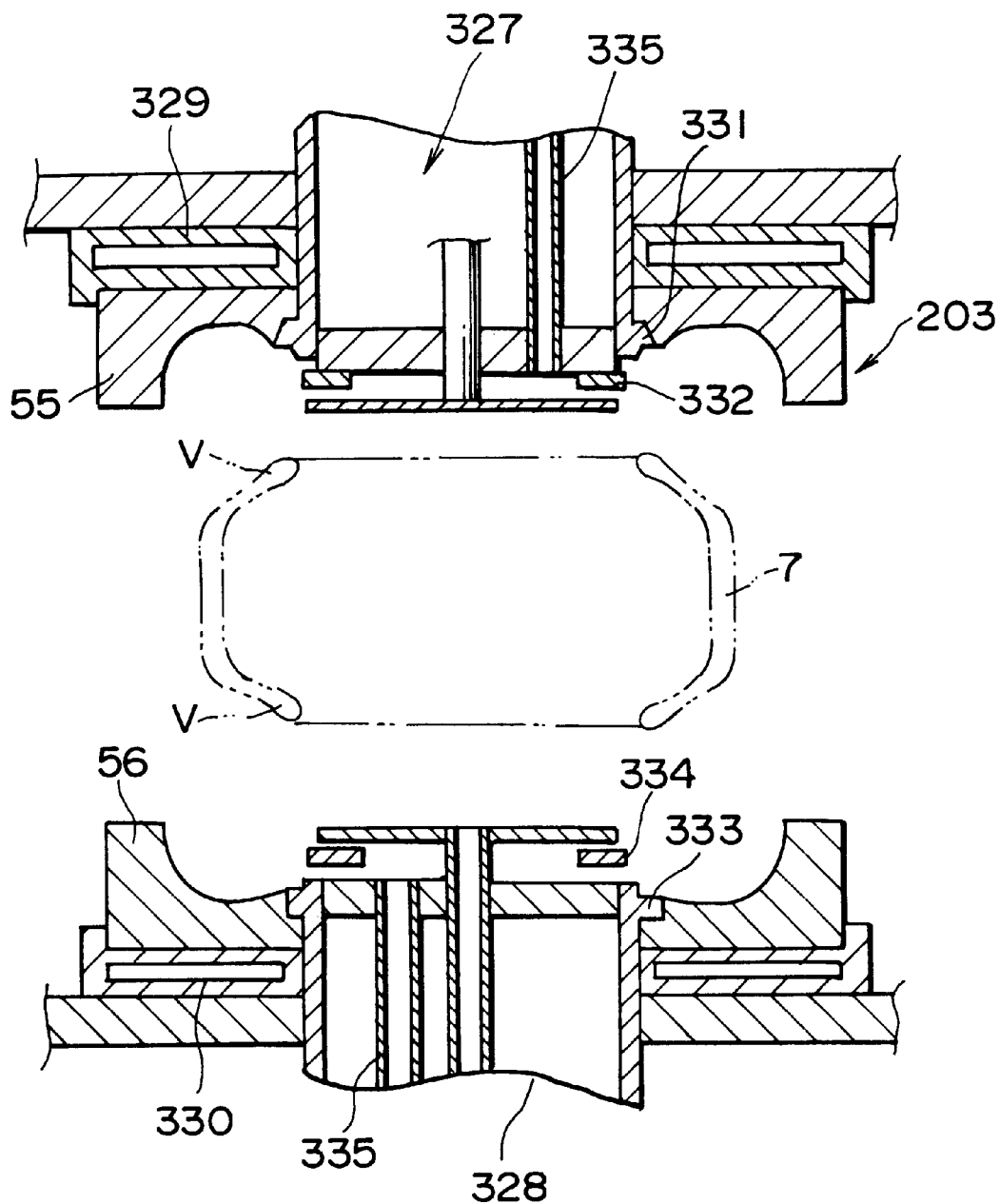
FIG. 32 is a sectional view showing the constitution of a tire vulcanizing press of a tire vulcanizer.

A bladderless tire vulcanizing press 203 (hereinafter referred to as "tire vulcanizing press 203") is provided to apply vulcanizing and molding (present vulcanizing) to the entire pre-vulcanized tire 7. The press 203 comprises, as shown in FIG. 32, two upper and lower split molds 55, 56 for vulcanizing and molding the pre-vulcanized tire 7, and two upper and lower center mechanisms 327, 328 for holding the upper and lower bead portions V of the pre-vulcanized tire 7. The molds 55, 56 are closeable, and are preheated prior to vulcanizing and molding by means of steam or the like. The upper mold 55 is provided on a vertically movable upper platen 329, and the lower mold 56 is provided on a lower platen 330 secured to the vulcanizer frame 203A (see FIG. 30)

Further, the upper center mechanism 327 is provide vertically movably on the upper platen 329 side. The upper center mechanism 327 is provided at the lower end thereof with an upper bead ring 331, and an upper bead sector 332 for holding the upper bead portion V of the pre-vulcanized tire 7 between the former and the upper bead ring 331. The lower center mechanism 328 is provided vertically movably on the lower platen 330 side. The lower center mechanism 328 is provided at the upper end thereof with a lower bead ring 333 and a lower bead sector 334 for holding the lower bead portion V of the pre-vulcanized tire 7 between the former and the ring 333. The bead sectors 332, 334 are associated with the elevation of the center mechanism 327, 328 to be enlarged and contracted in diameter.

With this constitution, the press 203 holds the upper and lower bead portions V of the pre-vulcanized tire 7 by the upper and lower center mechanisms 327, 328 to seal the interior of the tire 7, and thereafter supplies a high pressure heating medium (such as a heating gas, steam) from supply pipes 335 of the enter mechanisms 327, 328, whereby the pre-vulcanize tire 7 is pressed against the molds 55, 56 in the closed state to old it into the product shape to apply vulcanizing (present vulcanizing) due to denaturation of rubber caused by heating (see FIGS. 37A, 37B, and 37C). The vulcanizing of the pre-vulcanized tire 7 is applied not only by supplying a heating medium but also by pressing the heated inner mold against the inner periphery of the green tire 6 from the inward thereof.

A tire 8 vulcanized and molded by the press 203 (hereinafter referred to as "vulcanized and molded tire 8") is carried out to the carrying out conveyor 311 by the turning and elevation of the carrying out unloader 209, and is fed into the succeeding step of a post cure inflator or the like by the conveyor 311. This unloader 209 is provided to be turned and elevated on a guide support post 336 juxtaposed at the rear of the press 203 and has a tire chuck 338 similar to the inner holding tire chuck 312 at the extreme end of a turning arm 337.

The carrying loader 204 (inner holding chuck loader) is provided to be elevated and turned on a guide support post 345 juxtaposed to the pre-vulcanizing unit 202. The carrying loader 204 has an upper tire chuck 312 of the pre-vulcanizing unit 202 at the extreme end of a turning arm 346 and is used jointly with the holding of the green tire 6 in carrying and preheating the green tire 6 or the like. With this constitution, the carrying loader 204 holds the green tire 6 fed into a carrying conveyor 310 from the inside, and thereafter carries to the unit 202, and carries from the unit 202 to the press 203.

Further, the carrying loader 205 (outer holding chuck loader) is provided to be turned on a support post 347 between the pre-vulcanizing unit 202 and the tire vulcanizing press 203. The carrying loader 205 has a tire chuck 349 at the extreme end of the turning arm 348. The chuck 349 has three pawls 350 or more which are enlarged and contracted in diameter all at once in a radial direction, and the pre-vulcanized tire is transferred between the pawls 350 in the diameter-enlarged state to be contracted in diameter to thereby hold the outer periphery of the tire 7 from the outside. The pawl 350 is enlarged in diameter again to thereby open the pre-vulcanized tire 7. With this constitution, the carrying loader 205 carries the pre-vulcanized tire 7 held from the inside by the carrying loader 204 into and between the molds in the open state of the tire vulcanizing press 203.

Next, the tire vulcanizing method executed by the tire vulcanizer 1 will be described hereinafter.

The green tire 6 is vulcanized and molded by applying pre-vulcanizing and preheating to the green tire 6 by the pre-vulcanizing unit 202, and then applying vulcanizing and molding (the present vulcanizing) to the entire pre-vulcanized tire 7 including unvulcanized portions by the tire vulcanizing press 203.

Figure 33A:
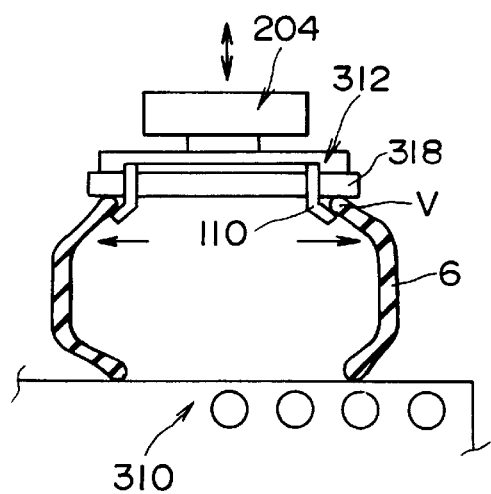
FIGS. 33A, 33B, and 33C are respectively views showing the procedure for applying pre-vulcanizing and pre-heating to a green tire.
Figure 33B:
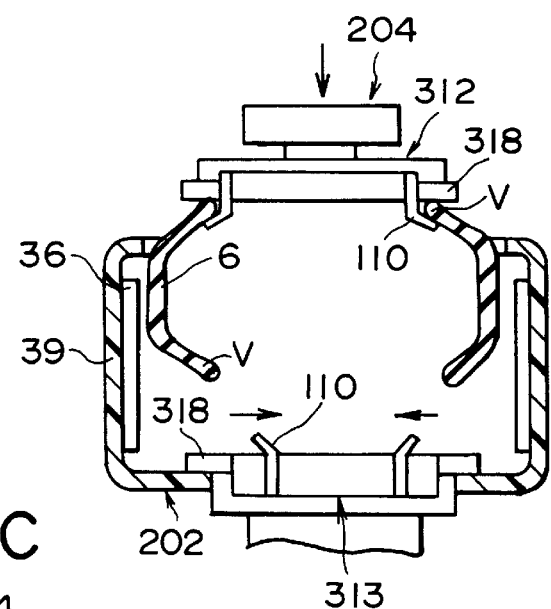

The pre-vulcanizing and preheating by the pre-vulcanizing unit 202 is carried out by holding, from the inside, the upper bead portion V of the green tire 6 on the carrying in conveyor 310 by the upper tire chuck 312 of the carrying loader 204, and carrying the tire to the pre-vulcanizing unit 202 to receive it into the heat insulating container 39 (see FIGS. 33A and 33B).

Figure 33C:
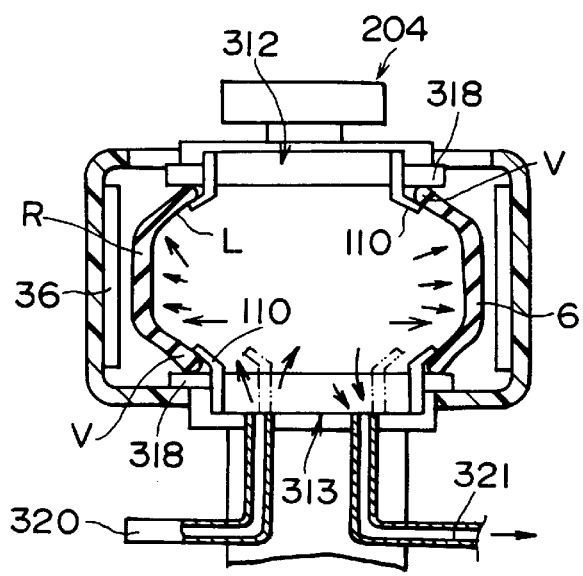

Subsequently, the lower bead portion V of the green tire 6 is held, from the inside, by the lower tire chuck 313 of the unit 202 to place the inner liner of the tire 6 in the sealed state, and the heating gas is supplied to directly exert it on the inner liner portion L in the inner periphery of the green tire 6 to apply the pre-vulcanizing thereto. Further, simultaneously with the pre-vulcanizing, the preheating is applied to the thick portion of the tread portion R and the upper and lower bead portions V from the outer periphery of the green tire 6 by the heating heater 36 (see FIG. 33C).

The pre-vulcanizing conditions by the unit 202 are decided by the relative relation of the vulcanizing degree, the vulcanizing temperature, and the vulcanizing time to the green tire 6 (inner liner portion L). The pre-vulcanizing conditions are suitably changed according to the tire size or the like.

Figure 45:
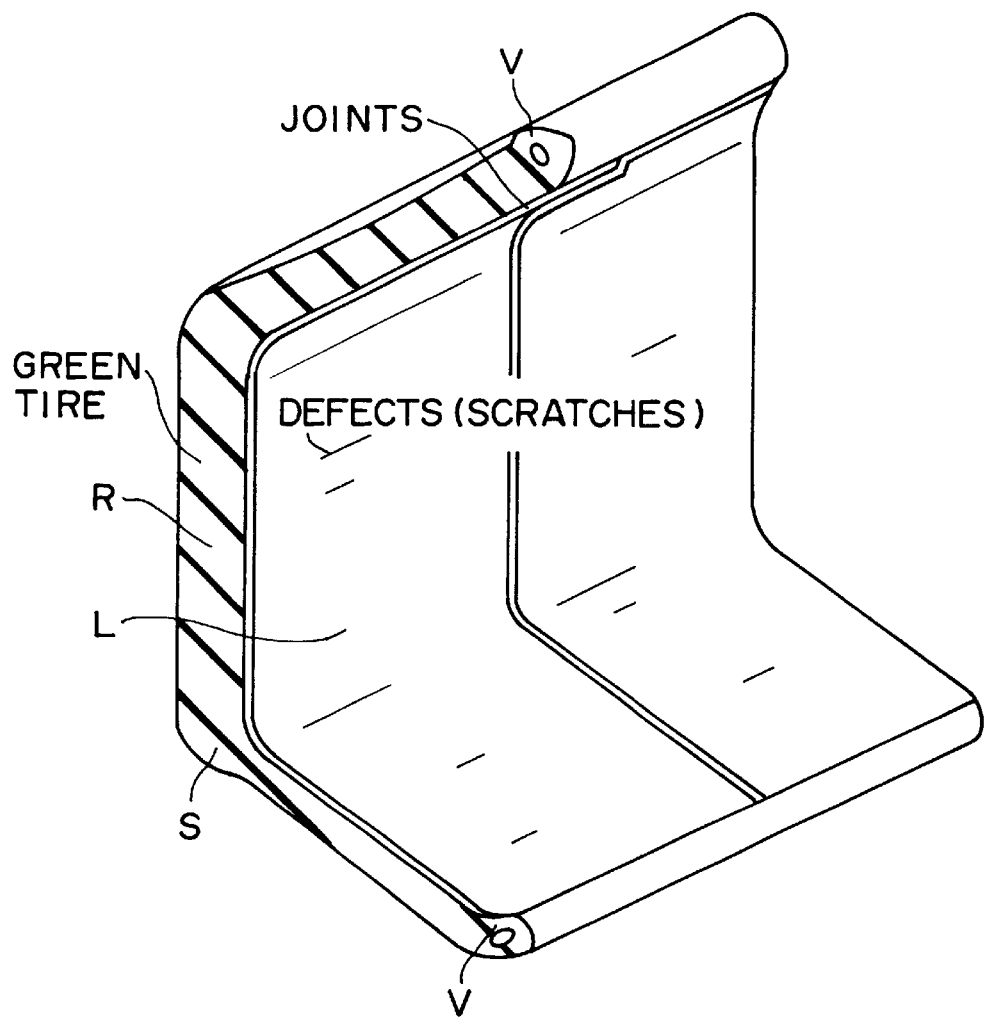
FIG. 45 is a schematic view showing a section of a green tire.

The vulcanizing degree to the green tire 6 (inner liner portion L) is a degree such that the unevenness (see FIG. 45) of joints or defects of the inner liner portion L are smoothed (evened) and repaired. That is, the pre-vulcanizing is applied to a degree such that the scratches and the joints of the inner liner portion L are illuminated so as to be continued along the inner periphery of the green tire 6.

The vulcanizing temperature is set to a temperature at which vulcanizing is promoted. Generally, as the vulcanizing temperature rises, the temperature of the green tire 6 is rapidly risen, thus promoting the vulcanizing reaction caused by denaturation of rubber, and shortening the vulcanizing time.

The vulcanizing time is set to the time determined by selecting the optimum vulcanizing temperature, and applying the pre-vulcanizing to a degree that the inner liner portion L is repaired at the vulcanizing temperature.

Figure 34:
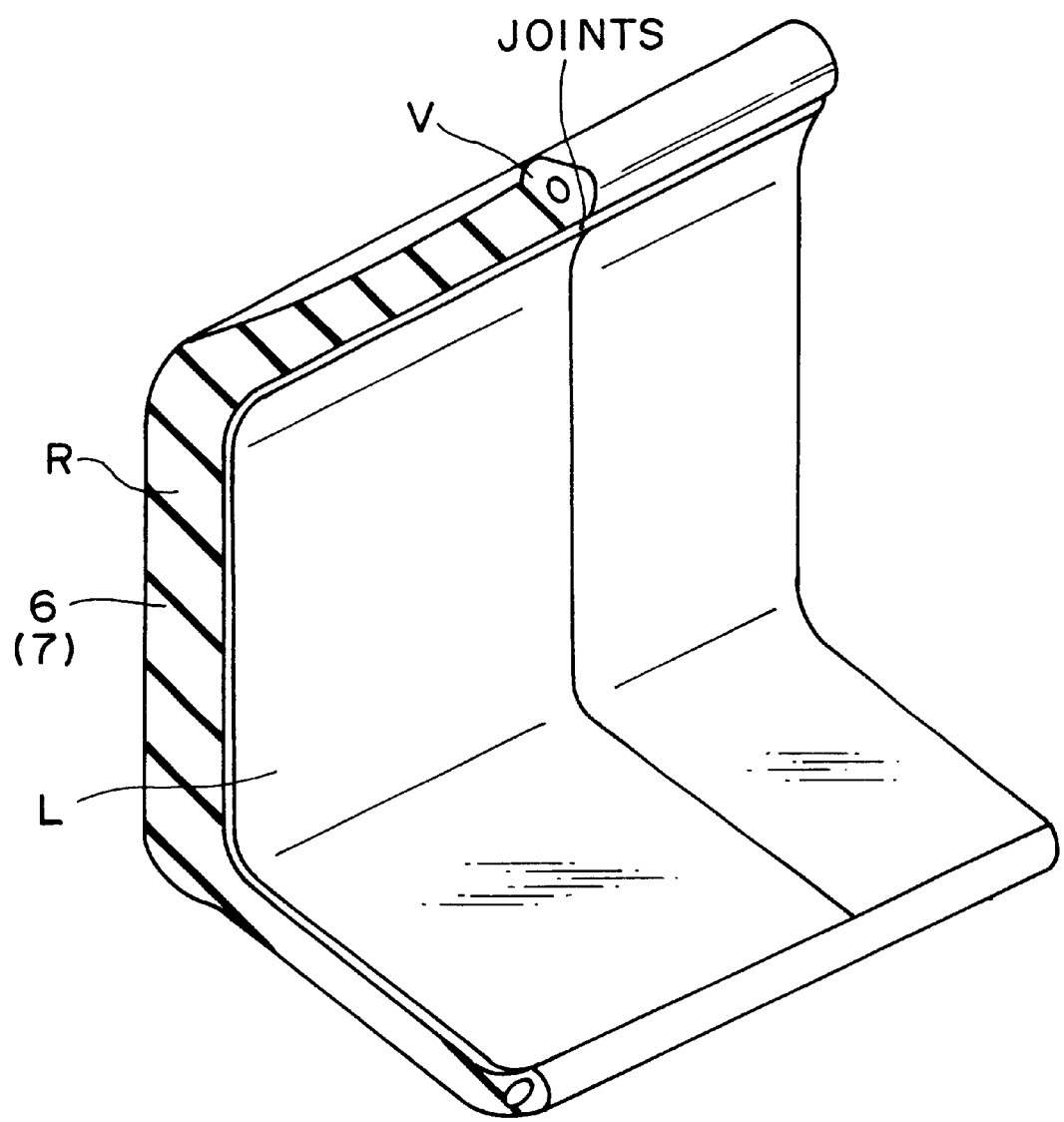
FIG. 34 is a schematic view showing the preheated green tire.

As a specific example of the pre-vulcanizing, for example, the low pressure heating gas is caused to directly exert on the inner liner portion L whereby heating is done in the range of from 140 to 160° C. at which vulcanizing is promoted. When the low pressure heating gas is supplied into the sealed green tire 6, the pressure is gradually risen within the low pressure region. When the low pressure, relatively high temperature and gradually pressure rising heating gas directly exerts on the inner liner portion, the vulcanizing is not progressed to the inner layer of the green tire 6, but the flowability can be provided for rubber merely by the surface of the inner liner portion L to make it possible to have the inner liner portion L located continuously along the inner periphery of the green tire 6, as shown in FIG. 34.

When the pre-vulcanizing is applied to the inner liner portion L for repair as described above, it is possible to allow the inner liner portion L have a role similar to the bladder in the vulcanizing and molding (the present vulcanizing) by the tire vulcanizing press 203.

The preheating condition by the pre-vulcanizing unit 202 is that the tread portion R or the like is heated at the temperature immediately before the start of vulcanizing, for example, in the range of 100 to 140° C. The heating time is the time that the optimum temperature is selected at which heating temperature, the inner layer of the tread portion R can be preheated. The preheating condition is suitably changed according to the tire size or the like.

Since the tread portion R of the green tire 6 is heated, in addition to the heating from the outer periphery of the tire 6, by the heating gas supplied into the tire 6, the pre-vulcanizing condition is decided also in consideration of the rise of temperature caused by the heating gas.

Upon completion of the pre-vulcanizing and preheating, the carrying loader 204 is moved up and turned to carry the vulcanized tire 7 to the carrying loader 205. Subsequently, the carrying loader 204 is moved to transfer the pre-vulcanized tire 7 onto the tire chuck 349 of the carrying loader 205, and the pre-vulcanized tire 7 is held from the outside by the chuck 349, then shifting to the vulcanizing and molding (the present vulcanizing by the tire press 203.

At this time, the pre-vulcanized tire 7 is to be lowered in temperature by the atmosphere during the carrying by the carrying loaders 204 and 205, but the carrying by the carrying loaders 204 and 205 is carried out momentarily, and the heat capacity of the tire itself is so large that there is less affected by the loweling of temperature caused by the atmosphere. The tread portion R (thick portion) of the pre-vulcanized tire 7 is placed in the state close to the vulcanizing starting temperature, and the inner liner portion L is placed in the state above the vulcanizing starting temperature, capable of carrying it to the press 203.

The carrying loader 204 having carried the pre-vulcanized tire 7 receives a new green tire 6 into the pre-vulcanizing unit 202, shifting to the pre-vulcanizing and preheating whereby the pre-vulcanizing by the unit 202 and the vulcanizing and molding (the present vulcanizing) by the vulcanizing press 203 are simultaneously carried out.

In the vulcanizing and molding (the present vulcanizing) by the press 203, the carrying loader 205 is turned to carry the pre-vulcanized tire 7 into and between the molds 55 and 56 in the open state (see FIG. 35A). Subsequently, the upper center mechanism 327 is moved down halfway, and the upper bead portion V of the pre-vulcanized tire 7 is held by the upper bead ring 331 and the upper bead sector 332 (see FIG. 35B). In this state, the pawls 350 of the carrying loader 205 are enlarged in diameter to release the holding of the pre-vulcanized tire 7, and the upper center mechanism 327 is moved up and the carrying loader 205 is withdrawn from the press 203 (see FIG. 36A).

The upper center mechanism 327 is again moved down together with the upper mold 55, and the lower bead portion V of the pre-vulcanized tire 7 is held on the lower bead ring 333.

Thereby, the lower bead portion V of the pre-vulcanized tire 7 is expanded and raised, and fitted into the lower bead ring 333. So, the lower center mechanism 328 is moved up to hold the lower bead portion V. A low pressure gas is supplied into the tire 7 by the supply pipes 335 (see FIG. 36B). At this time, the inner liner portion L repaired by the pre-vulcanizing is expanded along the inner periphery of the tire 7 to function as a bladder for putting the shape of the tire 7 in order.

When the upper and lower bead portions V of the tire 7 are held, and the sealing of the tire 7 is completed, the upper mold 55 is moved down to place the upper and lower mold 55 and 56 in the closed state, after which the high pressure heating medium (heating gas or the like) is supplied by the supply pipes 335, and the heating medium causes to directly exert on the inner liner portion L in the inner periphery of the pre-vulcanized tire 7 whereby the vulcanizing and molding are applied to the entire tire 7 (see FIG. 37A).

At this time, the pre-vulcanized tire 7 is preheated in its thick portion (tread potion R, upper and lower bead portions V) to a temperature immediately before the vulcanizing starting temperature, and the inner liner portion L is risen in temperature to the vulcanizing starting temperature or above, and therefore, risen in temperature immediately to the vulcanizing starting temperature by the supply of the heating medium, shifting to the vulcanizing caused by the whole denaturation of rubber, and the vulcanizing and molding are also terminated in a short period of time.

Further, since the heating medium supplied into the pre-vulcanized tire 7 functions so as to expand the inner liner portion L repaired by the pre-vulcanizing, the pre-vulcanized tire 7 is pressed against the preheated molds 55 and 56 due to the expansion of the inner liner portion L to vulcanize and mold the tread portion R and the bead portions V from the outer periphery of the tire, making it possible to allow the inner liner portion L have the role similar to the bladder.

Further, since the inner liner portion L is continuous along the inner periphery of the pre-vulcanized tire 7 due to the repair of the pre-vulcanizing, turning up caused by entry of the vulcanizing medium into the tire 7 is also prevented.

Upon completion of the vulcanizing and molding by the tire press 203, the holding of the upper bead portion V by the upper center mechanism 327 is released, and the upper mold 55 and the upper center mechanism 327 are moved up (see FIG. 37B). The unloader 209 is put between the upper and lower molds 55 and 56, and the lower center mechanism 328 is moved up to tear off the vulcanized tire 8 from the lower mold 56. Subsequently, The upper bead portion V of the vulcanized tire 8 is held form the inside by the tire chuck 338 of the unloader 209, and the holding of the lower bead portion by the lower center mechanism 328 is released, after which the vulcanized tire 8 is carried out from the press 203 to the carrying out conveyor 311 by the unloader 209 (see FIG. 37C). The vulcanized tire 8 carried from the press 203 is carried to the succeeding step such as a post cure inflator or the like by the carrying out conveyor 311.

The tire vulcanizer 1 shown in FIGS. 38 and 39, and the tire vulcanizing method will be described hereinafter.

Figure 38:
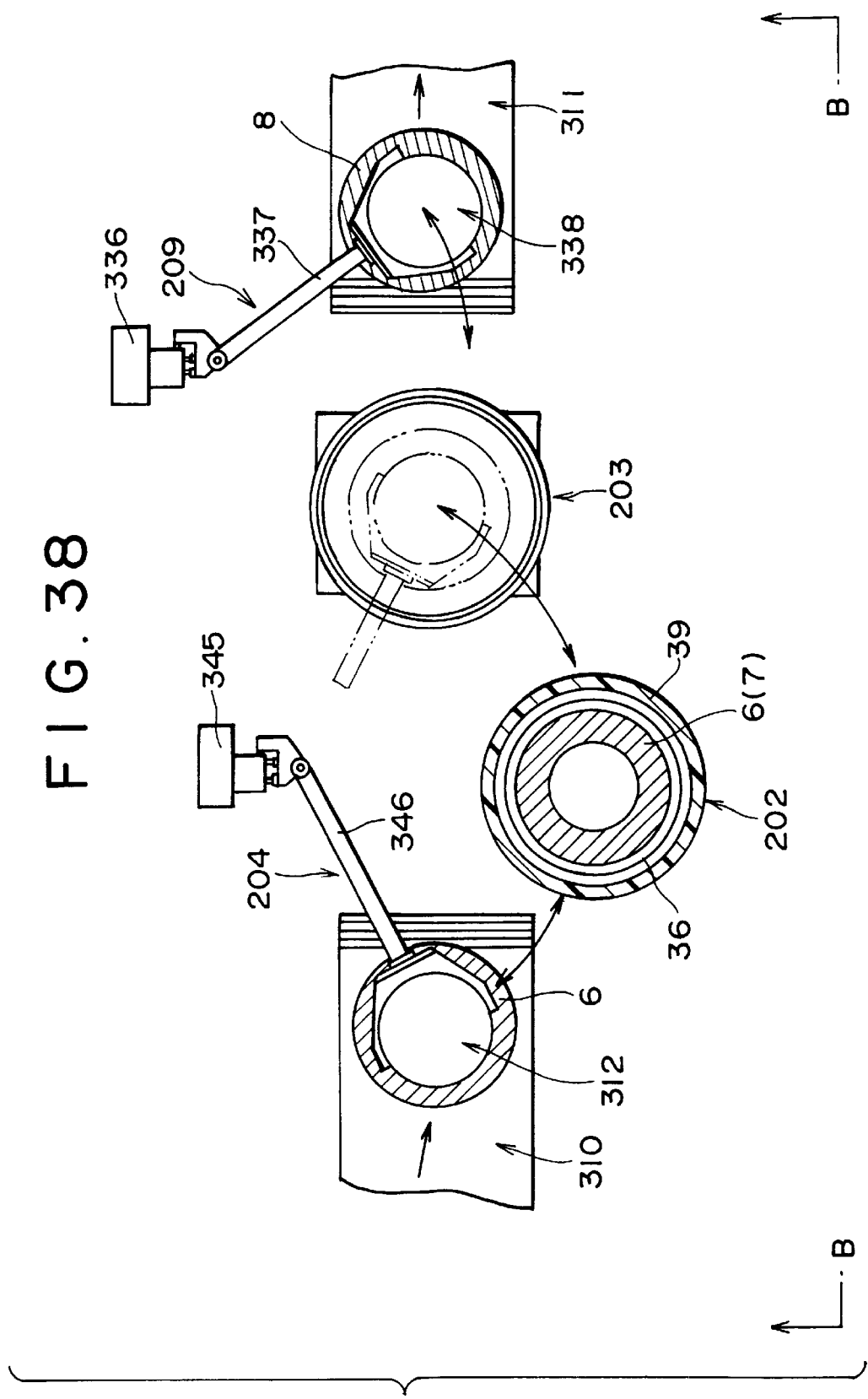
FIG. 38 is a top view showing the whole constitution of a tire vulcanizer according to a modification.
Figure 39:
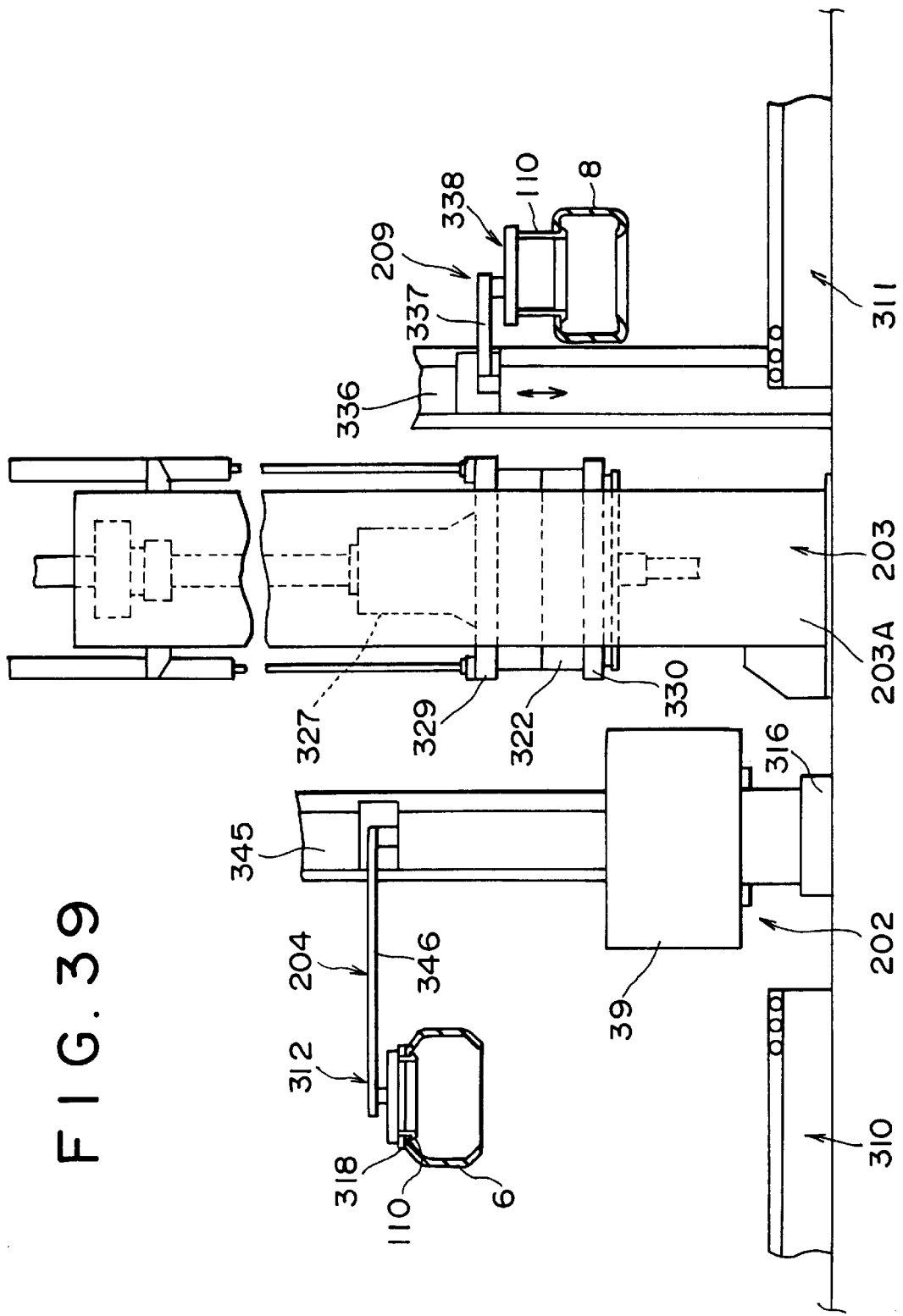
FIG. 39 is a view taken on B—B of FIG. 10 and a side view showing the whole constitution of a tire vulcanizer.

The tire vulcanizer 1 shown in FIGS. 38 and 39 is different from that of FIGS. 29 and 30 in that the pre-vulcanized tire 7 is carried to the tire vulcanizing press 203 directly by the carrying loader 204 without the provision of the carrying loader 205.

The tire vulcanizing method by way of the tire vulcanizer 1 will be described. The pre-vulcanizing and preheating of the green tire 6 are executed in a manner similar to that shown in FIGS. 29 and 30 (see FIGS. 33A to 33C and 34).

Figure 40A:
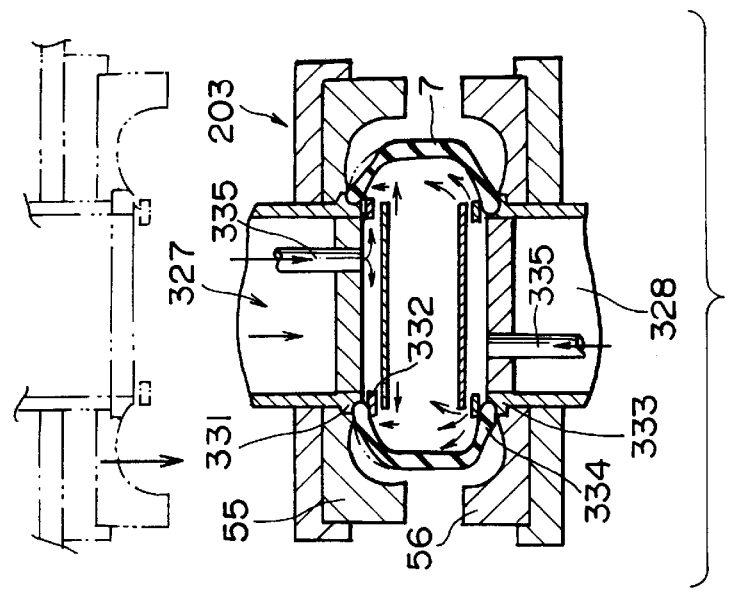
FIGS. 40A, 40B and 40C are respectively views showing the procedure for carrying the pre-vulcanized tire into a tire vulcanizing press to hold it.
Figure 40B:
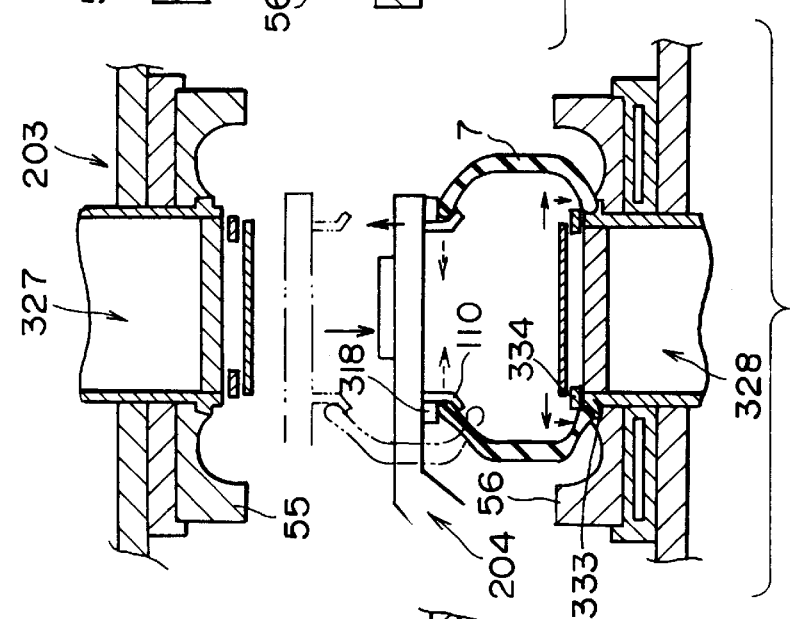

In the vulcanizing and molding (the present vulcanizing) by the press 203, the pre-vulcanized tire 7 is carried in and between the upper and lower molds 55 and 56 in the open state from the pre-vulcanized unit 202 by the turning and elevation of the carrying loader 204 (see FIG. 40A). Subsequently, the carrying loader 204 is moved down so that the lower bead portion V of the pre-vulcanized tire 7 I fitted into the lower bead ring 333, and the lower bead portion V is held by the lower bead ring 333 and the lower bead sector 334 by the upward movement of the lower center mechanism 328. In this state, the holding of the upper bead portion V by the carrying loader 204 is released, and the carrying loader 204 is moved up and turned to withdraw it from the tire vulcanizing press 203 (see FIG. 40B).

The carrying loader 204 having carried the pre-vulcanized tire 7 receives a new green tire 6 into the pre-vulcanizing unit 202, shifting to the pre-vulcanizing and preheating whereby the pre-vulcanizing by the unit 202 and the vulcanizing and molding (the present vulcanizing) by the press 203 are simultaneously carried out.

Figure 40C:
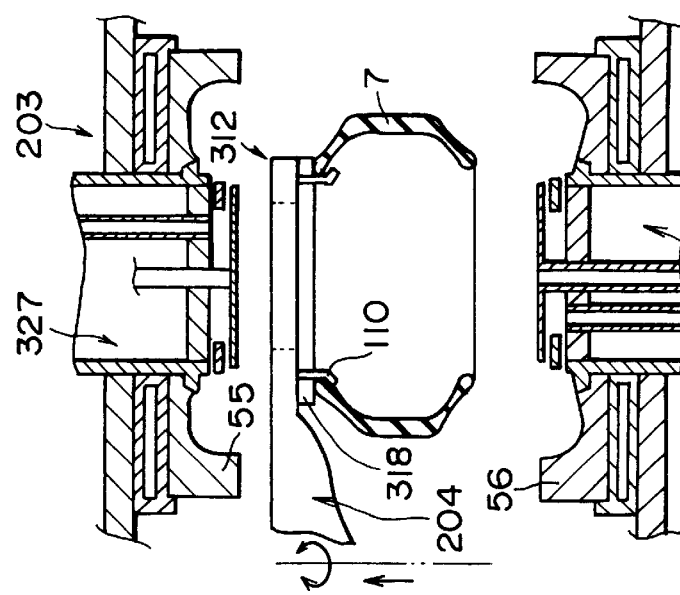

Then, the upper center mechanism 327 and the upper mold 55 are moved halfway to place the upper bead portion V of the pre-vulcanized tire 7 in contact with the upper bead ring 331, after which the low pressure gas s supplied to the pre-vulcanized tire 7 by the supply pipes 335 (see FIG. 40C).

Thereby, the upper bead portion V of the pre-vulcanized tire 7 is expanded and raised, and fitted into the upper bead ring 333, and the upper center mechanism 327 is then moved down to hold the upper bead portion V. At this time, the inner liner portion L repaired by the pre-vulcanizing is expanded along the inner periphery of the pre-vulcanized tire 7 to thereby function as a bladder for putting the shape of the pre-vulcanized tire 7 in order.

When the holding of the upper and lower bead portions V of the pre-vulcanized tire 7 are held, and the sealing of the tire 7 is completed, the vulcanizing and molding are applied to the entire tire 7 in a manner similar to that shown in FIGS. 29 and 30 (see FIGS. 37A to 37C).

A modification of the pre-vulcanizing unit 202 for applying the pre-vulcanizing and preheating will be described with reference to FIGS. 41 and 42.

Figure 41:
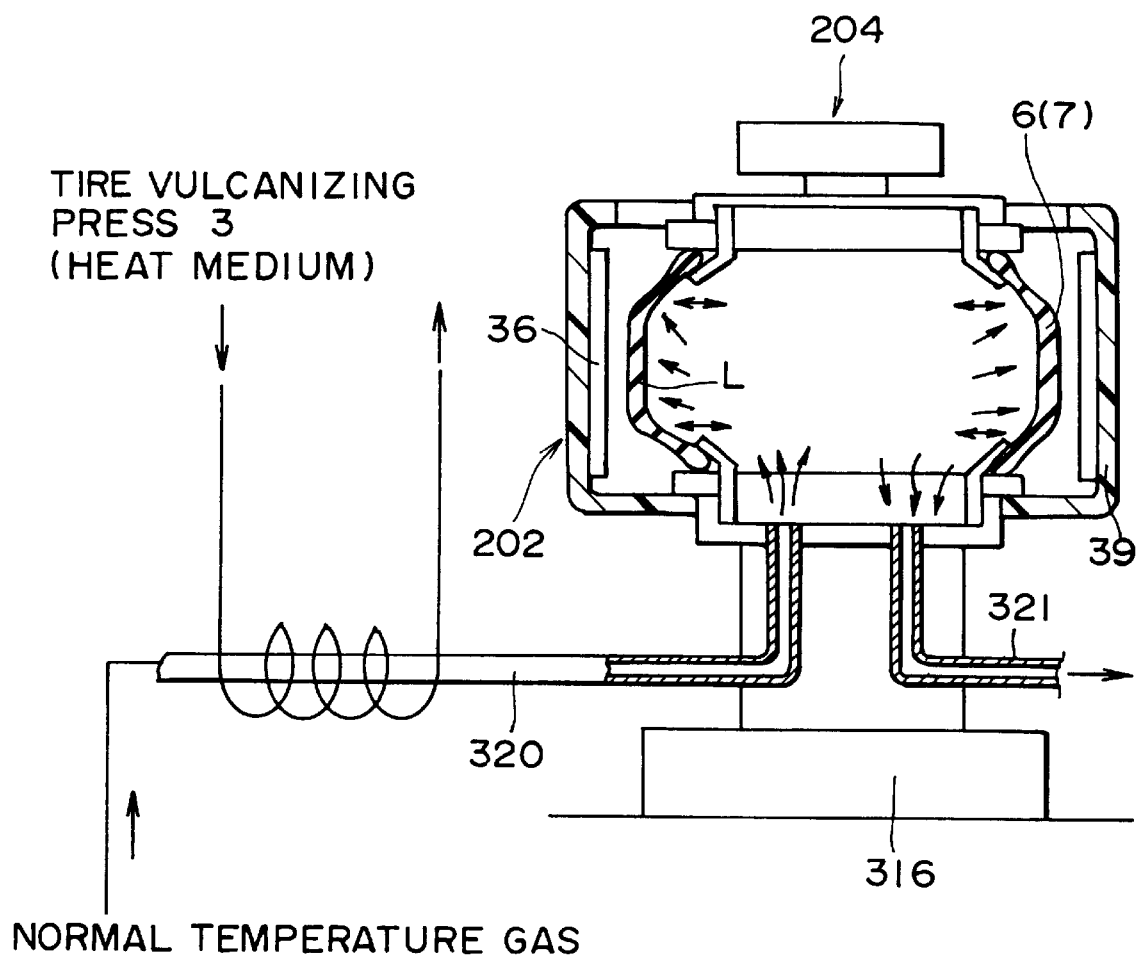
FIG. 41 is a sectional view showing a modification of a pre-vulcanizing unit.

The unit 202 shown in FIG. 41 makes use of waste heat of a heating medium (steam, drain, etc.) discharged out of the tire vulcanizing press 203 to heat a normal temperature gas, and the heating gas is supplied into the green tire 6 through the supply pipe 320 to apply pre-vulcanizing to the inner liner portion L. Since the waste heat of the heating medium discharged out of the press 203 is used (recycle use), the efficient use of heat is enabled, and the energy saving is attained.

Figure 42:
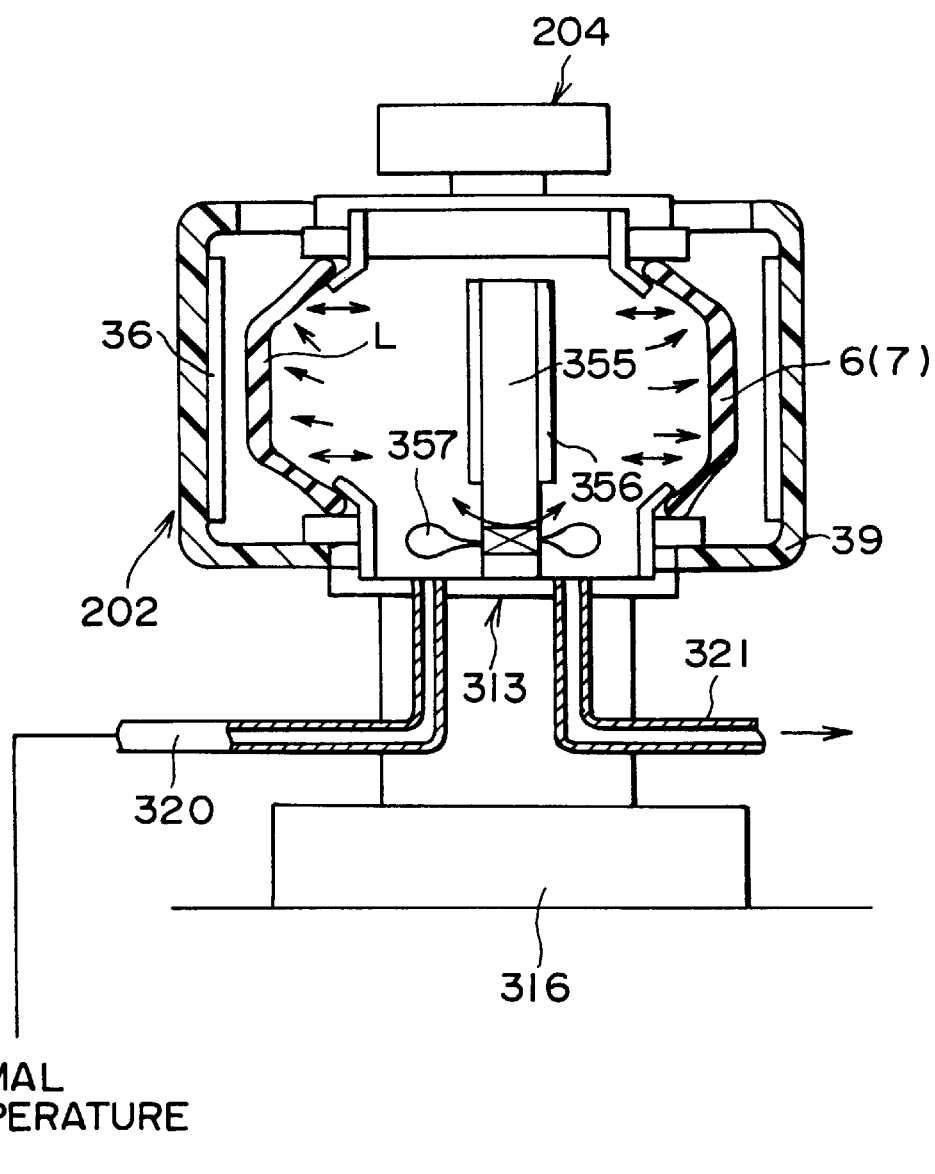
FIG. 42 is a sectional view showing a modification of a pre-vulcanizing unit.

A pre-vulcanizing unit 202 shown in FIG. 42 is constituted so that a heating heater 356 (an infrared heater, a ceramics heater, etc.) and an electric-driven fan 357 are arranged around a support post 355 stood upright in the center of a lower tire chuck 313, whereby a normal temperature gas from a supply pipe 320 is heated within a green tire 6 by the heating heater 356, and it is stirred by the electric-driven fan 357 to apply the pre-vulcanizing to the inner liner portion L.

While in the aforementioned tire vulcanizer and the tire vulcanizing method, the pre-vulcanizing is applied to the inner liner portion L, it is noted that the pre-vulcanizing can be applied to the thick portion of the tread portion R of the green tire 6 by the heating heater 36. In this case, the inner liner portion L is preheated to the temperature immediately before the start of the vulcanizing by the heating gas from the heat supply source 315.

Figure 43:
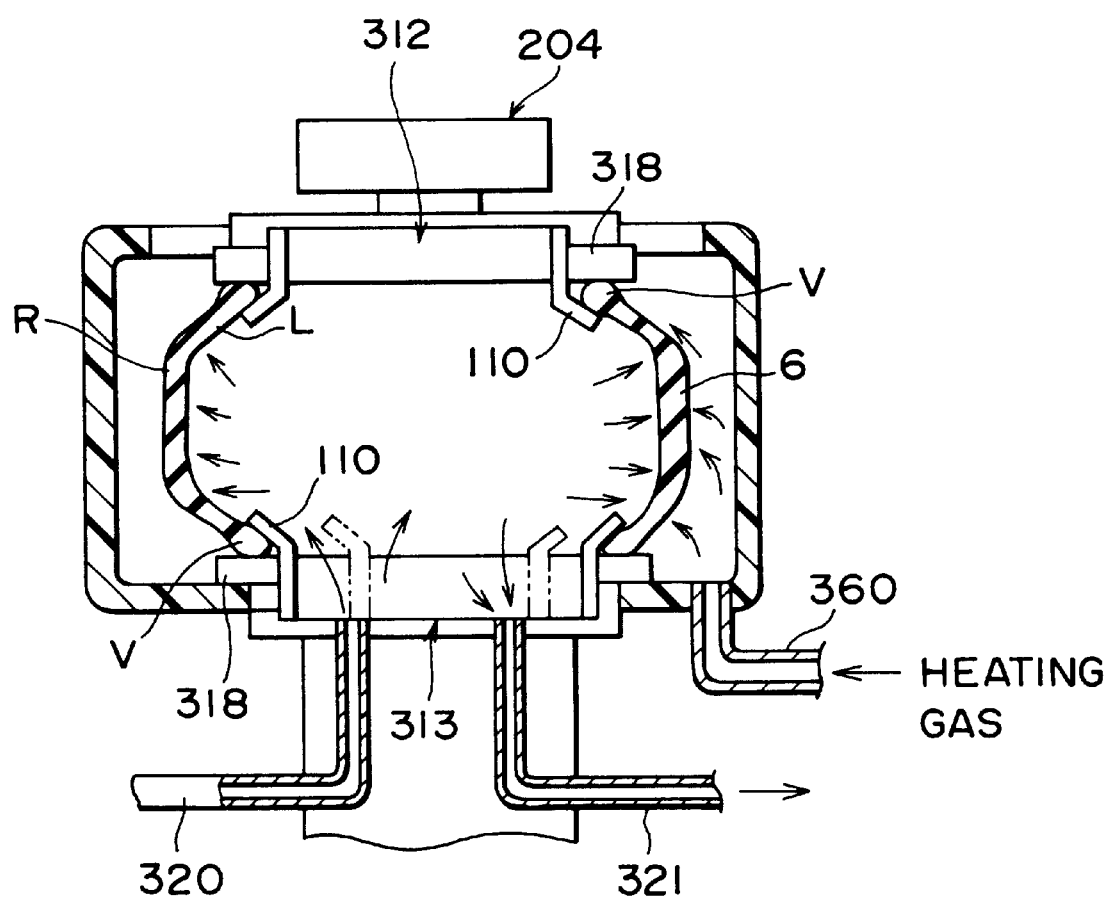
FIG. 43 is a sectional view showing a modification of a pre-vulcanizing unit.

Further, while a description has been made of an arrangement wherein the pre-vulcanizing is applied to the inner liner portion L of the green tire 6, it is noted that the tread portion R is heated to the vulcanizing starting temperature (140 to 160° C.) by heating heater 36 whereby the pre-vulcanizing may be applied to the portions other than the inner liner portion L, which can be done even by the constitution as shown in FIG. 43. In FIG. 43, the low pressure gas is supplied into the green tire 6 from the supply pipe 320 to put the shape in order, and the heating gas is supplied between the outer periphery of the green tire 6 and the heat insulating container 39 from a supply pipe 360 to apply the pre-vulcanizing to the tread portion R from the outer periphery of the tire 6.

Further, for carrying out the vulcanized tire 8, a roller conveyor 365 as shown in FIG. 44 may be used. The roller conveyor 365 of FIG. 44 is horizontally tiltable, and inclined after being inserted between the vulcanized tire 8 in the state of being torn off from the lower mold 56 and the lower mold 56 whereby the tire 8 is torn off from the lower bead ring 333 and carried downwardly to the carrying conveyor 311. After the insertion of the roller conveyor 365, the holding of the vulcanized tire 8 by the lower bead sector 334 is released due to the slight upward movement of the lower center mechanism 328. Further, after the carrying out of the vulcanized tire 8, the roller conveyor 365 is withdrawn from the tire vulcanizing press 203.

I claim:

1. A tire vulcanizing method comprising:
    mounting a bladder within a green tire externally of a tire vulcanizing press;
    as a preliminary step, enclosing a heating medium into said bladder to thereby bring said bladder into close contact with the inner periphery of said green tire for preheating, applying shaping to said green tire to thereby obtained a tire subjected to shaping; and thereafter
    transporting the tire to the vulcanizing press while maintaining the preheating; and
    as a vulcanizing and molding step, mounting said tire and said bladder on said tire vulcanizing press, supplying a heating medium into said bladder to thereby apply vulcanizing and molding to said entire tire.

2. The tire vulcanizing method according to claim 1, wherein in said preliminary step, thick portions of a tread portion and a bead portion of said tire are heated from the outer periphery of said green tire to apply preheating to said thick portions.

3. The tire vulcanizing method according to claim 1, wherein in said n preliminary step, said green tire is preheated to a temperature immediately before the start of vulcanizing.

4. The tire vulcanizing method according to claim 1, wherein in said preliminary step, after said vulcanizing step, shaping of a next green time is applied using the bladder carried out of said tire vulcanizing press.

5. A tire vulcanizer for carrying out the method according to claim 1, comprising:
    a flexible and bag-like bladder;
    pre-processing means for inserting said bladder into a green tire, bringing the bladder into close contact with the inner periphery of said green tire by enclosure of a heating gas into said bladder, and applying shaping to said tire; and
    a tire vulcanizing press provided separately from said pre-processing means for mounting said tire subjected to shaping and said bladder, and supplying a heating medium into said bladder to apply vulcanizing and molding to the entire tire.

6. The tire vulcanizer according to claim 5, further comprising:
    tire removing means for mounting a vulcanized tire carried out of said tire vulcanizing press and the bladder to remove said tire from said bladder; and
    carrying means for carrying said bladder directed at said pre-processing means from said tire removing means.

7. A tire vulcanizing method, comprising:
    as a preliminary step, heating and shaping a green tire externally of a tire vulcanizing press provided with a bladder, and applying preheating to said tire;
    transporting the tire to the vulcanizing press while maintaining the preheating; and
    as a vulcanizing and molding step, mounting said preheated tire at the outer periphery of said bladder in the vulcanizing press and supplying a heating medium into said bladder to thereby apply vulcanizing and molding to the entire tire.

8. The tire vulcanizing method according to claim 7, wherein as a preliminary step, the thick portions of a tread portion and a bead portion of said tire are heated from the outer periphery of said green tire to apply preheating to said thick portions.

9. The tire vulcanizing method according to claim 7, wherein in said preliminary step, said green tire is preheated to a temperature immediately before the start of vulcanizing.

10. A tire vulcanizer for carrying out the method according to claim 7, comprising:
    pre-processing means for heating a green tire to apply preheating to said green tire; and
    a tire vulcanizing press provided separately from said pre-processing means, comprising a bladder for mounting said preheated tire on the outer periphery thereof, and supplying a heating medium into said bladder to thereby apply vulcanizing and molding to said entire tire.

11. A vulcanizing method, comprising:
    as a preliminary step, applying preheating and shaping to a green tire externally of a bladderless type tire vulcanizing press to thereby obtain the preheated tire; and thereafter
    transporting the tire to the vulcanizing press while maintaining the preheating; and
    as a vulcanizing and molding step, sealing and holding said tire, and directly heating it from the inner periphery of said tire to thereby apply vulcanizing and molding to said entire tire.

12. The tire vulcanizing method according to claim 11, wherein in said preliminary step, pre-curing is applied to said green tire.

13. The tire vulcanizing method according to claim 12, wherein in said preliminary step, pre-curing is applied to an inner liner portion in the inner periphery of said green tire.

14. The tire vulcanizing method according to claim 12, wherein in said preliminary step, a low pressure heating gas is enclosed into said green tire while rising the pressure, and pre-curing is applied to the inner liner portion in the inner periphery of said green tire.

15. The tire vulcanizing method according to claim 11, wherein in said preliminary step, preheating is applied to a tread portion and a bead portion of said green tire.

16. The tire vulcanizing method according to claim 11, wherein in said preliminary step, said green tire is preheated to a temperature immediately before the start of vulcanizing.

17. A tire vulcanizing method, comprising:
- a preliminary step for heating a green tire, externally of a bladderless type tire vulcanizing press to apply pre-curing and shaping to said green tire;
- transporting the tire to the vulcanizing press while maintaining the pre-curing; and
- a vulcanizing and molding step for sealing and holding said pre-cured tire by said tire vulcanizing press to directly heat it from the inner periphery of the tire, and applying vulcanizing and molding to the entire tire.

18. A tire vulcanizer for vulcanizing and molding a green tire, including:
- pre-processing means for heating and shaping said green tire to apply preheating to said green tire;
- a bladderless type tire vulcanizing press provided separately from said pre-processing means, sealing and holding said preheated tire, and directly heating it from the inner periphery of said tire to apply vulcanizing and molding to the entire tire; and
- means for transporting the green tire to the vulcanizing press while continuing to preheat the tire.

19. A tire vulcanizer for vulcanizing and molding a green tire, including:
- a flexible and bag-like bladder;
- pre-processing means for inserting said bladder into said green tire, and bringing the bladder into close contact with the inner periphery of said green tire by enclosure of a heating gas into said bladder to apply shaping thereto;
- a tire vulcanizing press provided separately from said pre-processing means, mounting said tire subjected to shaping and the bladder, and applying vulcanizing and molding to the entire tire by a supply of a heating medium into said bladder; and
- means for transporting the green tire to the vulcanizing press while preheating the tire.

* * * * *